United States Patent
Yang et al.

(10) Patent No.: US 10,073,630 B2
(45) Date of Patent: Sep. 11, 2018

(54) SYSTEMS AND METHODS FOR LOG COORDINATION

(71) Applicant: SanDisk Technologies LLC, Plano, TX (US)

(72) Inventors: Jingpei Yang, San Jose, CA (US); Nisha Talagala, Livermore, CA (US); Swaminathan Sundararaman, San Jose, CA (US); Ned Plasson, Park City, UT (US); Gregory N. Gillis, Riverton, UT (US)

(73) Assignee: SanDisk Technologies LLC, Addison, TX (US)

( * ) Notice: Subject to any disclaimer, the term of this patent is extended or adjusted under 35 U.S.C. 154(b) by 158 days.

(21) Appl. No.: 14/075,951

(22) Filed: Nov. 8, 2013

(65) Prior Publication Data

US 2015/0134926 A1    May 14, 2015

(51) Int. Cl.
*G06F 3/06* (2006.01)
*G06F 17/40* (2006.01)

(52) U.S. Cl.
CPC .......... *G06F 3/0611* (2013.01); *G06F 3/0638* (2013.01); *G06F 3/0652* (2013.01);
(Continued)

(58) Field of Classification Search
CPC .... G06F 3/0679; G06F 3/0656; G06F 3/0688; G06F 3/0619; G06F 3/064;
(Continued)

(56) References Cited

U.S. PATENT DOCUMENTS

| 4,571,674 A | 2/1986 | Hartung |
| 5,193,184 A | 3/1993 | Belsan et al. |

(Continued)

FOREIGN PATENT DOCUMENTS

| CN | 1771495 | 5/2006 |
| EP | 1418502 | 5/2004 |

(Continued)

OTHER PUBLICATIONS

Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.

(Continued)

*Primary Examiner* — Zhuo Li
(74) *Attorney, Agent, or Firm* — Vierra Magen Marcus LLP

(57) ABSTRACT

A storage module may be configured to perform log storage operations on a storage log maintained on a non-volatile storage medium. An I/O client may utilize storage services of the storage module to maintain an upper-level log. The storage module may be configured to coordinate log storage and/or management operations between the storage log and the upper-level log. The coordination may include adapting a segment size of the logs to reduce write amplification. The coordination may further include coordinating validity information between log layers, adapting log grooming operations to reduce storage recovery overhead, defragmenting upper-level log data within the storage address space, preventing fragmentation of upper-level log data, and so on. The storage module may coordinate log operations by use of log coordination messages communicated between log layers.

20 Claims, 19 Drawing Sheets

(52) U.S. Cl.
CPC .......... *G06F 3/0673* (2013.01); *G06F 3/0688*
(2013.01); *G06F 17/40* (2013.01); *G06F
2003/0697* (2013.01)

(58) Field of Classification Search
CPC ............. G06F 11/1471; G06F 11/1072; G06F
11/1441; G06F 17/30312; G06F
2212/2022; G06F 3/0611; G06F 11/1402;
G06F 17/30174; G06F 2003/0697; G06F
3/0631; G06F 2212/222; G06F 3/0638;
G06F 11/2094; G06F 17/40; G06F
3/0652; G06F 3/0673
See application file for complete search history.

(56) References Cited

U.S. PATENT DOCUMENTS

| | | |
|---|---|---|
| 5,261,068 A | 11/1993 | Gaskins et al. |
| 5,307,497 A | 4/1994 | Feigenbaum et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,553,261 A | 9/1996 | Hasbun et al. |
| 5,586,291 A | 12/1996 | Lasker |
| 5,594,883 A | 1/1997 | Pricer |
| 5,596,736 A | 1/1997 | Kerns |
| 5,598,370 A | 1/1997 | Nijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers |
| 5,845,329 A | 12/1998 | Onishi et al. |
| 5,930,815 A | 7/1999 | Estakhri et al. |
| 5,957,158 A | 9/1999 | Volz et al. |
| 5,960,462 A | 9/1999 | Solomon et al. |
| 6,000,019 A | 12/1999 | Dykstal et al. |
| 6,014,724 A | 1/2000 | Jennett |
| 6,073,232 A | 6/2000 | Kroeker et al. |
| 6,101,601 A | 8/2000 | Matthews |
| 6,170,039 B1 | 1/2001 | Kishida |
| 6,170,047 B1 | 1/2001 | Dye |
| 6,173,381 B1 | 2/2001 | Dye |
| 6,185,654 B1 | 2/2001 | Van Doren |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson |
| 6,289,413 B1 | 9/2001 | Rogers et al. |
| 6,330,642 B1 | 12/2001 | Brown |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,102 B1 | 2/2003 | Dye et al. |
| 6,564,285 B1 | 5/2003 | Mills et al. |
| 6,587,915 B1 | 7/2003 | Kim |
| 6,601,211 B1 | 7/2003 | Norman |
| 6,625,684 B1 | 9/2003 | Cho et al. |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,093,101 B2 | 3/2006 | Aasheim et al. |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt et al. |
| 7,085,512 B2 | 7/2006 | Aasheim et al. |
| 7,085,879 B2 | 8/2006 | Aasheim et al. |
| 7,089,391 B2 | 8/2006 | Geiger et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo et al. |
| 7,171,536 B2 | 1/2007 | Chang et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,254,686 B2 | 8/2007 | Islam |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,328,307 B2 | 2/2008 | Hoogterp |
| 7,340,558 B2 | 3/2008 | Lee et al. |
| 7,340,566 B2 | 3/2008 | Voth et al. |
| 7,356,651 B2 | 4/2008 | Liu |
| 7,360,015 B2 | 4/2008 | Matthews et al. |
| 7,366,808 B2 | 4/2008 | Kano et al. |
| 7,395,384 B2 | 7/2008 | Sinclair |
| 7,398,348 B2 | 7/2008 | Moore et al. |
| 7,437,510 B2 | 10/2008 | Rosenbluth et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansal et al. |
| 7,516,267 B2 | 4/2009 | Coulson et al. |
| 7,526,614 B2 | 4/2009 | Van Riel |
| 7,529,905 B2 | 5/2009 | Sinclair |
| 7,536,491 B2 | 5/2009 | Kano et al. |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,620,773 B2 | 11/2009 | Nicholson et al. |
| 7,640,390 B2 | 12/2009 | Iwamura |

(56) References Cited

U.S. PATENT DOCUMENTS

| | | |
|---|---|---|
| 7,644,239 B2 | 1/2010 | Ergan et al. |
| 7,664,239 B2 | 1/2010 | Groff et al. |
| 7,660,911 B2 | 2/2010 | McDaniel |
| 7,660,941 B2 | 2/2010 | Lee et al. |
| 7,669,019 B2 | 2/2010 | Fujibayashi et al. |
| 7,676,628 B1 | 3/2010 | Compton et al. |
| 7,702,873 B2 | 4/2010 | Griess et al. |
| 7,721,059 B2 | 5/2010 | Mylly et al. |
| 7,725,628 B1 | 5/2010 | Phan et al. |
| 7,831,783 B2 | 11/2010 | Pandit et al. |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,127,103 B2 | 2/2012 | Kano et al. |
| 8,135,900 B2 | 3/2012 | Kunimatsu et al. |
| 8,135,907 B2 | 3/2012 | Moore |
| 8,151,082 B2 | 4/2012 | Flynn et al. |
| 8,171,204 B2 | 5/2012 | Chow et al. |
| 8,214,583 B2 | 7/2012 | Sinclair |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2003/0061296 A1 | 3/2003 | Craddock et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0003002 A1 | 1/2004 | Adelmann |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0120177 A1 | 6/2005 | Black |
| 2005/0141313 A1 | 6/2005 | Gorobets |
| 2005/0177687 A1 | 8/2005 | Rao |
| 2005/0193166 A1 | 9/2005 | Johnson et al. |
| 2005/0216653 A1 | 9/2005 | Johnson et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0268359 A1 | 12/2005 | Mach et al. |
| 2005/0273476 A1 | 12/2005 | Wertheimer et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0129778 A1 | 6/2006 | Clark et al. |
| 2006/0136657 A1 | 6/2006 | Rudelic et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2007/0016699 A1 | 1/2007 | Minamii |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0069318 A1 | 3/2007 | Chow et al. |
| 2007/0088666 A1 | 4/2007 | Saito |
| 2007/0118676 A1 | 5/2007 | Kano et al. |
| 2007/0118713 A1 | 5/2007 | Guterman |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets et al. |
| 2007/0147356 A1 | 6/2007 | Gorobets |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052377 A1 | 2/2008 | Light |
| 2008/0052477 A1 | 2/2008 | Lee |
| 2008/0091876 A1 | 4/2008 | Fujibayashi et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0209090 A1 | 5/2008 | Esmaili et al. |
| 2008/0140737 A1 | 6/2008 | Garst et al. |
| 2008/0109090 A1 | 8/2008 | Kano et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan |
| 2009/0276588 A1 | 11/2009 | Murase |
| 2009/0276654 A1 | 11/2009 | Butterworth |
| 2009/0287887 A1 | 11/2009 | Matsuki |
| 2009/0292861 A1 | 11/2009 | Kanevsky et al. |
| 2009/0294847 A1 | 11/2009 | Maruyama et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005228 A1 | 1/2010 | Fukutomi |
| 2010/0017556 A1 | 1/2010 | Chin |
| 2010/0023674 A1 | 1/2010 | Aviles |
| 2010/0023676 A1 | 1/2010 | Moon |
| 2010/0023682 A1 | 1/2010 | Lee |
| 2010/0030946 A1 | 2/2010 | Kano et al. |
| 2010/0076936 A1 | 3/2010 | Rajan |
| 2010/0095059 A1 | 4/2010 | Kisley et al. |
| 2010/0169542 A1 | 7/2010 | Sinclair |
| 2010/0205231 A1 | 8/2010 | Cousins |
| 2010/0205335 A1 | 8/2010 | Phan et al. |

(56) References Cited

U.S. PATENT DOCUMENTS

| | | | |
|---|---|---|---|
| 2010/0211737 | A1 | 8/2010 | Flynn et al. |
| 2010/0235597 | A1 | 9/2010 | Arakawa |
| 2010/0262738 | A1 | 10/2010 | Swing et al. |
| 2010/0262740 | A1 | 10/2010 | Borchers et al. |
| 2010/0262757 | A1 | 10/2010 | Sprinkle et al. |
| 2010/0262758 | A1 | 10/2010 | Swing et al. |
| 2010/0262759 | A1 | 10/2010 | Borchers et al. |
| 2010/0262760 | A1 | 10/2010 | Swing et al. |
| 2010/0262761 | A1 | 10/2010 | Borchers et al. |
| 2010/0262762 | A1 | 10/2010 | Borchers et al. |
| 2010/0262766 | A1 | 10/2010 | Sprinkle et al. |
| 2010/0262767 | A1 | 10/2010 | Borchers et al. |
| 2010/0262773 | A1 | 10/2010 | Borchers et al. |
| 2010/0262894 | A1 | 10/2010 | Swing et al. |
| 2010/0262979 | A1 | 10/2010 | Borchers et al. |
| 2010/0263894 | A1 | 10/2010 | Swing et al. |
| 2011/0022819 | A1 | 1/2011 | Post et al. |
| 2011/0295969 | A1 | 12/2011 | Bernstein et al. |
| 2011/0296133 | A1* | 12/2011 | Flynn .................. G06F 11/1048 711/171 |
| 2012/0124294 | A1* | 5/2012 | Atkisson ............... G06F 11/108 711/135 |
| 2013/0166855 | A1* | 6/2013 | Batwara ................ G06F 3/0608 711/154 |
| 2013/0185532 | A1* | 7/2013 | Flynn ...................... G06F 3/061 711/162 |
| 2015/0134926 | A1* | 5/2015 | Yang ..................... G06F 3/0611 711/167 |

FOREIGN PATENT DOCUMENTS

| | | |
|---|---|---|
| EP | 1814039 | 3/2009 |
| GB | 0123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO1994019746 | 9/1994 |
| WO | WO1995018407 | 7/1995 |
| WO | WO199612225 | 4/1996 |
| WO | WO200201365 | 1/2002 |
| WO | 2002021273 A2 | 3/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | WO2008070173 | 6/2008 |
| WO | WO2008073421 | 6/2008 |
| WO | WO2011106394 | 9/2011 |

OTHER PUBLICATIONS

Agigatech, "Bulletproof Memory for RAID Servers, Part 1," http://agigatech.com/blog/bulletproof-memory-for-raid-servers-part-1/, last visited Feb. 16, 2010.

Anonymous, "Method for Fault Tolerance in Nonvolatile Storage", http://ip.com, IP.com No. IPCOM000042269D, 2005.

Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.

Arpaci-Dusseau, "Nameless Writes," HotStorage '10, Boston, MA, Jun. 2010.

Asine, "ASPMC-660 Rugged IDE Flash Drive PMC Module", http://www.asinegroup.com/products/aspmc660.html, copyright 2002, visited Nov. 8, 2009.

Barrall et al., U.S. Appl. No. 60/625,495, "Dynamically Expandable and Contractible Fault-Tolerant Storage System Permitting Variously Sized Storage Devices and Method," filed Nov. 5, 2004.

Barrall et al., U.S. Appl. No. 60/718,768, "Dynamically Adaptable Fault-Tolerant Storage System," filed Sep. 20, 2005.

BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.

Bonnet et al., "Flash Device Support for Database Management," published at the 5th Biennial Conference on Innovative Data Systems Research (CIDR '11), held in Asilomar, California, on Jan. 9-12, 2011.

Brandon, Jr., "Sparse Matrices in CS Education," Journal of Computing Sciences in Colleges, vol. 24 Issue 5, May 2009, pp. 93-98.

Clustered Storage Solutions: "Products," http://www.clusteredstorage.com/clustered_storage_solutions.HTML, last visited Feb. 16, 2010.

Coburn, "NV-Heaps: Making Persistent Objects Fast and Safe with Next-Generation, Non-Volatile Memories", ACM 978-1-4503-0266-1/11/0, published Mar. 5, 2011.

Dan, "Implementing MLC NAND Flash for Cost-Effective, High-Capacity Memory," M-Systems, White Paper, 91-SR-014-02-8L, Rev 1.1, Sep. 2003.

EEEL-6892, Lecture 18, "Virtual Computers," Mar. 2010.

ELNEC "NAND Flash Memories and Programming NAND Flash Memories Using ELNEC Device Programmers, Application Note," published Mar. 1, 2007.

European Patent Office, Office Action, EP Application No. 07865345.8, dated Nov. 17, 2010.

Gal, "A Transactional Flash File System for Microcontrollers," 2005 USENIX Annual Technical Conference, published Apr. 10, 2009.

Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.

Gutmann, "Secure Deletion of Data from Magnetic and Solid-State Memory", Usenix, 14 pages, San Jose, CA, published Jul. 1, 1996.

Hensbergen, IBM Research Report, "Dynamic Policy Disk Caching for Storage Networking," IBM Research Division, Computer Science, RC24123 (WO611-189), Nov. 28, 2006.

Huffman, "Non-Volatile Memory Host Controller Interface," Apr. 14, 2008, 65 pgs.

Hynix Semiconductor, Intel Corporation, Micron Technology, Inc. Phison Electronics Corp., Sony Corporation, Spansion, STMicroelectronics, "Open NAND Flash Interface Specification," Revision 2.0, Feb. 27, 2008.

Hystor: "Making SSDs the Survival of the Fittest in High-Performance Storage Systems," ics10-Paper 102, Feb. 2010.

IBM, "Method to Improve Reliability of SSD Arrays," Nov. 2009.

Information Technology, "SCSI Object-Based Storage Device Commands," 2 (OSD-2), Project T10/1729-D, Revision 4, published Jul. 30, 2004, printed Jul. 24, 2008.

Intel, "Non-Volatile Memory Host Controller Interface (NVMHCI) 1.0," Apr. 14, 2008.

Johnson, "An Introduction to Block Device Drivers," Jan. 1, 1995.

Kawaguchi, "A Flash-Memory Based File System," TCON'95 Proceedings of the USENIX 1995 Technical Conference Proceedings, p. 13.

Mesnier, "Object-Based Storage," IEEE Communications Magazine, Aug. 2003, pp. 84-90.

Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand_101.pdf, 2006, visited May 10, 2010.

Micron, "TN-29-08: Technical Note, Hamming Codes for NAND Flash Memory Devices," Mar. 10, 2010.

Micron, "TN-29-17: NAND Flash Design and Use Considerations," Mar. 10, 2010.

Micron, "TN-29-42: Wear-Leveling Techniques in NAND Flash Devices," Mar. 10, 2010.

Microsoft, "How NTFS Works," Apr. 9, 2010.

Morgenstern, David, "Is There a Flash Memory RAID in your Future?", http://www.eweek.com-eWeek, Ziff Davis Enterprise Holdings Inc., Nov. 8, 2006, visited Mar. 18, 2010.

(56) References Cited

OTHER PUBLICATIONS

Novell, "File System Primer", http://wiki.novell.com/index.php/File_System_Primer, 2006, visited Oct. 18, 2006.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/training/ss/lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
Singer, "Implementing MLC NAND Flash for Cost-Effective, High Capacity Memory," M-Systems, White Paper, 91-SR014-02-8L, Rev. 1.1, Sep. 2003.
Spansion, "Data Management Software (DMS) for AMD Simultaneous Read/Write Flash Memory Devices", published Jul. 7, 2003.
Spillane "Enabling Transactional File Access via Lightweight Kernel EXtensions", Stony Brook University, IBM T. J. Watson Research Center, published Feb. 25, 2009.
State Intellectual Property Office, Office Action, CN Application No. 200780050983.8, dated May 18, 2011.
State Intellectual Property Office, Office Action, CN Application No. 200780050970.0, dated Jan. 5, 2012.
State Intellectual Property Office, Office Action, CN Application No. 200780051020.X, dated Nov. 11, 2010.
State Intellectual Property Office, Office Action, CN Application No. 200780051020.X, dated Jul. 6, 2011.
State Intellectual Property Office, Office Action, CN Application No. 200780051020.X, dated Nov. 7, 2011.
State Intellectual Property Office, Office Action, CN Application No. 200780050970.0, dated Oct. 28, 2010.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
United States Patent Office, Final Office Action, U.S. Appl. No. 11/952,109, dated Nov. 29, 2011.
United States Patent Office, Office Action, U.S. Appl. No. 11/952,113, dated Mar. 6, 2012.
United States Patent Office, Office Action, U.S. Appl. No. 11/952,113, dated Dec. 15, 2010.
United States Patent Office, Office Action, U.S. Appl. No. 11/952,109, dated May 1, 2012.
United States Patent Office, U.S. Appl. No. 60/912,728, published as U.S. Application Publication No. 20080263305 on Oct. 23, 2008.
USPTO, Notice of Allowance for U.S. Appl. No. 12/986,117, dated Apr. 4, 2013.
USPTO, Notice of Allowance for U.S. Appl. No. 12/986,117 dated Jun. 5, 2013.
USPTO, Office Action for U.S. Appl. No. 12/879,004 dated Feb. 25, 2013.
USPTO, Office Action for U.S. Appl. No. 13/607,486 dated Jan. 10, 2013.
USPTO, Office Action for U.S. Appl. No. 12/711,113, dated Jun. 6, 2012.
USPTO, Office Action for U.S. Appl. No. 12/711,113, dated Nov. 23, 2012.
USPTO, Office Action for U.S. Appl. No. 13/607,486 dated May 2, 2013.
USPTO, Office Action for U.S. Appl. No. 13/118,237 dated Apr. 22, 2013.
USPTO, Office Action for U.S. Appl. No. 13/424,333 dated Mar. 17, 2014.
USPTO, Office Action for U.S. Appl. No. 14/030,717 dated Apr. 11, 2014.
USPTO, Office Action, U.S. Appl. No. 11/952,109, dated Nov. 29, 2011.
Van Hensbergen, "Dynamic Policy Disk Caching for Storage Networking," IBM Research Division, RC24123, Nov. 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wikipedia, "Object Storage Device," http://en.wikipedia.org/wiki/Object-storage-device, last visited Apr. 29, 2010.
WIPO, International Preliminary Report of Patentability for PCT/US2007/086691, dated Feb. 16, 2009.
WIPO, International Preliminary Report on Patentability for PCT/US2007/025048, dated Jun. 10, 2009.
WIPO, International Preliminary Report on Patentability for PCT/US2007/059048, dated Oct. 20, 2009.
WIPO, International Preliminary Report on Patentability for PCT/US2007/086687, dated Mar. 18, 2009.
WIPO, International Preliminary Report on Patentability for PCT/US2007/086688, dated Mar. 16, 2009.
WIPO, International Preliminary Report on Patentability for PCT/US2007/086701, dated Mar. 16, 2009.
WIPO, International Preliminary Report on Patentability for PCT/US2010/048325, dated Mar. 13, 2012.
WIPO, International Search Report and Written Opinion for PCT/US11/65927, dated Aug. 28, 2012.
WIPO, International Search Report and Written Opinion for PCT/US2010/048325, dated Jun. 1, 2011.
WIPO, International Search Report and Written Opinion for PCT/US2011/025885, dated Sep. 28, 2011.
WIPO, International Search Report and Written Opinion for PCT/US2007/025048, dated May 27, 2008.
WIPO, International Search Report and Written Opinion for PCT/US2007/086687, dated Sep. 5, 2008.
WIPO, International Search Report and Written Opinion for PCT/US2007/086691, dated May 8, 2008.
WIPO, International Search Report and Written Opinion for PCT/US2007/086701, dated Jun. 5, 2008.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.

(56) References Cited

OTHER PUBLICATIONS

Zhang et al., "De-indirection for Flash-based SSDs with Nameless Writes," Usenix InFast 2012 (Feb. 14, 2012).

\* cited by examiner

SYSTEMS AND METHODS FOR LOG COORDINATION

TECHNICAL FIELD

This disclosure relates to storage systems and, in particular, to systems and methods for coordinating log operations.

SUMMARY

Disclosed herein are embodiments of a method for log coordination. The disclosed method may comprise writing data to a storage log on a non-volatile storage medium, the storage log comprising an ordered sequence of segments within a physical address space of the non volatile storage medium and/or coordinating log storage operations within the storage log with operations of a logical log maintained by a client. Coordinating the log storage operations may include receiving a deallocation message pertaining to the logical log maintained by the client.

In some embodiments, coordinating the log storage operations comprises one or more of configuring a segment size of the logical log based on a segment size of the storage log, and configuring the segment size of the storage log based on the segment size of the logical log. The client may be configured to adapt a groomer of the logical log based on the size of the recovery segments of the storage log. Alternatively, or in addition, coordinating the log storage operations may comprise configuring segments of the logical log to align boundaries of the segments of the logical log to boundaries of segments of the storage log, and determining an optimal size for segments of the logical log by use of a write amplification reduction criterion corresponding to grooming operations performed on segments of the storage log.

Coordinating log storage operations may include coordinating storage recovery operations within the storage log and coordinating storage recovery operations within the logical log by, inter alia, adjusting a storage recovery operation schedule for recovery operations on segments of the storage log based on a state of the logical log. Coordinating storage recovery operations may include identifying data within a segment of the storage log that does not need to be retained on the non-volatile storage medium based on validity information pertaining to one or more segments of the logical log.

Data of the logical log may be interleaved with other data within one or more segments of the storage log. Coordinating log operations may comprise consolidating the interleaved data of the logical log within the storage log. Consolidating the interleaved data of the logical log may include relocating the interleaved data of the logical log to one or more other segments of the storage log.

In some embodiments, the disclosed method includes, maintaining a plurality of append points within the storage log, each append point corresponding to a respective region of the logical address space, and selecting one of the plurality of append points to store data of a storage request based on logical identifiers pertaining to the storage request.

Disclosed herein are embodiments of an apparatus for log coordination. The apparatus may include a storage module configured to manage a logical address space made available to an application, a log storage module configured to append data to a log within a storage address space of a storage device in response to storage requests of the application, wherein the application is configured to maintain an application log within the logical address space, and/or a log coordination module configured to coordinate log operations of the application log with log storage operations of the log within the storage address space. The log storage module may be configured to append data within respective sections of the storage log, wherein the sections of the storage log correspond to erase blocks of a solid-state storage medium. The log coordination module may be configured to report a size of the sections of the storage log to the application, and the application may be configured to adapt a configuration of the application log in response to the reported size of the sections of the storage log.

The apparatus may further include a groomer module configured to reclaim sections of the storage log, wherein the log coordination module is configured to manage operations of the groomer module in response to log hints pertaining to the application log. The log coordination module may be configured to defer recovery of a section of the storage log in response to a log hint indicating that one or more sections of the application log are to be recovered and/or resume recovery of a section of the storage log in response to a log hint indicating that one or more sections of the application log have been recovered. The log hints are configured to identify data stored within one or more sections of the storage log that does not need to be retained within the storage log.

In some embodiments, the log coordination module is configured to defragment data of the application log within the storage address space of the storage device. The log storage module may be configured to append data to one of a plurality of different append points within the storage address space of the storage device, and to select one of the append points for a storage operation based on logical identifiers corresponding to the storage operation.

Disclosed herein are further embodiments of a method for log coordination, including, maintaining a logical address space corresponding to a non-volatile storage medium, appending data of an upper-level log corresponding to the logical address space to a media-level log on the non-volatile storage medium, wherein the media-level log comprises an ordered sequence of log divisions on the non-volatile storage medium, and/or attuning log management operations between the upper-level log of the logical address space and the media-level log on the non volatile storage medium. Attuning log management operations may comprise determining a log division size for the upper-level log based on a log division size of the media-level log, and the determined log division size may be at least as large the log division size of the media-level log. Alternatively, or in addition, attuning log management operations may include managing compaction operations on divisions of the media-level log based on information pertaining to compaction operations on segments of the upper-level log. Attuning log management operations may comprise configuring an operation to re-initialize a division of the media-level log based on validity information of the upper-level log and/or grouping data of the upper-level log by relocating the data within the storage address space of the non-volatile medium.

The disclosed method may include issuing storage requests pertaining to an application log to a storage module, wherein the storage module is configured to satisfy the storage requests, the storage module comprising a persistent storage log, and providing metadata pertaining to the application log to the storage module. Providing the metadata pertaining to the application log may include one or more of calling an application programming interface of the storage module, accessing a storage interface corresponding to the storage module, transmitting a message comprising the metadata pertaining to the application log to the storage module, and/or broadcasting the metadata pertaining to the application log. The metadata pertaining to the application log may be provided to the storage module in response to a request from the storage module.

In some embodiments, the metadata pertaining to the application log is configured to identify data of the application log that no longer needs to be retained by the storage module. The metadata pertaining to the application log may be configured to identify a segment of the application log that has been reclaimed in the application log. The metadata pertaining to the application log may include one or more of a deallocation message, a deallocation command, an erase message, an erase command, an invalidation message, and an invalidation command. The storage module may be configured to record that data corresponding to the segment of the application log in the persistent storage log does not need to be retained, in response to the metadata. The metadata pertaining to the application log may indicate a size of segments comprising the application log.

In certain embodiments, the metadata comprises timing information pertaining to compaction operations within the application log. The timing information may indicate that compaction operations are being performed within the application log and/or compaction operations are to be performed within the application log within a time threshold. The storage module may be configured to defer compaction operations in the persistent storage log in response to the metadata. Alternatively, the timing information may indicate that compaction operations have been performed within the application log within a time threshold, and the storage module may be configured to resume compaction operations in the persistent storage log in response to the metadata.

The metadata pertaining to the application log may identify logical addresses allocated for use by the application log within a logical address space managed by the storage module. The storage module may be configured to defragment data of the application log within a storage address space of the storage log in response to the metadata. In some embodiments, the metadata pertains to a segment boundary condition of the application log. In response, the storage module may advance an append point of the persistent storage log to a next storage log segment.

Disclosed herein are further embodiments of an apparatus for log coordination, which may include a log storage module configured store data of an upper-level log within a lower-level log on a non-volatile storage medium, and a log coordination module configured to adapt storage operations within the lower-level log on the non-volatile storage medium in response to a log coordination message pertaining to the upper-level log. The log coordination message may be configured to identify data of the upper-level log stored in the lower-level log that no longer needs to be persisted. The log coordination module may be further configured to record that the identified data does not need to be retained on the non-volatile storage medium.

The apparatus may further include a garbage collection module configured to re-initialize segments of the lower-level log. Re-initializing a segment may include relocating valid data on the segment and initializing the segment. The garbage collection module may be configured to not relocate data stored within the segment that corresponds to the log coordination message. The log coordination message may correspond to a state of garbage collection operations within the upper-level log, and the log coordination module may be configured to adapt garbage collection operations to recover segments within the lower-level log based on the state of garbage collection operations within the upper-level log.

The log coordination message may include timing for compaction operations in the upper-level log (e.g., compaction operations to reclaim segments of the upper-level log). The log coordination module may be configured to schedule compaction operations to reclaim segments of the lower-level log based on the timing for compaction operations in the upper-level log. The log coordination module may be configured to pause compaction operations in the lower-level log in response to one or more of determining that compaction operations are being performed in the upper-level log, and determining that compaction operations are to be performed in the upper-level log within a time threshold. The log coordination module may be configured to resume compaction operations in the lower-level log in response to one or more of determining that compaction operations are not currently being performed in the upper-level log, and determining that compaction operations were completed in the upper-level log within a time threshold.

The log coordination message may comprise identifiers of a logical address space that are provisioned to the upper-level log, and the log coordination module may be configured to defragment data of the upper-level log within the lower-level log by use of the log coordination message. Alternatively, the log coordination message may correspond to filling an upper-level log segment, and, in response, the log coordination module may be configured to advance an append point of the lower-level log from a current lower-level log segment to a next lower-level log segment.

In some embodiments, the log coordination message indicates a storage capacity for recoverable segments of the upper-level log, and the log coordination module may be configured to determine an optimal storage capacity for segments of the lower-level log in response to the log coordination message.

Further embodiments of a method for log coordination may include, accessing log coordination information pertaining to a storage log stored on a non-volatile storage device and managed by a storage module, and configuring an application log based on the log coordination information pertaining to the storage log. The log coordination information pertaining to the storage log may indicate a size of segments of the storage log. Configuring the application log may include configuring a size of segments of the application log based on the size of the segments of the storage log. Alternatively, or in addition, configuring the application log may include configuring the segments of the application log to have a size as least as large as the size of the segments of the storage log. The log coordination information pertaining to the storage log may indicate a capacity of segments of the storage log. Configuring the application log may comprise configuring a capacity of segments of the application log based on the capacity of the segments of the storage log. The segments of the application log may be configured to have a capacity as least as large as the capacity of the segments of the storage log.

DETAILED DESCRIPTION

Figure 1A:
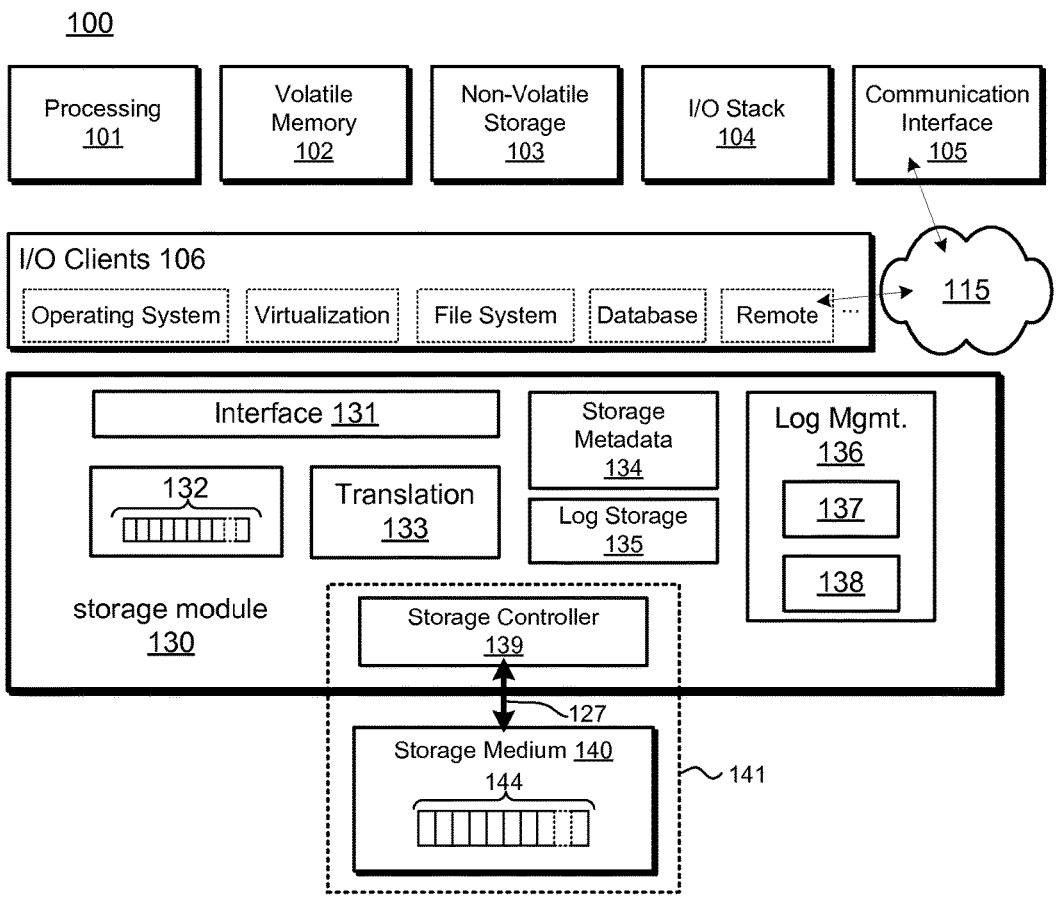
FIG. 1A is a schematic block diagram of one embodiment of a storage module.

FIG. 1A is a block diagram of one embodiment of a computing system 100 comprising a storage module 130 configured to provide I/O and/or storage services to one or more I/O clients 106. The computing system 100 may comprise any computing device, including, but not limited to, a server, desktop, laptop, embedded system, mobile device, and/or the like. In some embodiments, the computing system 100 may include multiple computing devices, such as a cluster of server computing devices. The computing system 100 may comprise processing resources 101, volatile memory resources 102 (e.g., random access memory (RAM)), non-volatile storage resources 103, and a communication interface 105. The processing resources 101 may include, but are not limited to, general purpose central processing units (CPUs), application-specific integrated circuits (ASICs), and programmable logic elements, such as field programmable gate arrays (FPGAs), programmable logic arrays (PLGs), and the like. The non-volatile storage resources 103 may comprise a non-transitory machine-readable storage medium, such as a magnetic hard disk, solid-state storage medium, optical storage medium, and/or the like. The communication interface 105 may be configured to communicatively couple the computing system 100 to a network 115. The network 115 may comprise any suitable communication network, including, but not limited to, a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

The I/O clients 106 may include, but are not limited to, operating systems (including bare metal operating systems, guest operating systems, virtual machines, and the like), virtualization systems (virtualization kernels, hypervisors, virtual machines, and/or the like), file systems, database systems, remote I/O clients (e.g., I/O clients 106 communicatively coupled to the computing system 100 and/or storage module 130 through the network 115), and/or the like.

The storage module 130 (and/or modules thereof) may be implemented in software, hardware, or a combination thereof. In some embodiments, portions of the storage module 130 are embodied as executable instructions, such as computer program code, which may be stored on a persistent, non-transitory storage medium, such as the non-volatile storage resources 103, storage medium 140, firmware, and/or the like. The instructions and/or computer program code may be configured for execution by the processing resources 101 of the computing system 100 and/or processing resources of other components and/or modules, such as the storage controller 139. Alternatively, or in addition, portions of the storage module 130 and/or other modules disclosed herein may be embodied as machine components, such as general and/or application-specific components, programmable hardware, FPGAs, ASICs, hardware controllers, storage controllers, and/or the like.

The storage module 130 may be configured to perform storage operations on the storage medium 140. The storage medium 140 may comprise any storage medium capable of storing data persistently. As used herein, "persistent" data storage refers to storing information on a persistent, non-volatile storage medium. The storage medium 140 may include non-volatile storage media, such as solid-state storage media in one or more solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writeable optical drives (e.g., CD drives, DVD drives, Blu-ray drives, etc.), and/or the like.

In some embodiments, the storage medium 140 comprises non-volatile, solid-state memory, which may include, but is not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS)

memory, resistive random-access memory (RRAM), programmable metallization cell (PMC) memory, conductive-bridging RAM (CBRAM), and/or the like. Although particular embodiments of the storage medium 140 are disclosed herein, the teachings of this disclosure could be applied to any suitable form of memory, including both non-volatile and volatile forms. Accordingly, although particular embodiments of the storage module 130 are disclosed in the context of non-volatile, solid-state storage devices, the storage module 130 may be used with other storage devices and/or storage media.

In some embodiments, the storage medium 140 includes volatile memory, which may include, but is not limited to, RAM, dynamic RAM (DRAM), static RAM (SRAM), synchronous dynamic RAM (SDRAM), etc. The storage medium 140 may correspond to the memory of the processing resources 101, such as a CPU cache (e.g., L1, L2, L3 cache, etc.), graphics memory, and/or the like. In some embodiments, the storage medium 140 is communicatively coupled to the storage module 130 by use of an interconnect 127. The interconnect 127 may include, but is not limited to, peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), and/or the like. Alternatively, the storage medium 140 may be a remote storage device that is communicatively coupled to the storage module 130 through the network 115 (and/or other communication interface, such as a Storage Area Network (SAN), a Virtual Storage Area Network (VSAN), and/or the like). The interconnect 127 may, therefore, comprise a remote bus, such as a PCE-e bus, a network connection (e.g., Infiniband), a storage network, Fibre Channel Protocol (FCP) network, HyperSCSI, and/or the like.

The storage module 130 may be configured to manage storage operations on the storage medium 140 by use of the storage controller 139. The storage module 130 and/or storage controller 139 may comprise software and/or hardware components, including, but not limited to, one or more drivers and/or other software modules operating on the computing system 100, such as storage drivers, I/O drivers, filter drivers, and/or the like. In some embodiments, the storage module 130 may comprise a driver and/or storage services layer of the computing device 100. The storage module 130 (and/or modules thereof) may be embodied as computer-readable code stored on a non-volatile, computer-readable storage medium (e.g., non-volatile storage 103 of the computing device 100). Alternatively, or in addition, the storage module 130 may comprise and/or be tied to particular hardware components, such as hardware controllers, dedicated processing components, memory components, storage media, buffers, communication interfaces, and/or the like.

The storage medium 140 may be embodied on a storage device 141. Portions of the storage module 130 and/or storage controller 139 may be implemented as hardware and/or software components (e.g., firmware) of the storage device 141. The storage controller 139 may be configured to implement storage operations at particular storage units and/or storage locations of the storage medium 140. As used herein, a storage unit or storage locations refers to portion of a storage resource (e.g., a storage medium and/or device) that is capable of storing data persistently; storage units and/or storage locations may include, but are not limited to, pages, groups of pages (e.g., logical pages and/or offsets within a logical page), storage divisions (e.g., physical erase blocks, logical erase blocks, etc.), sectors, blocks, physical die, physical die plane(s), locations on a magnetic disk, battery-backed memory locations, and/or the like. Storage units may be addressable within a storage address space 144 of the storage medium 140. Storage addresses may correspond to physical addresses, media addresses, back-end addresses, address offsets, and/or the like. Storage addresses may correspond to any suitable storage address space 144, storage addressing scheme, and/or arrangement of storage units.

The storage module 130 may comprise an interface 131 through which I/O clients 106 may access storage services provided by the storage module 130. The storage interface 131 may include one or more of a block device interface, an object storage interface, a file storage interface, a key-value storage interface, a virtualized storage interface, one or more virtual storage units (VSUs), an object storage interface, a database storage interface, and/or other suitable interfaces and/or an Application Programming Interface (API), and the like.

The storage module 130 may provide for referencing storage resources through a front-end storage interface. As used herein, a "front-end storage interface" refers to an interface and/or namespace through which I/O clients 106 may refer to storage resources of the storage module 130. A storage interface may correspond to a logical address space 132. The logical address space 132 may comprise a group, set, collection, range, and/or extent of identifiers. As used herein, an "identifier" or "logical identifier" (LID) refers to an identifier for referencing an I/O resource. LIDs may include, but are not limited to, names (e.g., file names, distinguished names, and/or the like), data identifiers, references, links, front-end identifiers, logical addresses, logical block addresses (LBAs), storage unit addresses, virtual storage unit (VSU) addresses, logical unit number (LUN) addresses, virtual unit number (VUN) addresses, virtual logical unit number (VLUN) addresses, virtual storage addresses, storage addresses, physical addresses, media addresses, back-end addresses, unique identifiers, globally unique identifiers (GUIDs), and/or the like.

The logical capacity of the logical address space 132 may correspond to the number of LIDs in the logical address space 132 and/or the size and/or granularity of the storage resources referenced by the LIDs. In some embodiments, the logical address space 132 may be "thinly provisioned." As used herein, a thinly provisioned logical address space 132 refers to a logical address space 132 having a logical capacity that exceeds the physical storage capacity of the underlying storage resources (e.g., exceeds the storage capacity of the storage medium 140). In one embodiment, the storage module 130 is configured to provide a 64-bit logical address space 132 (e.g., a logical address space comprising $2^{26}$ unique LIDs), which may exceed the physical storage capacity of the storage medium 140. The storage module 130 may leverage the large, thinly provisioned logical address space 132 to efficiently allocate and/or reference contiguous ranges of LIDs for the I/O clients 106, while reducing the chance of naming conflicts.

The translation module 133 of the storage module 130 may be configured to map LIDs of the logical address space 132 to storage resources (e.g., data stored within the storage address space 144 of the storage medium 140). The logical address space 132 may be independent of the back-end storage resources (e.g., the storage medium 140); accordingly, there may be no set or pre-determined mappings between LIDs of the logical address space 132 and the storage addresses of the storage address space 144. In some embodiments, the logical address space 132 is sparse, thinly provisioned, and/or over-provisioned, such that the size of the logical address space 132 differs from the storage address space 144 of the storage medium 140.

The storage module 130 may be configured to maintain storage metadata 134 pertaining to storage operations performed on the storage medium 140. The storage metadata 134 may include, but is not limited to, a forward map comprising any-to-any mappings between LIDs of the logical address space 132 and storage addresses within the storage address space 144, a reverse map pertaining to the contents of storage units of the storage medium 140, validity bitmaps, reliability testing and/or status metadata, status information (e.g., error rate, retirement status, and so on), cache metadata, and/or the like. Portions of the storage metadata 134 may be maintained within the volatile memory resources 102 of the computing system 100. Alternatively, or in addition, portions of the storage metadata 134 may be stored on non-volatile storage resources 103 and/or the storage medium 140.

Figure 1B:
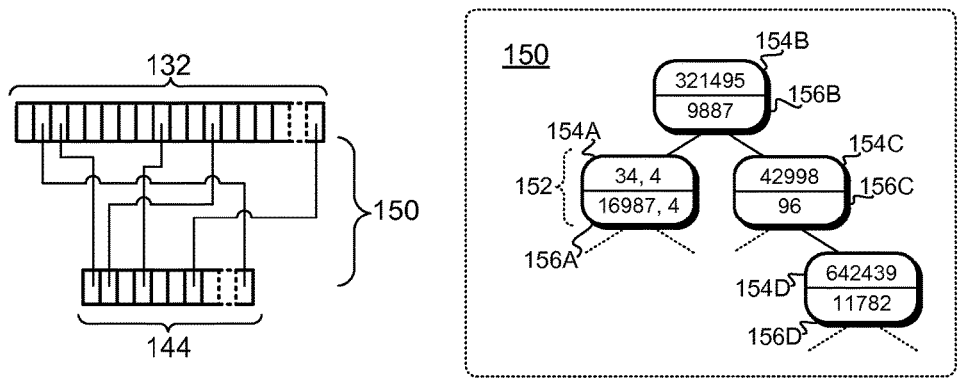
FIG. 1B depicts embodiments of storage metadata.

FIG. 1B depicts one embodiment of any-to-any mappings between LIDs of the logical address space 132 and back-end identifiers (e.g., storage addresses) within the storage address space 144. The any-to-any mappings may be maintained in one or more data structures of the storage metadata 134. As illustrated in FIG. 1B, the translation module 133 may be configured to map any storage resource identifier (any LID of the logical address space 132) to any back-end storage unit. As further illustrated, the logical address space 132 may be sized differently than the underlying storage address space 144. In the FIG. 1B embodiment, the logical address space 132 may be thinly provisioned, and, as such, may comprise a larger range of LIDs than the range of storage addresses in the storage address space 144.

As disclosed above, I/O clients 106 may reference storage resources of the storage module 130 by use of, inter alia, LIDs of the logical address space 132. Accordingly, the logical address space 132 may correspond to a logical or front-end interface of the storage resources, and the mappings to particular storage addresses within the storage address space 144 may correspond to a back-end interface of the storage resources.

The storage module 130 may be configured to maintain the any-to-any mappings between the logical interface and back-end interface in a forward map 150 (FIG. 1B). The forward map 150 may comprise any suitable data structure, including, but not limited to, an index, a map, a hash map, a hash table, a tree, a range-encoded tree, a b-tree, and/or the like. The forward map 150 may comprise entries 152 corresponding to LIDs that have been allocated for use to reference data stored on the storage medium 140. The entries 152 of the forward map 150 may associate LIDs 154A-D with respective storage addresses 156A-D within the storage address space 144. The forward map 150 may be sparsely populated and, as such, may omit entries corresponding to LIDs that are not currently allocated to I/O clients 106 and/or are not currently in use to reference valid data stored on the storage medium 140. In some embodiments, the forward map 150 comprises a range-encoded data structure, such that one or more of the entries 152 correspond to a plurality of LIDs (e.g., a range, extent, and/or set of LIDs). In the FIG. 1B embodiment, the forward map 150 includes an entry 152 corresponding to a range of LIDs 154A (LID range 34 of length 4, comprising LIDs 34-37) mapped to a corresponding range of storage addresses 156A (16987-16990). The entries 152 of the forward map 150 may be indexed by a LID in a tree data structure. The disclosure is not limited in this regard, however, and could be adapted to use any suitable data structure and/or indexing mechanism.

Referring back to FIG. 1A, the storage module 130 may further comprise a log storage module 135 configured to store data on the storage medium 140 in a log structured storage configuration (e.g., in a storage log). As used herein, a "storage log" or "log structure" refers to an ordered arrangement of data within the storage address space 144 of the storage medium 140. Data in the storage log may comprise and/or be associated with persistent metadata. Accordingly, the storage module 130 may be configured to store data in a contextual, self-describing format. As used herein, a contextual or self-describing format refers to a data format in which data is stored in association with persistent metadata. In some embodiments, the persistent metadata may be configured to identify the data and, as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like.

The storage module 130 may further comprise a log management module 136 configured to manage portions of the log (log segments). The log management module 136 may comprise a groomer 137 configured to reclaim and/or reinitialize log storage resources, such as log segments, media storage units, media storage divisions (e.g., erase blocks), virtual storage units, virtual storage divisions (e.g., groups of erase blocks), and the like. As disclosed in further detail herein, the log management module 136 may further comprise a log coordination module 138 configured to coordinate log management operations with I/O clients 106.

Figure 1C:
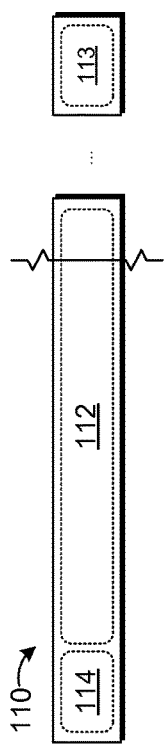
FIG. 1C depicts one embodiment of a contextual data storage format.

FIG. 1C illustrates one embodiment of a contextual data format. The data packet format 110 of FIG. 1C comprises a data segment 112 and persistent metadata 114. The data segment 112 may be of any arbitrary length and/or size. The persistent metadata 114 may be embodied as one or more header fields of the data packet 110. The persistent metadata 114 may be configured to define the logical interface of the data segment 112 and, as such, may include and/or reference the LID(s) associated with the data segment 112. The persistent metadata 114 may be further configured to associate the data segment 112 with a particular application, user, I/O client 106, upper-level log, and/or the like. Although FIG. 1C depicts a packet format 110, the disclosure is not limited in this regard and could associate data (e.g., data segment 112) with persistent, contextual metadata in other ways, including, but not limited to, an index on the storage medium 140, a separate metadata channel, and/or the like.

In some embodiments, the log storage module 135 is further configured to associate data packets 110 with sequence information 113. The sequence information 113 may be used to determine the relative order of the data packets 110 stored on the storage medium 140. In some embodiments, the log storage module 135 and/or storage controller 139 are configured to assign sequence information 113 to sections of the storage medium 140. The sections may correspond to storage divisions, erase blocks, logical erase blocks, and/or the like. Each section may be capable of storing a plurality of data packets 110. The log storage module 135 may be configured to append data packets 110 sequentially within the physical address space of the respective sections of the storage medium 140 (by use of the storage controller 139). The relative position of data packets 110 within a section may determine the relative order of the data packets 110 within the section. The order of the sections of the storage medium 140 may be determined by use of, inter alia, sequence information 113 of the sections. The sequence information 113 may be assigned to respective sections of the storage medium 140 when the sections are initialized for use (e.g., erased), programmed, closed, and/or the like, such that the sequence information 113 defines an ordered sequence of sections within the storage address space 144. Accordingly, the order of a data packet 110 within the storage log may be determined by: a) the relative position of the data packet 110 within a particular storage division and b) the order of the storage division relative to other storage divisions in the storage address space 144.

Figure 1D:
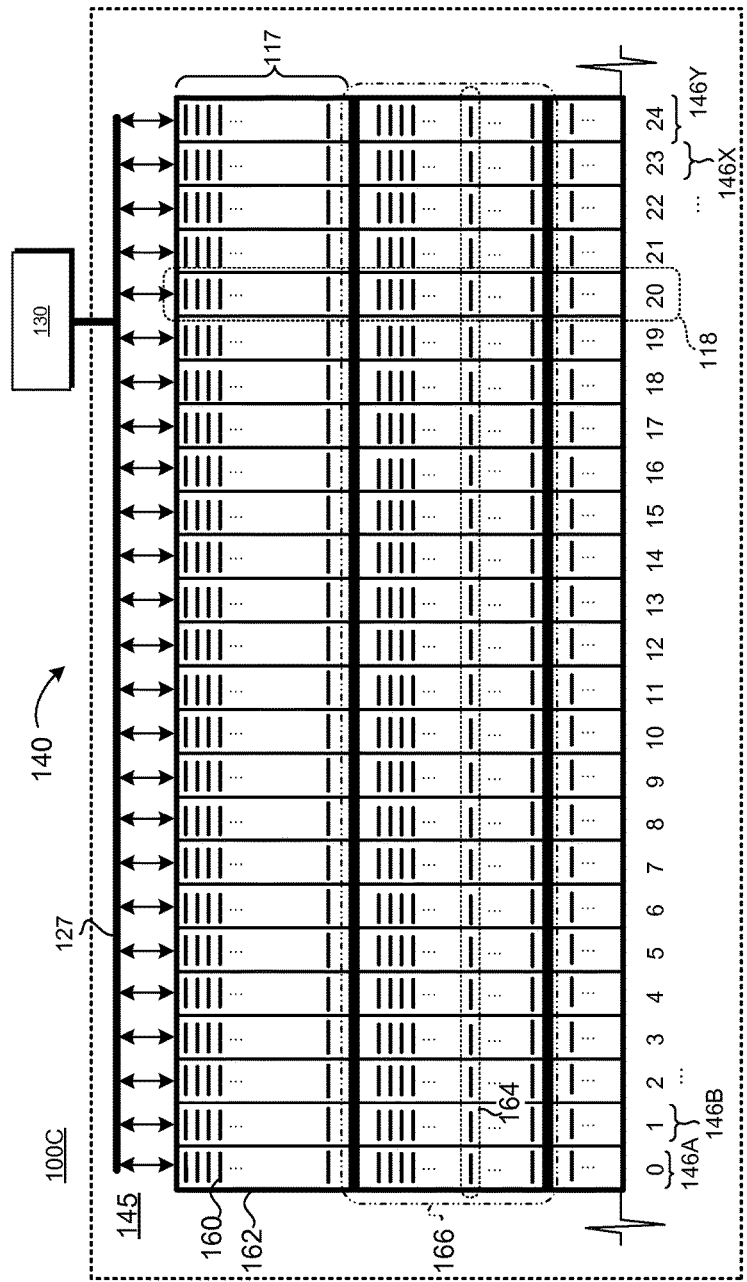
FIG. 1D is a schematic block diagram of one embodiment of a storage array.

Referring to FIG. 1D, in some embodiments, the storage medium 140 may comprise a solid-state storage array 145. As used herein, a solid-state storage array (or storage array 145) refers to a plurality of solid-state storage elements 146A-Y managed in parallel. The solid-state storage elements 146A-Y may comprise solid-state storage resources embodied as a package, chip, die, plane, printed circuit board, and/or the like. The solid-state storage elements 146A-Y comprising the array 145 may be communicatively coupled to the storage module 130 in parallel by the interconnect 127 (through the storage controller 139). The interconnect 127 may be capable of communicating data, address, and/or control information to each of the solid-state storage elements 146A-Y. The storage module 130 may be configured to leverage the parallel connection of the interconnect 127 to manage the solid-state storage elements 146A-Y as a single, logical storage element (array 145). In some embodiments, the interconnect 127 comprises a separate, independent communication channel to/from each solid-state storage element 146A-Y. Alternatively, or in addition, signals on the interconnect 127, such as command and/or addressing information, may be shared between a plurality of the solid-state storage elements 146A-Y.

The solid-state storage elements 146A-Y may comprise media storage units 160. As used herein, a media storage unit 160 refers to any unit of storage on a solid-state storage element 146A-Y including, but not limited to: a page, a sector, a block, and/or the like. The storage medium 140 may be a "write-once" storage medium, comprising media storage units 160 that can only be reliably programmed once after initialization, such that the media storage units 160 must be reinitialized each time new data is written or programmed thereto. Accordingly, the media storage units 160 may have a "writeable" or "initialized," state in which the media storage units 160 are capable of having data programmed thereon, and a "written" state in which the media storage units 160 have been programmed with data and, as such, must be reinitialized before being used to store new data.

In some embodiments, the storage medium 140 may be "asymmetric," such that different storage operations have different time latencies. In some embodiments, for example, read operations may be faster than write/program operations, and write/program operations may be faster than initialization operations (e.g., reading the media may be hundreds of times faster than erasing, and tens of times faster than programming the storage medium). The solid-state storage elements 146A-Y may be partitioned into respective media storage divisions 162. As used herein, a media storage division 162 refers to a section, sector, segment, block and/or division of a solid-state storage element 146A-Y including, but not limited to: a block, an erase block, an erase sector, and/or the like. The media storage divisions 162 may comprise a plurality of media storage units 160. The media storage units 160 of a media storage division 162 may be initialized as a group, such that a single erase operation on a media storage division 162 is configured to initialize a plurality of media storage units 160. The solid-state storage array 145 may comprise columns 118 and rows 117. The columns 118 may correspond to respective solid-state storage elements 146A-Y, and the rows may correspond to media storage units 160 and/or divisions 162 within the array 145. Although FIG. 1D depicts one embodiment of a solid-state storage array 145 comprising solid-state storage elements 146A-Y having a particular configuration, the disclosure is not limited in this regard and could be adapted to arrange solid-state storage elements 146A-Y partitioned in any suitable manner, in any suitable configuration.

The storage module 130 may be configured to perform storage operations on groups of media storage units 160 and/or media storage divisions 162. As disclosed above, it may take longer to program data onto the solid-state storage elements 146A-Y than it takes to read data therefrom (e.g., ten times as long). Moreover, in some embodiments, data may only be programmed media storage units 160 that have been initialized (e.g., are in a writeable state). Initialization operations may take longer than program and/or read operations. Managing groups of solid-state storage elements 146A-Y in the storage array 145 (and/or independent banks, as disclosed below), may allow the storage module 130 to address these asymmetric properties.

In some embodiments, the storage module 130 is configured to perform data write and/or read operations within virtual storage units 164 (e.g., virtual pages) of the solid-state storage array 145. As illustrated in FIG. 1D, a virtual storage unit 164 may comprise media storage units 160 within a particular row 117 of the array 145 (e.g., a media storage unit 160 on each of a plurality of solid-state storage elements 146A-Y). The storage module 130 may be further configured to manage storage recovery and/or initialization operations using virtual storage divisions 166, which may comprise media storage divisions 162 within respective rows 117 of the array 145 (e.g., a media storage division 162 (physical erase block) on each of a plurality of the solid-state storage elements 146A-Y). An operation to read or write data to a virtual storage unit 164 may comprise programming data to each of 25 media storage units 160 (e.g., one media storage unit 160 per solid-state storage element 146A-Y); an operation to initialize (e.g., erase) a virtual storage division 166 may comprise initializing 25 media storage divisions 162 (e.g., erase blocks); and so on. Since the columns 118 of the array 145 are independent, storage operations may be performed across different sets and/or portions of the array 145. For example, a read operation on the array 145 may comprise reading data from media storage unit 160 at a first address of solid-state storage element 146A and reading data from a media storage unit 160 at a different address within one or more other solid-state storage elements 146B-N.

In some embodiments, portions of the solid-state storage array 145 may be configured to store data, and other portions of the array 145 may be configured to store error detection and/or recovery information. A column 118 used for data storage may be referred to as a "data column," and a column 118 used to store error detection and/or recovery information may be referred to as a "parity column" or "recovery column." In the FIG. 1D embodiment, the array 145 may be configured in an operational mode in which the solid-state storage element 146Y is used to store parity data, and the other solid-state storage elements 146A-X are used to store data. In this operational mode, the effective storage capacity of the virtual storage units 160 (e.g., rows 117) may be reduced (e.g., reduced from 25 pages to 24 pages). As used herein, the "effective storage capacity" of a storage unit refers to the number of storage units or divisions that are available to store data and/or the total amount of data that can be stored within a particular virtual storage unit 164. The operational mode described above may be referred to as a "24+1" configuration, denoting that 24 physical storage units 160 are available to store data, and 1 of the physical storage units 160 is used for parity information. The disclosed embodiments are not limited to any particular operational mode and/or configuration, however, and could be adapted to use any number of the solid-state storage elements 146A-Y to store error detection and/or recovery data.

Figure 2A:
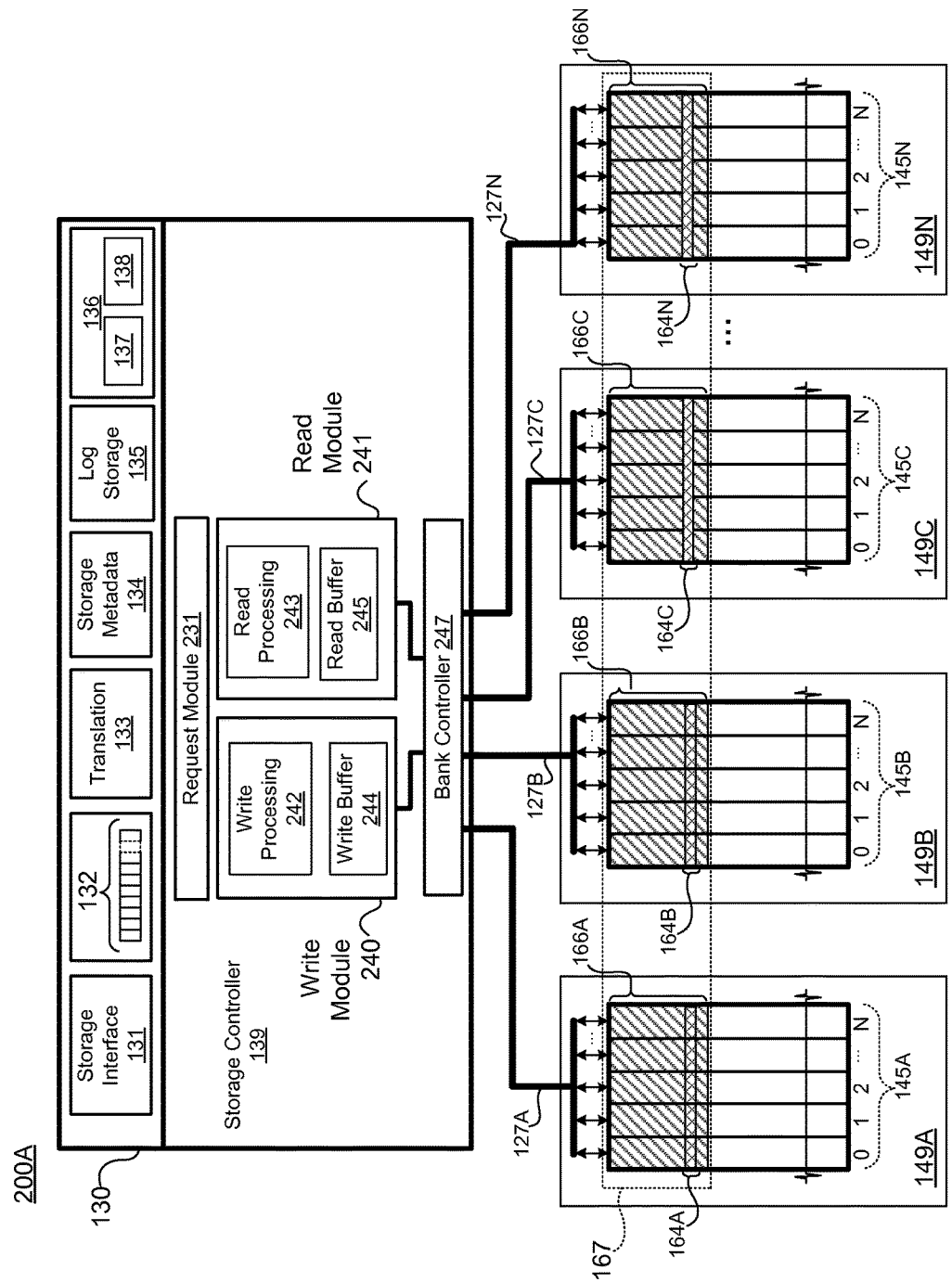
FIG. 2A is a schematic block diagram of another embodiment of a storage module.

FIG. 2A depicts one embodiment of a storage system 200A comprising a storage module 130 configured to manage a storage medium 140. In the FIG. 2A embodiment, the storage medium 140 comprises a plurality of independent banks 149A-N, each of which may comprise one or more storage arrays 145A-N, as disclosed above.

The storage controller 139 may comprise a storage request module 231 configured to receive storage requests from the storage module 130. The storage request module 231 may be further configured to transfer data to/from the storage module 130 and/or I/O clients 106. Accordingly, the storage request module 231 may comprise one or more direct memory access (DMA) modules, remote DMA modules, bus controllers, bridges, buffers, and the like.

The storage controller 139 may comprise a write module 240 configured to store data on the storage medium 140 in response to requests received via the request module 231. The requests may comprise and/or reference a logical interface of the data to be written to the storage medium 140. The write module 240 may be configured to store the data in a self-describing storage log, which, as disclosed above, may comprise appending data packets 110 sequentially within the storage address space 144 of the storage medium 140. The data packets 110 may comprise and/or reference the logical interface of the data (e.g., may comprise the LID(s) associated with the data), as disclosed herein. The write module 240 may comprise a write processing module 242 configured to process data for storage on the storage medium 140, which may include, but is not limited to: a) compression processing, b) encryption processing, c) encapsulating data into respective data packets 110 (and/or other containers), d) performing error-correcting code (ECC) processing, and so on. The write module 240 may further comprise a write buffer 244 configured to buffer data for storage on media storage units 160 of the storage medium 140. In some embodiments, the write buffer 244 may comprise one or more synchronization buffers configured to synchronize a clock domain of the storage controller 139 with a clock domain of the storage medium 140 (and/or interconnect 127A-N).

The log storage module 135 may be configured to select storage unit(s) for data storage operations and may provide addressing and/or control information to the storage arrays 145A-N of the independent banks 149A-N. The log storage module 135 may be configured to append data sequentially in a log format within the storage address space 144 of the storage medium 140, as disclosed herein.

Storage operations to write data on the storage medium 140 may comprise: a) appending one or more data packets to the storage log on the storage medium 140 and b) updating storage metadata 134 (forward map 150) to associate LID(s) of the data with the storage addresses of the one or more data packets on the storage medium 140. In some embodiments, the storage metadata 134 may be maintained by use of memory resources of the storage controller 139 (e.g., volatile memory resources of the storage device 141 comprising the storage medium 140). Alternatively, or in addition, portions of the storage metadata 134 may be maintained within the storage module 130 (e.g., on a volatile memory 102 of the computing device 110 of FIG. 1A). In some embodiments, the storage metadata 134 may be maintained in a volatile memory by the storage module 130, and may be periodically stored on the storage medium 140 (or other persistent storage resource).

The storage controller 139 may further comprise a data read module 241 configured to read data from the storage log on the storage medium 140 in response to requests received via the request module 231. The read requests may comprise LID(s) of the requested data, a storage address of the requested data, and/or the like. The read module 241 may be configured to: a) determine the storage address(es) of the data packet(s) 110 comprising the requested data by use of, inter alia, the forward map 150, b) read the data packet(s) 110 from the determined storage address(es) on the storage medium 140, and c) process data for use by the requesting entity. Data read from the storage medium 140 may stream into the read module 241 via a read buffer 245. The read buffer 245 may comprise one or more read synchronization buffers for clock domain synchronization, as described above. A read processing module 243 may be configured to process data read from the storage medium 140, which may include, but is not limited to, one or more of: a) decompression processing, b) decryption processing, c) extracting data from one or more data packet(s) 110 (and/or other containers), d) performing ECC processing, and so on.

The storage controller 139 may further comprise a bank controller 247 configured to selectively route data and/or commands of the write module 240 and/or read module 241 to/from particular independent banks 149A-N. In some embodiments, the storage controller 139 is configured to interleave storage operations between the independent banks 149A-N. The storage controller 139 may, for example, read from a virtual storage unit 164A of array 145A in bank 149A by use of the read module 241 while data from the write module 240 is being programmed to another virtual storage unit 164B-N of another bank 149B-N. Further embodiments of multi-bank storage operations are disclosed in U.S. patent application Ser. No. 11/952,095, entitled, "Apparatus, System, and Method for Managing Commands for Solid-State Storage Using Bank Interleave," filed Dec. 12, 2006 for David Flynn et al., which is hereby incorporated by reference in its entirety.

The write processing module 242 may be configured to encode data packets 110 into ECC codewords. As used herein, an ECC codeword refers to data and corresponding error detection and/or correction information. The write processing module 242 may be configured to implement any suitable ECC algorithm and/or generate ECC codewords of any suitable type, which may include, but are not limited to, data segments and corresponding ECC syndromes, ECC symbols, ECC chunks, and/or other structured and/or unstructured ECC information. ECC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic error-correcting codes, BCH codes, and/or the like. The write processing module 242 may be configured to generate ECC codewords of a pre-determined size. Accordingly, a single packet may be encoded into a plurality of different ECC codewords and/or a single ECC codeword may comprise portions of two or more packets. Alternatively, the write processing module 242 may be configured to generate arbitrarily sized ECC codewords. Further embodiments of error-correcting code processing are disclosed in U.S. patent application Ser. No. 13/830,652, entitled, "Systems and Methods for Adaptive Error-Correction Coding," filed Mar. 14, 2013 for Jeremy Fillingim et al., which is hereby incorporated by reference in its entirety.

As disclosed above, the storage module 130 is configured to interleave storage operations between independent banks 149A-N of solid-state storage arrays 145A-N, which may further ameliorate performance issues caused by asymmetry between erase, program, and read operations. The banks 149A-N may comprise one or more solid-state storage arrays 145A-N, which, as disclosed herein, may comprise a plurality of solid-state storage elements 146A-Y coupled in parallel to the storage module 130 through respective interconnects 127A-N. The banks 149A-N may be capable of independent operation. Data may be read from virtual storage unit 164A within the array 145A of bank 149A while data is being programmed to virtual storage unit 164B of bank 149B, and/or as virtual storage division 166N is being initialized.

The storage module 130 may be further configured to manage groups of virtual storage divisions 166A-N. As depicted in FIG. 2A, a virtual storage division group (VSDG) 167 may comprise virtual storage divisions 164A-N of banks 149A-N. In some embodiments, the VSDG 167 comprises a virtual storage division 166 within each array 145A-N. Accordingly, the VSDG 167 may comprise N virtual storage divisions 166. The virtual storage divisions 164A-N of the VSDG 167 may be initialized together (e.g., erased in response to a single erase command and/or in response to a plurality of separate erase commands and/or signals on the interconnects 127A-N). Performing storage recovery and/or initialization operations on groups of virtual storage divisions (e.g., VSDGs 167) that comprise a large number of media storage divisions 164 may further mask the asymmetric properties of the solid-state storage medium 140.

In some embodiments, the storage module 130 is configured to perform storage operations within boundaries of the arrays 145A-N and/or banks 149A-N. As disclosed above, write and/or program operations may be performed within rows 117 of the solid-state storage arrays 145A-N (e.g., on virtual storage units 164A-N of respective banks 149A-N). As depicted in FIG. 2A, the virtual storage units 164A-N of the arrays 145A-N may not extend beyond the respective boundaries of the arrays 145A-N and/or banks 149A-N. The log storage module 135 and/or bank controller 247 may be configured to append data to the solid-state storage medium 140 by interleaving and/or scheduling storage operations sequentially between the arrays 145A-N of the banks 149A-N.

Figure 2B:
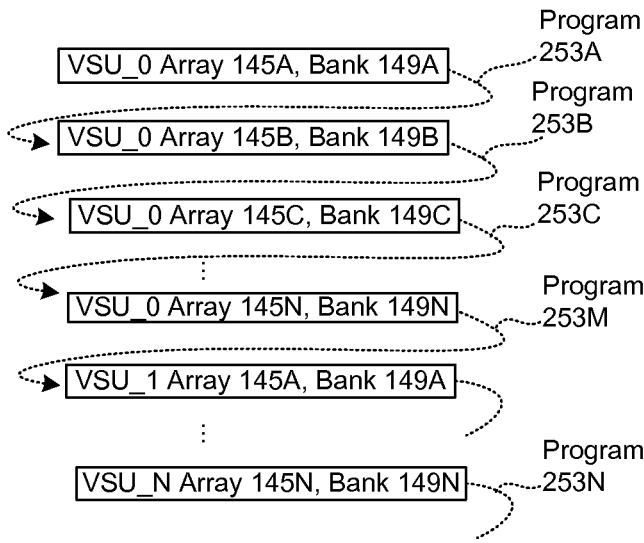
FIG. 2B depicts one embodiment of a sequential, interleaved storage pattern within independent banks of solid-state storage arrays.

FIG. 2B depicts one embodiment 200B of storage operations that are interleaved between a plurality of independent banks 149A-N. In the FIG. 2B embodiment, the bank interleave controller 247 is configured to interleave programming operations on virtual storage units 164A-N within respective arrays 145A-N of banks 149A-N. As disclosed above, the write module 240 may comprise a write buffer 250, which may have sufficient capacity to fill write buffers of one or more virtual storage units 164 of an array 145A-N. In response to filling the write buffer 250 (e.g., buffering data sufficient to fill a threshold amount of a virtual storage unit 164), the storage controller 139 may stream the contents of the write buffer 250 to program buffers of the solid-state storage elements 146A-Y of one of the banks 149A-N. The storage controller 139 may issue a program signal to the corresponding solid-state storage array 145A-N configured to write the contents of the program buffers to respective media storage units 160A-N of the elements 146A-Y. The log storage module 135 and/or bank interleave controller 247 may be configured to provide control and addressing information to the solid-state storage elements 146A-Y of the array 145A-N by use of the interconnects 127A-N, as disclosed herein.

Figure 2C:
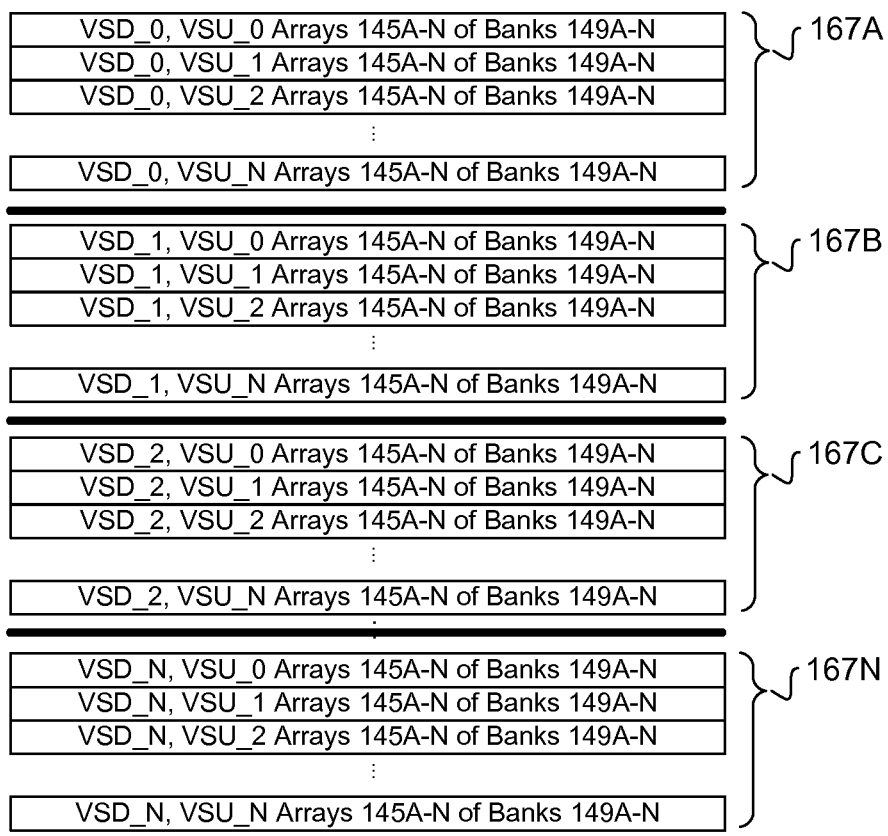
FIG. 2C depicts further embodiments of interleaved storage patterns.

The bank controller 247 may be configured to append data to a storage log on the storage medium 140 according to a sequential, bank interleave pattern. FIG. 2C depicts one embodiment 200C of a sequential, bank interleave pattern configured to latency due to asymmetry between read and write operations. The bank interleave pattern may be configured to sequence operations between virtual storage units 164 within the banks 149A-N. As depicted in FIG. 2C, data may be programmed to a first virtual storage unit 164 (VSU_0) of array 145A in bank 149A in a program operation 253A. The storage controller 139 may then stream data to a first virtual storage unit 164 (VSU_0) of the array 145B in the next bank 149B. Data may then be programmed to VSU_0 of array 145B of bank 149B in a program operation 253B. The program operation 253B may be performed concurrently with the program operation 253A on array 145A of bank 149A; the storage controller 139 may be configured to stream data to array 145B and/or issue a command and/or signal for the program operation 253B, while the program operation 253A is being performed on the array 145A. Data may be streamed to and/or programmed on the first logical page (VSU_0) of the arrays 145C-N of the other banks 149C-119N following the same sequential interleave pattern (e.g., after data is streamed and/or programmed to VSU_0 of array 145A of bank 149B, data is streamed and/or programmed to VSU_0 of array 145C of bank 149C in program operation 253C, and so on). Following the programming operation 253M on VSU_0 of array 145N within the last bank 149N, the storage controller 139 may be configured to begin streaming and/or programming data to the next virtual storage unit 164 (VSU_1) of array 145A within the first bank 149A, and the interleave pattern may continue accordingly (e.g., program VSU_1 of array 145B of bank 149B, followed by VSU_1 of array 145C of bank 149C through VSU_1 of array 145N of bank 149N, followed by VSU_2 of array 145A of bank 149A, and so on). Following a program operation 253N to the last virtual storage unit N of the last bank 145N, the interleave pattern may continue back at VSU_0 of array 145A in bank 149A (in accordance with the availability of writeable virtual storage divisions 166, as disclosed herein).

Sequentially interleaving programming operations between the independent banks 149A-N may increase the time between concurrent programming operations on the same array 145A-N and/or bank 149A-N, which may reduce the likelihood that the storage operations will have to be delayed due to, inter alia, asymmetric media programming latency. As disclosed above, programming operations may take significantly longer than other operations, such as read and/or data streaming operations (e.g., operations to stream the contents of the write buffer 250 to an array 145A-N via the bus 127A-N). The interleave pattern of FIG. 2C may be configured to avoid consecutive program operations on the same array 145A-N and/or bank 149A-N; programming operations on a particular array 145A-N may be separated by N−1 programming operations on other banks (e.g., programming operations on array 145A are separated by programming operations on arrays 145A-N). As such, programming operations on array 149A are likely to be complete before another programming operation needs to be performed on the array 149A.

As disclosed above in conjunction with FIG. 2A, the storage module 130 may be configured to manage groups of virtual storage divisions, such as VSDGs 167, which may comprise virtual storage divisions 166A-N within respective banks 149A-N. FIG. 2C illustrates another embodiment 200C of a sequential, bank interleave pattern with respect to VSDGs 167A-N. As disclosed herein, the VSDGs 167A-N may comprise virtual storage divisions 166A-N within different banks 149A-N (e.g., VSDG 167A may comprise virtual storage division VSD_0 of each array 145A-N, VSDG 167B may comprise virtual storage division VSD_1 of each array 145A-N, and so on). As illustrated in FIG. 2C, the storage controller 130 may be configured to program data to virtual storage units 164 (VSU_0-N) of a first virtual storage division group 167A according to the sequential, bank interleave pattern of FIG. 2B. Subsequent to programming data to the last virtual storage unit 164 (VSU_N) of the first virtual storage division 166 (VSD_0) of bank 145N, the storage module 130 may resume the sequential, bank interleave pattern within the next virtual storage division group 167B. Subsequent to programming data to the last virtual storage unit 164 (VSU_N) of the second virtual storage division 166 (VSD_1) of bank 145N, the storage module 130 may resume the sequential, bank interleave pattern within the next virtual storage division group 167C, and so on. The sequential, bank interleave pattern may continue until the last VSDG 167N is filled, at which point the interleave pattern may continue at the first erase block group VSDG_0 (or next writeable VSDG 167).

As disclosed herein, the storage module 130 may be configured to perform media management operations on large numbers of media storage units 160 in parallel in order to address write-once, asymmetric properties of the storage medium 140. As disclosed above, a "write-once" storage medium refers to a storage medium that can only be reliably programmed once, and/or must be reinitialized (e.g., erased) each time new data is written or programmed thereon. A write-once storage medium may, therefore, have a "writeable" or "initialized" state in which the storage medium is capable of having data programmed thereon, and a "written state" in which the storage medium has had data programmed thereon and, as such, must be initialized before being used to store new data. Due to the asymmetric properties of the storage medium 140, initialization operations may take significantly longer than other storage operations. Accordingly, the storage module 130 may be configured to initialize groups, sets, and/or collections of media storage units 160 and/or media storage divisions 162 in parallel.

The sequential, bank interleave pattern disclosed herein may be configured to program data to VSDG 167A-N in sequence (e.g., program data to VSDG 167A before programming data to VSDG 167B, and so on). As such, the storage module 130 may be configured to perform media management operations at a VSDG 167A-N granularity (e.g., perform management operations on respective VSDGs 167A-N). Initializing a VSDG 167A-N may comprise initializing each of the virtual storage divisions 166 within the respective VSDG 167A-N. Initializing VSDG 167A may, therefore, comprise initializing the first virtual storage division (VSD_0) within each array 145A-N of banks 149A-N, initializing the VSDG 167B may comprise erasing the next virtual storage division (VSD_1) within each array 145A-N of banks 119A-N, initializing VSDG 167C may comprise initializing a third virtual storage division (VSD_2) within each array 145A-N of banks 149A-N, initializing VSDG 167N may comprise erasing a last virtual storage division (VSD_N) within each array 145A-N of banks 149A-N, and so on. Initializing a VSDG 167A-N may further comprise relocating valid data stored on the VSDG 167A-N (if any) and erasing the VSDG 167A-N. Following erasure, the VSDG 167A-N may be made available for write operations, which may comprise placing the VSDG 167A-N in a write queue of the log storage module 135, marking the VSDG 167A-N as writeable (in the storage metadata 134), marking the VSDG 167A-N with sequence information 113, and/or the like. Accordingly, in embodiments comprising four banks 149A-N, each bank 149A-N comprising a respective solid-state storage array 145A-N comprising 25 storage elements 146A-Y, initializing a VSDG 167A-N may comprise initializing 100 media storage divisions 162 in parallel (e.g., initializing 100 erase blocks in parallel). Although particular multi-bank embodiments are disclosed herein, the disclosure is not limited in this regard and could be configured using any multi-bank architecture comprising any number of banks 149A-N, comprising arrays 145A-N having any number of solid-state storage elements 146A-Y. Further embodiments of systems and methods for arranging data for storage within a solid-state storage array are disclosed in U.S. patent application Ser. No. 13/784,705, entitled "Systems and Methods for Adaptive Data Storage," filed on Mar. 4, 2013 for David Flynn et al., which is hereby incorporated by reference in its entirety.

Due to the asymmetric, write-once properties of the storage medium 140, modifying a data segment "in-place" on a particular media storage unit 160 may require erasing the entire media storage division 162 comprising the data (and/or the corresponding virtual storage division 166 and/or VSDG 167) and rewriting the modified data along with the other data on the particular media storage division 162, virtual storage division 166 and/or VSDG 167, resulting in"write amplification," which may reduce performance and excessively wear the storage medium 140. In some embodiments, therefore, the storage module 130 may be configured to write data "out-of-place" on the storage medium 140. As used herein, writing data "out-of-place" refers to updating and/or overwriting data at different storage unit(s) rather than overwriting the data "in-place" (e.g., overwriting the original physical storage unit of the data). Updating and/or overwriting data out-of-place may avoid write amplification, since existing, valid data on the erase block with the data to be modified need not be erased and recopied. Moreover, writing data out-of-place may remove media initialization (erasure) from the latency path of many storage operations.

The storage module 130 may be configured to perform storage operations out-of-place by use of the log storage module 135. The log storage module 135 may be configured to append data at a current append point within the storage address space 144 in a manner that maintains the relative order of storage operations performed by the storage module 130, forming a "storage log" on the storage medium 140. As used herein, a "storage log" refers to a data storage configuration configured to define a relative order of storage operations performed on the storage medium 140. The storage log may comprise a plurality of "storage log segments" or "log segments." As used herein, a "log segment" refers to a collection of storage units and/or storage units that are managed and/or initialized as a group (a set of log storage units). A log segment may include, but is not limited to: a media storage division 162 (e.g., an erase block), a virtual storage unit 164, a virtual storage division 166, a virtual storage division group 167, and/or the like. As used herein, a "log storage unit" of a log segment can include, but is not limited to: a media storage unit 160 (e.g., a page, sector, block and/or the like), a virtual media storage unit 164, and/or the like. The size and/or storage capacity of a log segment may correspond to the number and/or configuration of log storage units included therein. For example, a log segment comprising 2,000 media storage units 160 each capable of storing 1 kb of data, may have a storage capacity of 2 MB.

The log storage module 135 may be configured to append data within respective log segments within storage address space 144 of the storage device 141 (e.g., according to the sequential, bank interleave patterns of FIGS. 2B and 2C). The log management module 136 of the storage module 130 may be configured to groom the log segments, which may comprise initializing log segments for use by the log storage module 135 by, inter alia: a) relocating valid data on the log segment (if any), and b) erasing the log segment.

Figure 3A:
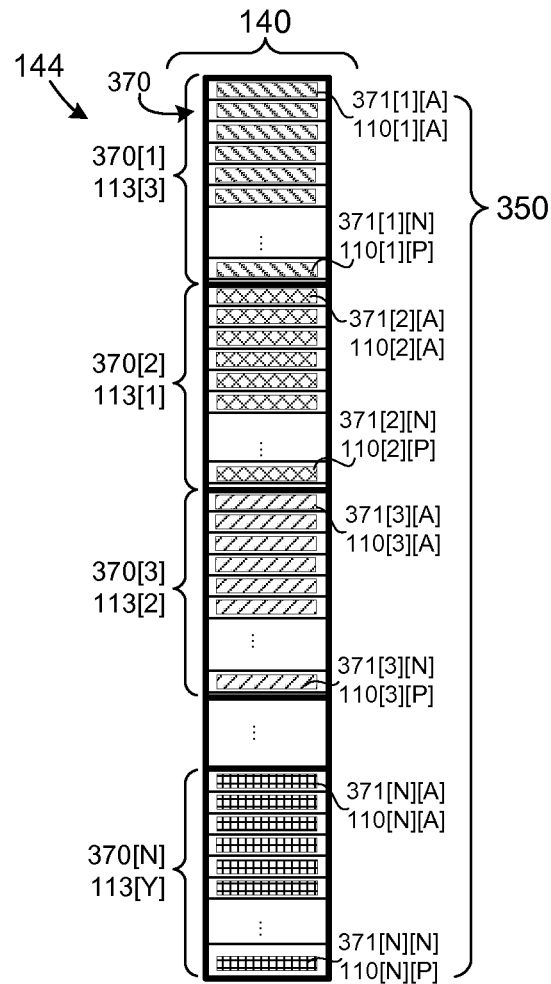
FIG. 3A depicts one embodiment of a storage log.
Figure 3A:
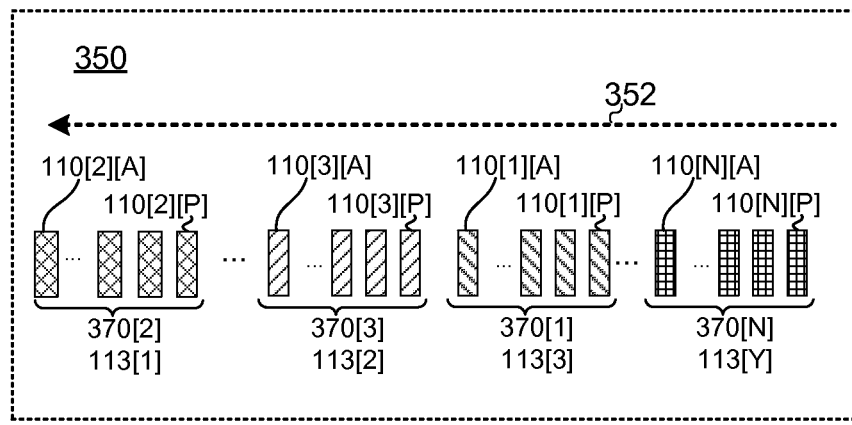

FIG. 3A depicts one embodiment 300A of a storage log 350 comprising data stored sequentially within log segments 370 (e.g., log segments 370[1]-370[N]) by the storage module 130. As disclosed herein, a log segment 370 refers to a collection, group, and/or set of commonly managed log storage units 371. The log storage units 371 of the log segments 370 may comprise a plurality of log storage units 371A-N capable of storing data (e.g., data packets 110), as disclosed above. Accordingly, the log storage units 371 may comprise storage units 160 (e.g., pages, sectors, blocks, and/or the like), virtual storage units (e.g., pages on a plurality of storage elements 146A-N in a particular bank 149A-N), and/or the like. A log segment 370 may correspond to a collection of log storage units 371 that are reclaimed, recovered, and/or reinitialized as a group. Accordingly, the groomer 137 may be configured to perform grooming operations within respective log segments 370. In some embodiments, the log segments 370 may comprise virtual storage divisions 166 and/or virtual storage division groups 167 of a solid-state storage array 145. The disclosure is not limited in this regard, however, and could use log segments 370 comprising any storage medium 140 including, but not limited to: a magnetic storage medium (e.g., a hard disk drive), persistent random access memory (e.g., battery-backed RAM), an optical storage medium, and/or the like.

A grooming operation to reinitialize a log segment 370 may comprise: a) relocating valid data stored within the log segment 370 (if any), and b) reinitializing the log segment 370. In embodiments comprising log segments 370 corresponding to a solid-state storage array 145, reinitializing a log segment 370 may comprise erasing the physical erase blocks 162, virtual erase blocks 166, and/or virtual erase block groups 167 comprising the log segment 370. The groomer 137 may be configured to erase the log segment 370 in a simultaneous operation and/or by use of a single and/or common erase command transmitted to a plurality of storage elements 146 and/or banks 149, as disclosed herein. In other embodiments, the log segments 370 may comprise a different storage medium, such as a hard disk, battery-backed RAM, and/or the like. In these embodiments, reinitializing the log segment 370 may comprise marking the log segment 370 as available for storage operations, writing a predetermined pattern to the log segment 370 (e.g., zeros), and/or the like.

The storage log 350 may comprise data stored with persistent metadata configured to determine a log order 352 of data stored within the respective log storage units 371 of the log segments 370 (e.g., log order 352 of data packets 110[A][0]-110[N][P]). The log storage module 135 may be configured to append data packets 110 sequentially within the storage address space 144 (e.g., within log segments 370[1]-370[N]), by use of the log storage module 135 and/or storage controller 139. The order in which data is appended within the respective log segments 370[1]-370[N] may be determined according to the availability of erased and/or initialized log segments 370[1]-370[N], as disclosed in further detail herein. The log storage module 135 may be configured to fill the respective log segments 370[1]-370[N] before appending data to other log segments 370[1]-370[N]. The log segments 370[1]-370[N] may be filled according to a sequential, bank interleave storage pattern as disclosed above in conjunction with FIGS. 2A and 2B.

In the FIG. 3A embodiment, the log storage module 135 may have stored data packets 110[1][A]-110[1][P] sequentially in the storage address space of log segment 370[1] (e.g., within the log storage units 371[1][A]-371[1][N]), such that data packet 110[1][P] is later in the storage log (stored more recently) relative to data packet 110[1][A]. FIG. 3A further illustrates data packets 110 stored sequentially within the log storage units 371 of other log segments 370[2]-370[N]: data packets 110[2][A]-110[2][P] are stored sequentially within log storage units 371[2][A]-371[2][N] of log segment 370[2], data packets 110[3][A]-110[3][P] are stored sequentially within log storage units 371[3][A]-371[3][N] of log segment 370[3], data packets 110[N][A]-110[N][P] are stored sequentially within log storage units 371[N][A]-371[N][N] of log segment 370[N], and so on.

The storage module 130 may mark log segments 370[1]-370[N] with respective sequence information 113[1]-113[Y], configured to define the order in which the log segments 370[1]-370[N] were programmed. Accordingly, the order in which the data packets 110[1][A]-110[N][P] were stored within the respective log segments 370[1]-370[N] may be defined by, inter alia, sequence information 113[1]-113[Y] of the log segments 370[1]-370[N]. In some embodiments, the sequence information 113[1]-113[Y] may be stored at predetermined locations within the log segments 370[1]-370[N] (e.g., in a header, at a predetermined offset, and/or the like). The sequence information 113[1]-113[Y] may be stored when the log segments 370[1]-370[N] are initialized (e.g., erased) by the log management module 136, placed in a write queue by the log management module 136, selected for use by the log storage module 135, when data is appended to the log segments 370[1]-370[N], when the log segments 370[1]-370[N] are closed (e.g., filled), and/or the like.

In the FIG. 3A embodiment, the sequence information 113[Y] may correspond to the most recently programmed (youngest) log segment 370[1]-370[N] in the storage log 350, and the sequence information 113[1] may correspond to the earliest programmed (oldest) log segment 370[1]-370[N]. Therefore, and as illustrated in FIG. 3A, the log order 352 of the log segments 370[1]-370[N] may be 370[N] (most recently programmed or youngest), 370[1], 370[3], to 370[2] (least recently programmed or oldest). The order of the individual data packets 110[1][A]-110[N][P] within the storage log 350 may be determined based on the sequence information 113[1]-113[Y] of the respective log segments 370[1]-370[N] and the relative storage unit(s) of the data packets 110[1][A]-110[N][P] within the log segments 370[1]-370[N]. In the FIG. 3A embodiment, the log order 352 from most recent to oldest is: 110[N][P]-110[N][A], 110[1][P]-110[1][A], 110[3][P]-110[3][A], and 110[2][P]-110[2][A].

Figure 3B:
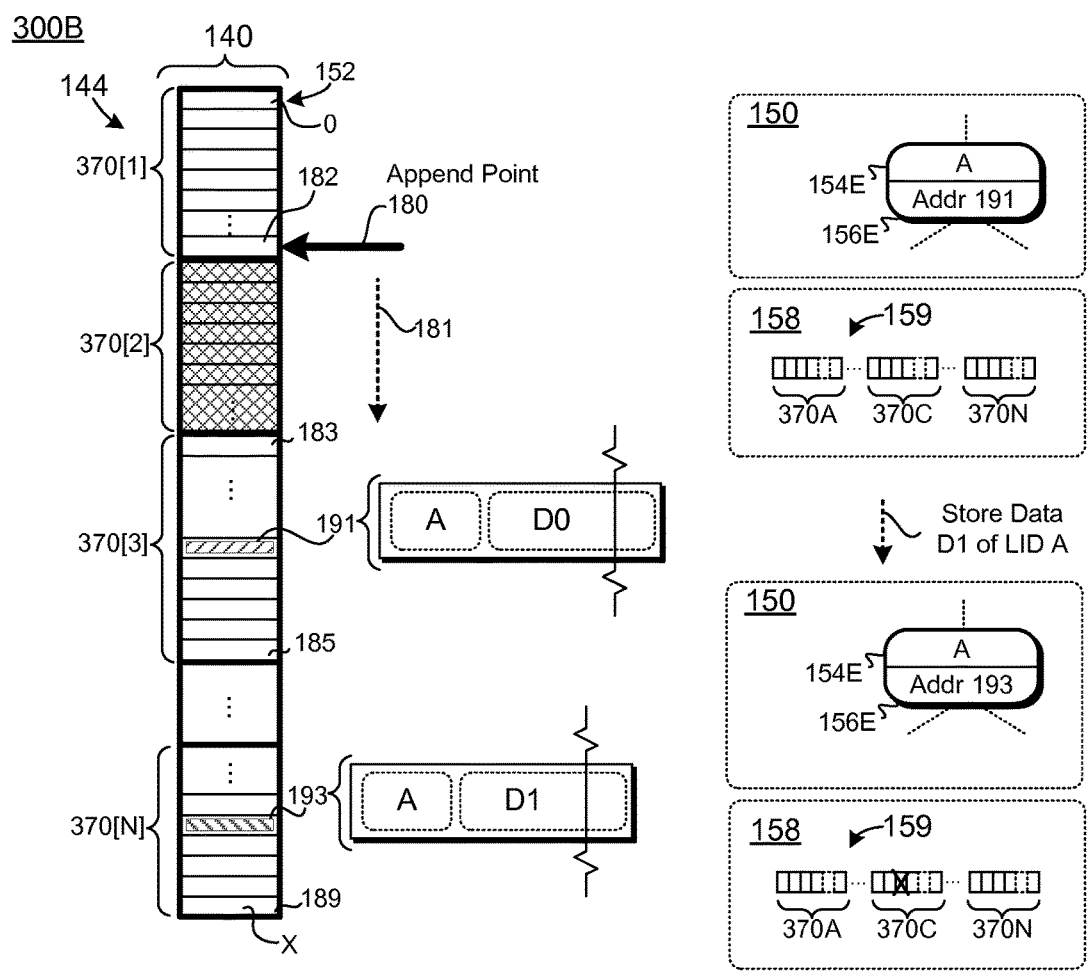
FIG. 3B depicts embodiments of log storage operations of a storage module.

FIG. 3B depicts one embodiment 300B of storage operations, performed by the storage module 130, configured to append data to an ordered storage log 350. As disclosed herein, the storage module 130 may be configured to manage the storage address space 144 as a plurality of log segments 370[1]-370[N], which may comprise a set of commonly managed log storage units 371 (e.g., pages, sectors, blocks, virtual pages, and/or the like). The log storage units 371 may correspond to respective storage addresses within the storage address space 144 (e.g., storage address 0 of storage division 370[1] through storage address X of storage division 370[N]).

The log storage module 135 may be configured to store data sequentially within respective storage divisions 370[1]-370[N], by use of the storage controller 139. The log storage module 135 may be configured to sequentially append data packets 110 at a current append point 180 within the storage address space 144. In the FIG. 3B embodiment, the current append point 180 corresponds to storage unit 182 of log segment 370[1]. The log storage module 135 may be configured to sequentially increment the append point 180 within the log segment 370[1] until the storage division 370[1] is fully programmed (and/or filled within a threshold or boundary condition). The append point 180 may be incremented within the log segment 370[1] according to the sequential, interleaved pattern disclosed above).

In response to filling the log segment 370[1], the log storage module 135 may be configured to advance 181 the append point 180 to a next available log storage segment 371[2]-371[N]. As used herein, an "available" log segment 371 refers to a log segment 371 that is "writeable" and/or is in a "writeable state." A "writeable" log segment 371 refers to a log segment 371 comprising media storage units 160 that are writeable (e.g., have been initialized and have not yet been programmed). Conversely, log segments 371 that have been programmed and/or are not initialized are "unavailable," "un-writeable" and/or in an "un-writeable" state. Advancing 181 the append point 180 may comprise selecting a writeable log segment 370[2]-370[N]. As disclosed in further detail herein, in some embodiments, advancing 181 the append point 180 to the next available storage unit may comprise selecting a log segment 370[1]-370[N] from a write queue.

In the FIG. 3B embodiment, the log segment 370[2] may be unavailable for use by the log storage module 135 (e.g., un-writeable) due to not being in an erased/initialized state, being out-of-service due to high error rates, and/or the like. Therefore, after filling the log storage segment 370[1], the log storage module 135 may skip the unavailable storage division 370[2] and advance 181 the append point 180 to the next available storage division 370[3]. The log storage module 135 may be configured to continue appending data to log storage segments 183-185, after which the append point 180 is advanced to a next available log storage segment 370[1]-370[N], as disclosed herein.

Figure 3C:
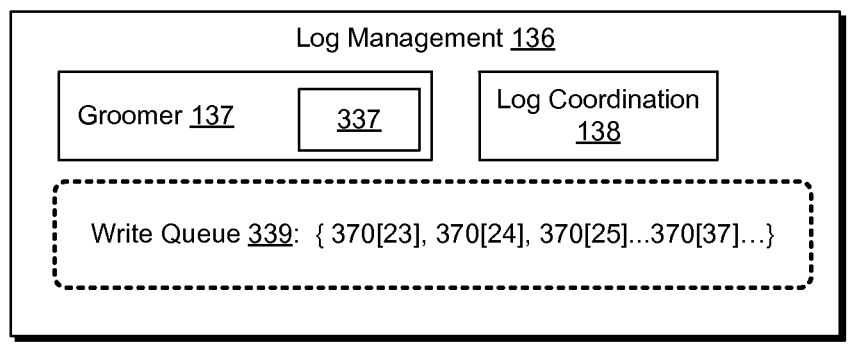
FIG. 3C depicts one embodiment of a media management module.
Figure 3C:
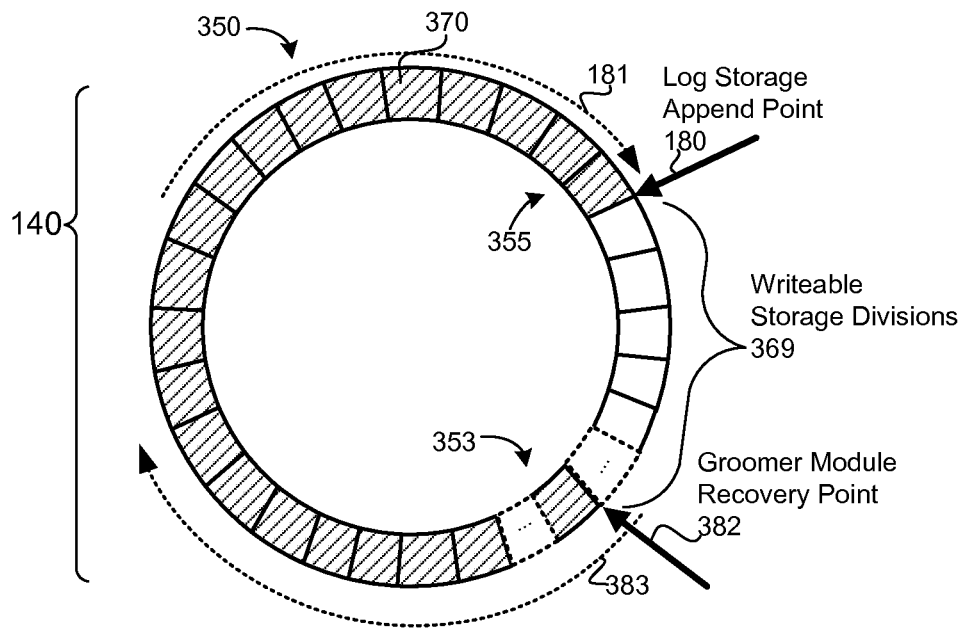

After storing data on the "last" log storage unit within the storage address space 144 (e.g., log storage unit 189 of log segment 370[N]), the log storage module 135 may advance 181 the append point 180 by wrapping back to the first log storage segment 370[1] (or the next available log segment 370[2]-370[N], if the log segment 370[1] is unavailable). Accordingly, the storage module 130 may be configured to manage the storage address space 144 as a loop or cycle (e.g., as illustrated in FIG. 3C).

The log storage format implemented by the storage module 130 may be used to modify and/or overwrite data out-of-place. As disclosed above, performing storage operations out-of-place may avoid performance and/or endurance issues, such as erase latency and/or write amplification. In the FIG. 3B embodiment, a data segment D0 corresponding to LID A may be stored at log storage unit 191 of log segment 370[3]. The data segment D0 may be stored in association with persistent metadata (e.g., in the packet format 110, disclosed above). The data segment 112 of the packet 110 may comprise the data segment D0, and the persistent metadata 114 may comprise the LID(s) associated with the data segment (e.g., LID A). An I/O client 106 may request an operation to modify and/or overwrite the data associated with the LID A, which may comprise replacing the data segment D0 with data segment D1. The storage module 130 may perform this operation out-of-place by appending a new packet 110 comprising the data segment D1 at a different location on the storage medium 140, rather than modifying the existing data in place, at storage unit 191. In the FIG. 3B embodiment, the data segment D1 is stored in a data packet at log storage unit 193 of log segment 370[N]. The storage operation may further comprise updating the storage metadata 134 to bind LID A to the log storage unit 193 and/or to invalidate the obsolete data D0 at storage unit 191. As illustrated in FIG. 3B, updating the storage metadata 134 may comprise updating an entry of the forward map 150 to associate the LID A 154E with the storage address of the modified data segment D1. Updating the storage metadata 134 may further comprise updating one or more reverse indexes and/or validity bitmaps, as disclosed in further detail herein.

Performing storage operations out-of-place (e.g., appending data to the storage log) may result in obsolete and/or invalid data remaining on the storage medium 140 and/or within the storage log 350. As used herein, "invalid data" refers to data that has been overwritten, modified, erased, deleted, deallocated, and/or does not need to be retained on the storage medium 140. As illustrated in FIG. 3B, modifying the data of LID A by appending the data segment D1 to the storage log at log storage unit 193 rather than overwriting and/or replacing the data segment D0 in place at log storage unit 191 results in keeping the obsolete version of the data segment D0 on the storage medium 140. It may not be efficient to immediately remove the obsolete version of the data segment D0 since, as disclosed above, erasing the data segment D0 may involve reinitializing the log segment 370[1], which may comprise a) relocating valid data stored on the log segment 370[1], and b) erasing the log segment 370[1]. Moreover, the log segments 370[1]-370[N] may comprise a large number of media storage units 160 (e.g., a log segment 370 corresponding to a virtual storage division group 167 may comprise 100 erase blocks, each of which may comprise 256 pages, for a total of 2560 media storage units 160). The storage module 130 may, therefore, defer removal of invalid data, which may result in accumulating a significant amount of invalid data on the storage medium 140.

The log management module 136 of the storage module 130 may be configured to reclaim log segments 370, so that the log storage segments 370 can be used to store new, valid data. As disclosed above reclaiming a log segment 370 may comprise copying valid data from the log storage units 371 of the log segment 370 (if any), and erasing the log segment 370. The log management module 136 may be configured to select log segments 370 to be reinitialized and/or identify valid data on the selected log segments 370 by use of the storage metadata 134. In some embodiments, the storage metadata 134 maintained by the storage module 130 comprises a reverse index 158. The reverse index 158 may be configured to, inter alia, identify invalid data within the log segments 370[1]-370[N] of the storage medium 140. In some embodiments, the reverse index 158 comprises one or more validity bitmaps comprising entries 159 configured to identify log storage unit(s) comprising invalid data. The reverse index 158 may be further configured to maintain information pertaining to the media storage units 160 and/or media storage divisions 162 comprising the log segments 370[1]-370[N], which may include, but is not limited to: wear level, reliability characteristics (e.g., error rate), performance characteristics (e.g., read time, write time, erase time, and so on), data age (e.g., time since last program operation, refresh, or the like), read disturb count, write disturb count, and so on. In the FIG. 3B embodiment, storing the data segment D1 of LID A at storage unit 193 renders data segment D0 at storage unit 191 invalid (obsolete). In response, the storage module 130 may be configured to mark the entry 159 associated with storage unit 191 as invalid to indicate that the storage unit 191 comprises data that does not need to be retained on the storage medium 140. Although embodiments of a reverse index 158 and/or validity bitmaps are described herein, the disclosure is not limited in this regard, and could be adapted to mark and/or identify invalid data using any suitable technique including, but not limited to: maintaining a separate validity index, storing validity information on the storage medium 140 (e.g., in the log segments 370[1]-370[N]), and/or the like.

In some embodiments, the storage module 130 is configured to reconstruct the storage metadata 134, including the forward map 150, by using the contents of the storage log 350 on the storage medium 140. In the FIG. 3B embodiment, the current version of the data associated with LID A may be determined based on the relative log order of the data packets 110 at log storage units 191 and 193. Since the data packet at storage unit 193 is ordered after the data packet at storage unit 191 in the storage log 350, the storage module 130 may determine that storage unit 193 comprises the most recent, up-to-date version of the data corresponding to LID A. The storage module 130 may reconstruct the forward map 150 to associate the LID A with the data packet at log storage unit 193 (rather than the obsolete data at log storage unit 191). The storage module 130 may be further configured to mark the storage unit 193 as comprising invalid data that does not need to be retained on the storage medium 140.

As disclosed above, the storage module 130 may comprise a log management module 136 configured to reclaim storage resources occupied by invalid data and/or prepare storage divisions 370[1]-370[N] for use by the log storage module 135. The log management module 136 may be further configured to perform other media management operations including, but not limited to, refreshing data stored on the storage medium 140 (to prevent error conditions due to data degradation, write disturb, read disturb, and/or the like), monitoring media reliability conditions, and/or the like.

In some embodiments, the log management module 136 is configured to operate as a background process, outside of the critical path for servicing storage requests of the I/O clients 106. The log management module 136 may identify log segments 370[1]-370[N] to reclaim by use of the storage metadata 134 (e.g., the reverse index 158). As used herein, reclaiming a log segment 370 refers to erasing the media storage units 160 of the log segment 370 so that new data may be stored/programmed thereon. The storage module 130 may identify log segments 370[1]-370[N] to reclaim based on one or more factors, which may include, but are not limited to, the amount of invalid data stored on the log segment 370[1]-370[N], the amount of valid data in the log segment 370[1]-370[N], wear levels of the log segment 370[1]-370[N] (e.g., number of program/erase cycles), time since the storage division 370[1]-370[N] was programmed and/or refreshed, the relative order of the storage division 370[1]-370[N] within the storage log 350, and so on. The log management module 136 may identify invalid data on the storage medium 140, such as the data segment D0 at storage unit 191, by use of the storage metadata 134 (e.g., the reverse index 158 and/or forward map 150). The log management module 136 may determine that storage units that are not associated with valid identifiers (LIDs) in the forward map 150 and/or are marked invalid in the reverse index 158 comprise invalid data that does not need to be retained on the storage medium 140.

As used herein, a storage recovery operation to reclaim a log segment 370 may comprise: a) identifying valid data stored on the log segment (by use of the storage metadata 134), b) relocating the identified data to other log storage units (e.g., at the current append point 180), and c) initializing the log segment 370 (e.g., erasing the media storage units 160 and/or media storage divisions 162 comprising the log segment 370). Initializing a log segment may further comprise marking the log segment 370 with sequence information 113 configured to identify an order of the log segment 370 within the storage log 350, as disclosed herein (by use of sequence information 113). Further embodiments of systems and methods for reclaiming storage resources are disclosed in U.S. Pat. No. 8,402,201, entitled "Apparatus, System, and Method for Storage Space Recovery in Solid-State Storage," issued on Mar. 19, 2013 to David Flynn et al., which is hereby incorporated by reference in its entirety.

FIG. 3C is a block diagram of one embodiment 300C of a log management module 136 of the storage module 130. The log management module 136 may comprise a groomer 137 configured to manage grooming operations on the storage medium 140, which may include reinitializing log segments 370, as disclosed herein. The log management module 136 may be further configured to manage a write queue 339 that identifies log segments 370 that are in a writeable state (e.g., log segments 370 comprising media storage units 160 that have been erased and/or initialized). The log management module 136 may place log segments 370 into the write queue 339 in response to recovering and/or initializing the write segments 370[1]-370[N], by use of the garbage collection module 337 of the groomer 137. The log storage module 135 may access the write queue 339 to advance the append point 180 within the storage log 350, as disclosed herein. The write queue 339 may be maintained in the storage metadata 134 and/or in separate metadata storage.

The number of log segments 370 in the write queue 339 may determine the amount of write capacity currently available to the storage module 130. As used herein, "write capacity" refers to the amount of capacity that is currently available for storing data on the storage medium 140 (e.g., storage capacity that is in a writeable state). Accordingly, the write capacity may correspond to the number of log segments 370 that are currently in a writeable state. The write capacity may differ from the amount of "free" physical storage capacity on the storage medium 140. As used herein, "free" physical storage capacity refers to physical storage capacity that is not currently in use to store valid data. "Used" or "occupied" physical storage capacity refers to physical storage capacity that is currently being used to store valid data. As disclosed above, the storage module 130 may be configured to write data out-of-place due to the asymmetric, write-once properties of the storage medium 140. Accordingly, data that is invalid and/or obsolete may remain on the storage medium 140 until removed in a storage recovery operation. The media storage units 160 that are occupied by invalid data (and/or are in a non-writeable state) represent storage capacity that could be used to store other, valid data, but are not available to do so until they are reinitialized by the groomer 137.

Referring back to FIG. 3B, after storing D1 at storage unit 193, the storage unit 193 represents "used" physical storage capacity (e.g., storage resources occupied by valid data). The storage unit 191, however, comprises invalid data and, as such, represents "free" physical storage capacity, which is not currently available for use. Although storage unit 191 is "free," it is not usable for write operations until the media storage units 160 of the log segment 370[3] are recovered. Therefore, although the storage unit 191 represents "free" space, the storage unit 191 does not contribute to the available write capacity of the storage medium 140 until it is reinitialized.

Referring again to FIG. 3C, the groomer 137 may be configured to identify and reclaim storage resources by use of the garbage collection module 337. The garbage collection module 337 may be configured to iterate over the log segments 370 comprising the storage log 350 and select log segments 370 for recovery. The garbage collection module 337 may be configured to select log segments 370 for recovery based on the amount of invalid data within the log segments 370, the last program time of the log segments 370, reliability metrics of the media storage units 160 of the log segments 370, and the like. The garbage collection module 337 may be configured to evaluate log segments 370 at a recovery point 382 within the storage address space 144. The recovery point 382 may correspond to a "tail" region 353 of the storage log 350. As used herein, the tail region 353 of the storage log 350 refers to a region of the log 350 comprising older log segments 370 (e.g., log segments 370 programmed earlier than other, more recent log segments 370, such as the log segment 370[2] of FIG. 3A). Conversely, the "head" region 355 comprises log segments 370 that were programmed more recently to the storage log 350. The garbage collection module 337 may be configured to evaluate and/or reclaim log segments 370 within the tail region 353 before evaluating and/or reclaiming log segments 370 in the head region 355. The garbage collection module 337 may, therefore, be configured to traverse the storage log 350 in reverse log order 383 (e.g., from older log segments 370 to more recent log segments 370).

The groomer 137 may be configured to schedule storage recovery operations at a rate configured to ensure that the log storage module 135 has sufficient write capacity to efficiently satisfy write requests of the I/O clients 106. Accordingly, the groomer 137 may be configured to schedule storage reclamation operations to occur at a similar rate to which the log storage module 135 is appending data to the storage medium 140 at the append point 180. The groomer 137 may prioritize garbage collection operations to ensure that the log storage module 135 has sufficient writeable storage divisions 369 in the write queue 339 to satisfy write requests from the I/O clients 106.

I/O clients 106 may access storage services of the storage module 130 through the storage interface 131. Some I/O clients 106 may be configured for operation with solid-state storage systems. Some I/O clients 106, for example, may be configured to provide deallocation hints and/or messages to the storage module 130 to identify LIDs and/or data that has been erased and/or no longer needs to be retained on the storage medium 140. In response, the storage module 130 may be configured to invalidate the corresponding data on the storage medium 140 (and/or deallocate the corresponding LIDs), which may enable the groomer 137 to operate more efficiently by reducing the amount of data that is relocated when the log segment(s) 370 comprising the deallocated data are recovered. Further embodiments of systems and methods for coordinating deallocation between I/O clients 106 and the storage module 130 are disclosed in U.S. Pat. No. 8,261,005, entitled, "Apparatus, System, and Method for Managing Data in a Storage Device with an Empty Data Token Directive," issued Sep. 4, 2012 to David Flynn et al., and U.S. patent application Ser. No. 14/045,605, entitled "Systems and Methods for Persistent Address Space Management," filed Oct. 4, 2013 to David Atkisson et al., each of which is hereby incorporated by reference in its entirety.

In some embodiments, one or more I/O clients 106 may be configured to perform log storage operations within the logical address space 132 (e.g., upper-level log storage operations). As used herein, an "upper-level log" refers to a log storage paradigm within a particular namespace, such as the logical address space 132. Accordingly, an upper-level log may be defined and/or implemented within an ordered sequence of LIDs, LID ranges, extents, and/or the like. As disclosed above, an upper-level log may include, but is not limited to: a logical log (e.g., a log comprising a set, range, and/or extent of LIDs within the logical address space 132), an application log, a database log, a file system log, an operating system log, a transaction log, and/or the like. Some storage systems may provide deterministic, one-to-one mappings between the logical address space 132 and the storage address space 144, such that the structure and/or configuration of a upper-level log corresponds to the structure and/or configuration of data on the storage medium 140. The storage module 130 disclosed herein, however, may implement storage operations out-of-place within a storage log 350, and without predetermined mappings between LIDs and the storage address space 144 (e.g., using the any-to-any mappings of the forward map 150). Accordingly, the structure and/or configuration of the upper-level log of the I/O client 106 may not correspond to the underlying storage log 350 of the storage module 130. Accordingly, a upper-level log may be referred to as a "front-end" log and/or "upper-level" log.

Figure 4A:
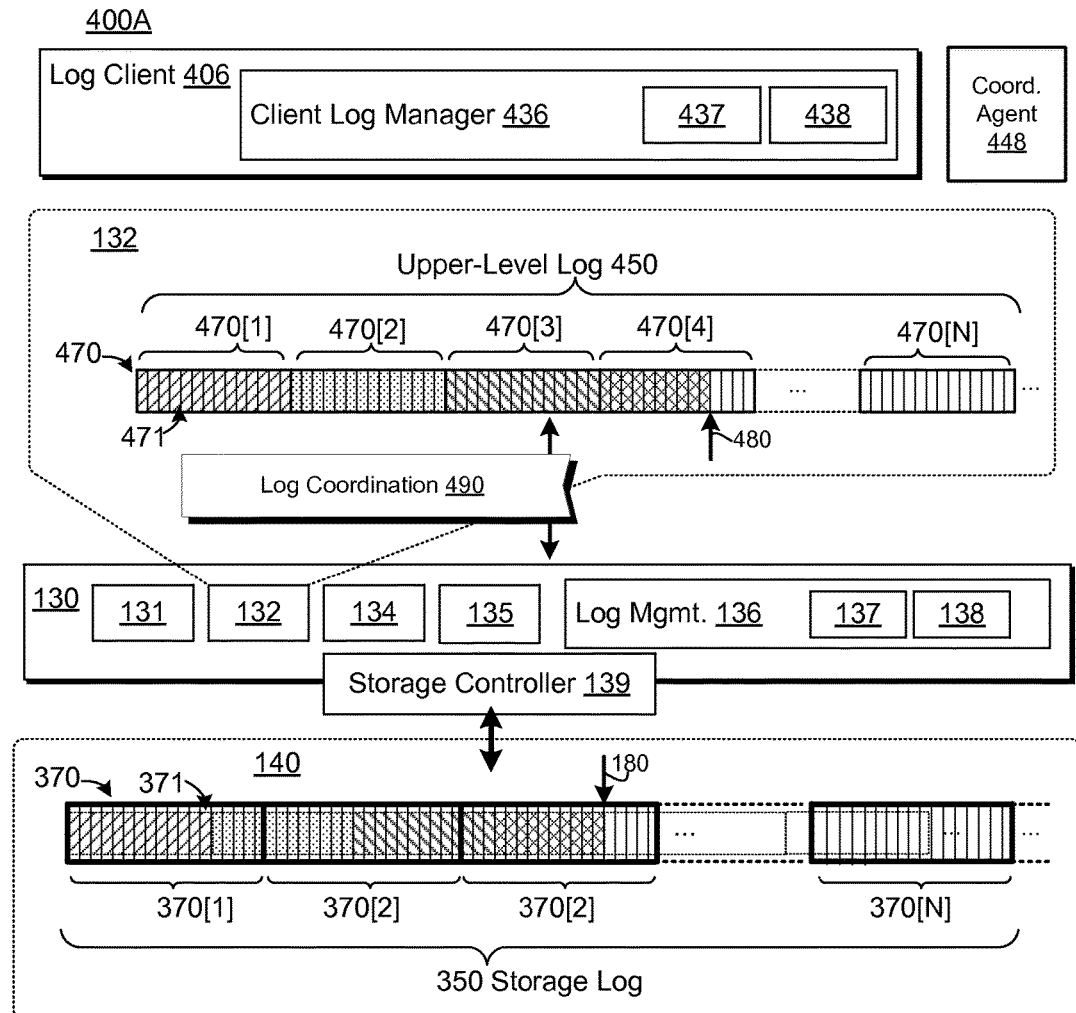
FIG. 4A depicts log management operations of a storage module.

In some embodiments, the storage module 130 may be configured to coordinate log storage operations of an I/O client 106 in accordance with the storage log 350. FIG. 4A depicts one embodiment 400A of a log client 406 configured to manage an upper-level log 450 within the logical address space 132 of the storage module 130. The upper-level log 450 may comprise a portion of the logical address space 132 presented by the storage module 130. Accordingly, the upper-level log 450 may comprise a set, range, and/or extent of LIDs allocated to the log client 106 within the logical address space 132. The log client 406 may perform log storage operations within segments 470 of the upper-level log 450. As used herein, a segment 470 of the upper-level log 450 or "upper-level log segment" refers to a quantum of logical storage resources in which the log client 406 performs log operations. Accordingly, a segment 470 of the upper-level log 450 may comprise a set, group, collection range and/or extent of logical storage units 471 (e.g., LIDs) within the logical address space 132.

The log client 406 may comprise a client log management (CLM) module 436 configured to manage log storage operations within the upper-level log 450. The CLM module 436 may be configured to perform log management operations in accordance with the granularity of the segments 470. In particular, the CLM module 436 may be configured to append data sequentially within respective segments 470 (e.g., at the append point 480 within log segment 470[4]) and/or using other log storage techniques. The CLM module 436 may be further configured to reclaim segments 470 of the upper-level log 450. Reclaiming a segment 470 may comprise selecting an upper-level log segment 470 (e.g., segment 470[1]) for recovery based on a suitable metric (e.g., the amount of invalid data in the segment 471[1], age of the segment 471[1], access metrics, and/or the like), relocating valid data stored within the segment 470[1] (if any), and marking the segment 470[1] as available to store log data. The CLM module 436 may be further configured to deallocate the segment 470[1] by, inter alia, issuing deallocation hints and/or messages to the storage module 130 (e.g., TRIM messages) to indicate that data of the segment 470[1] do not need to be retained on the storage medium 140. Alternatively, or in addition, a coordination agent 448 may be configured to communicate configuration pertaining to the upper-level log 450 to the storage module 130 (and vice versa). The coordination agent 448 may be configured to monitor operations within the upper-level log 450 and/or to issue log coordination messages 490 to from the log client 406 and/or storage module 130. The coordination agent 448 may be adapted to configure the upper-level log 448 in accordance with the log coordination information (e.g., set the size, capacity, and/or configuration of the upper-level log segments 470, as disclosed below).

The log client 406 may implement log storage operations by use of the storage module 130, which may comprise issuing storage requests to the storage module 130 through the interface 131. The storage module 130 may implement the storage requests of the log client 406 by appending data of the requests to the storage log 350, as disclosed herein (e.g., writing data within respective log storage units 371 at an append point 180). Accordingly, the upper-level log 450 may be embodied on and/or within the storage log 350 on the storage medium 140 as a "log-on-a-log."

The log management module 138 may comprise a log coordination module 138 configured to coordinate log configuration and/or log storage operations with I/O clients 106 in order to, inter alia, improve the performance and/or efficiency of log storage operations. In some embodiments, the log coordination module 138 is configured to provide log coordination information to I/O clients 106, such as the log client 406. The log coordination information provided by the log coordination module 138 may include, but is not limited to: information pertaining to the state of the storage log 350, information pertaining to the size and/or configuration of the segments 370 comprising the storage log 350, information pertaining to grooming operations within storage log 350 (e.g., activity of the groomer 137), information pertaining to the storage capacity within the storage log 350, and the like. The log coordination module 138 may provide log coordination information in response to requests and/or queries received through the storage interface 131. The storage module 130 may, for example, be configured to provide information pertaining to the storage log 350 through one or more extensions to a block device interface, by use of I/O control parameters, and/or the like. Alternatively, or in addition, requests and/or queries for log coordination information of the storage module 130 may be received through separate APIs and/or interfaces. In some embodiments, the log coordination module 138 is configured to push log coordination information to the I/O clients 106 by transmitting and/or broadcasting log coordination messages and/or hints to the storage clients 106.

The log coordination module 138 may be further configured to adapt the storage log 350 in response to information pertaining to other, upper-level logs (e.g., an application log and/or the like). The log coordination module 138 may be configured to access log coordination information of one or more I/O clients 106 (e.g., the log client 406). The client log coordination information may include, but is not limited to: the state of the upper-level log 450, the size and/or configuration of the segments 470 of the upper-level log 450, information pertaining to grooming operations within the upper-level log 450, validity information pertaining to upper-level log segments 470, upper-level log segment boundaries, and so on. The log coordination module 138 may be configured to acquire client log coordination information in response to requests and/or queries to the log client 406 (e.g., to the client log management module 436). The requests and/or queries may be issued through the storage interface 131 (e.g., as a callback parameter, or the like), through an API and/or interface of the log client 406, and/or the like.

In some embodiments, the log coordination module 138 is configured to exchange log coordination information with I/O clients 106 (e.g., log client 406). The log coordination module 138 may be configured to exchange metadata pertaining to the storage log 350 (e.g., log coordination messages 490) with the I/O clients 106 and/or receive metadata pertaining to one or more upper-level logs. The log coordination module 138 may exchange log coordination messages 490 using any suitable technique including, but not limited to: interfaces and/or APIs (e.g., receiving log coordination information through the storage interface 131), messaging protocols, storage interface(s) (e.g., through storage interface commands, parameters and/or the like), I/O control parameters and/or settings, through storage operations (e.g., data written to particular LIDs and/or addresses within the logical address space 132), and/or the like. The log coordination module 138 may be configured to publish and/or broadcast information pertaining to the storage log 350 by use of the log coordination messages 490. The log coordination module 138 may be further configured to receive log coordination messages 490 pertaining to one or more upper-level logs 450. Accordingly, the log coordination module 138 may be configured to receive client log coordination information pushed and/or broadcast by the log client 406 using log coordination messages and/or hints 490.

In some embodiments, the log coordination module 138 may be configured to indicate the size of the log segments 370 of the storage log 350 to the log client 406 (e.g., by providing log coordination information to the log client 406, as disclosed herein). The size and/or configuration of the segments 470 of the upper-level log 450 may be adapted in response to the size and/or configuration of the storage log segments 370. Since the segments 470 of the upper-level log 450 are defined in the logical address space 132, the log client 406 may be capable of utilizing log segments 470 or any arbitrary size. In other embodiments, the storage module 130 may be configured to adjust the size of the log segments 370 in accordance with the size of the segments 470 of the upper-level log 450. Adjusting the size of the log segments 370 may comprise modifying the number of media storage units 160, media storage divisions 162, and/or virtual storage divisions 166 included in each segment log segment 370. In some embodiments, adjusting the log segments 370 may comprise modifying the number of virtual storage divisions 166 in the virtual storage division groups 167 comprising the log segments 370. The disclosure is not limited in this regard, however, and could be adapted to modify the size and/or granularity of the segments 370 using any suitable technique and/or mechanism.

The log coordination module 138 may be configured to coordinate the size of the segments 370 and/or 470 to reduce write amplification in grooming operations, such as storage recovery. As illustrated in FIG. 4A, the log segments 370 of the storage log 350 are larger than the segments 470, such that the log segments 470 cross the boundaries of the log segments 370. Therefore, invalidating and/or reclaiming a log segment 470 may comprise invalidating data within two (or more) segments of 370 of the storage log 350. Moreover, grooming a segment 370 of the storage log 350 may result in fragmenting the data of the one or more segments 470 of the upper-level log 450 within the storage address space 144.

Figure 4B:
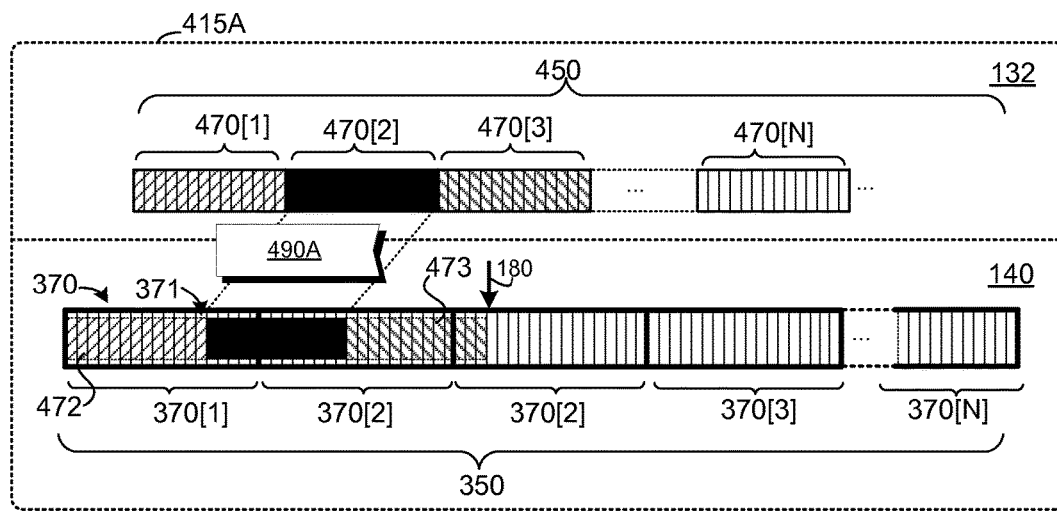
FIG. 4B depicts embodiments of log coordination operations.
Figure 4B:
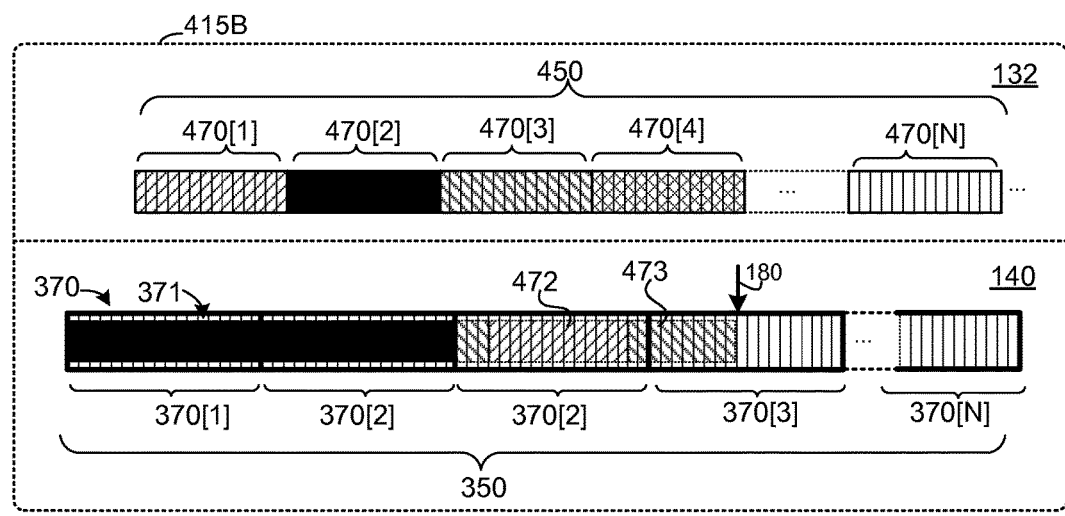

FIG. 4B depicts one embodiment of log coordination operations of the storage module 130. As illustrated in state 415A, the log client 406 has appended data to segments 470[1]-470[3] within the upper-level log 450. Subsequently, the log client 406 may invalidate segment 470[2], which may comprise invalidating the LIDs and/or data corresponding to the segment 470[2] within the storage log 350. Since the size of the segments 470 are not coordinated with the size of the segments 370, invalidating the segment 470[2] invalidates portions of a plurality of storage log segments 370 (segments 370[1] and 370[2]). Reclaiming the storage resources corresponding to the segment 470[2] in the storage log 350 may, therefore, comprise reclaiming storage resources corresponding to segments 370[1] and 370[2].

In some embodiments, the log client 406 is configured to deallocate log segments 470 by reusing the LIDs corresponding to the segments 470 (e.g., overwriting the segments 470). Alternatively, or in addition, the log client 406 may be configured to deallocate log segments 470 by use of a log coordination message 490A. The log coordination message 490A may comprise a deallocation hint configured to indicate that the LIDs of upper-level log segment 470[2] have been deallocated by the log client 406, such that data corresponding to the LIDs does not need to be retained on the storage medium 140. The log coordination message 490A may, therefore, include, but is not limited to: a deallocation hint, a deallocation directive or command, a TRIM hint or message, a TRIM directive or command, an erase hint or message, an erase directive or command, and/or the like. The storage module 130 may use the log coordination message 490A to invalidate data corresponding to upper-level log segment 470[2] within the storage log segments 370[1] and 370[2]. The log coordination module 138 may use the log coordination messages 490A to, inter alia, improve the efficiency of grooming operations within the storage log 350. As illustrated above, the log coordination messages 490A may identify data that does not need to be retained on the storage medium. In response to such messages, the log coordination module 138 may record that data of the corresponding log storage units 371 does not need to be retained on the storage medium 140 (e.g., by updating the reverse index 158, validity bitmap entries, and/or the like).

In some embodiments, the log coordination module 138 stores persistent data on the storage medium 140 configured to identify the erased or invalid data (e.g., a persistent TRIM note). Further embodiments of systems and methods for recording validity information are disclosed in U.S. patent application Ser. No. 14/045,605 entitled, "Systems and Methods for Persistent Address Space Management," filed Oct. 3, 2013 for David Atkisson et al., which is hereby incorporated by reference in its entirety. When the groomer 137 recovers the storage log segment(s) 370 corresponding to the data, the groomer 137 may erase the segments 370 without relocating data identified as invalid by the log coordination messages 490A. Accordingly, synchronizing validity information between the upper-level log 450 and storage log 350 (e.g., by use of the log coordination messages 490A) may improve grooming performance, reduce write amplification, and improve storage availability.

State 415B illustrates a recovery operation within segments 370 of the storage log 350 in response to deallocation of segment 470[2] in the upper-level log 450. As illustrated above, due to the relative sizes and/or offsets between the segments 470 of the upper-level log 450 and the segments 370 of the storage log 350, invalidating the segment 470[2] may affect portions of the log segments 370[1] and 370[2]. In response to the segment 470[2] being deallocated by the log client 406, the groomer 137 may be configured to compact the corresponding storage log segments 370[1] and 370[2] by: a) relocating valid data stored within segments 370[1] and 370[2]; and b) erasing the log segments 370[1] and 370[2]. As disclosed herein, erasing the log segments 370[1] and/or 370[2] may comprise erasing a plurality of storage divisions 162 (e.g., erase blocks) within a virtual erase block 166 and/or virtual erase block group 167.

The log management operations depicted in states 415A and 415B may result in write amplification. As illustrated above, reinitializing the log segments 370[1] and 370[2] comprises rewriting the valid data 472 and 473 within the storage log, resulting in write amplification. Furthermore, the valid data 472 and 473 may correspond to other segments 470 of the upper-level log 450, such that relocating the valid data 472 and 473 fragments the corresponding log segments 470 within the storage log 350 (e.g., data of the corresponding log segments 470 are no longer stored contiguously within the storage address space 144).

The log coordination module 138 may be configured to reduce write amplification (and log fragmentation) by coordinating log storage operations between the upper-level log 450 and the storage log 350. In some embodiments, the log coordination module 138 is configured to provide log coordination information to the log client 406, which, as disclosed herein, may include information pertaining to the size and/or configuration of the log segments 370. In response, the log client 406 may adapt the size and/or configuration of the segments 470 of the upper-level log 450 accordingly.

Figure 4C:
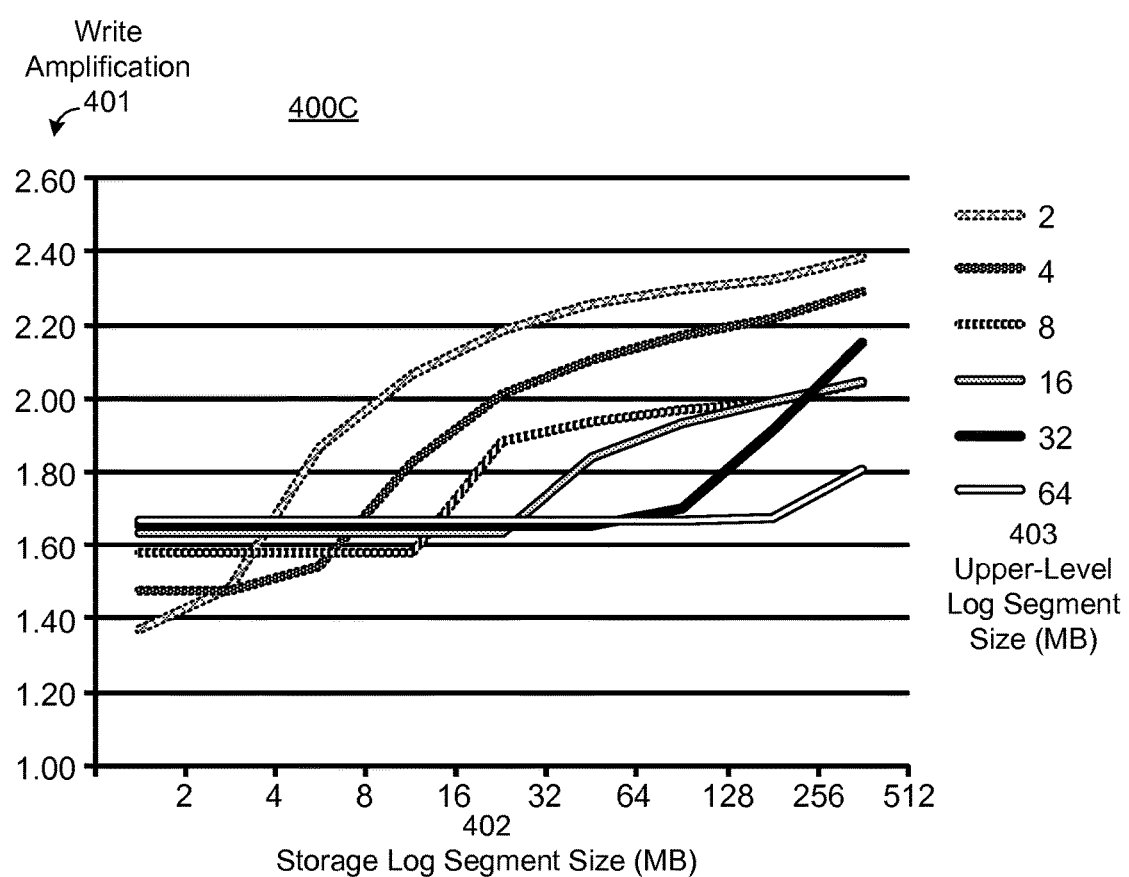
FIG. 4C is a plot illustrating write amplification levels corresponding to different combinations of upper- and lower-level log segment sizes.

In some embodiments, the log coordination module 138 may be further configured to determine an ideal and/or optimal configuration for the size and/or configuration of the segments 470 of the upper-level log 450 and/or the size and/or configuration of the segments 370 of the storage log 350. The configuration and/or size of the segments 470 and/or 370 may be optimized to reduce write amplification. FIG. 4C depicts one embodiment of a plot 400C that depicts write amplification levels 401 corresponding to combinations of storage segment sizes 402 and upper-level log segment sizes 403. As depicted in FIG. 4C, lower write amplification levels are achieved by configuring the log segments 470 to be as least as large as the underlying segments 370 of the lower-level storage log 350. Accordingly, the log coordination module 138 may be configured to indicate an optimal size and/or configuration for the segments 470 of the upper-level log 450 that is at least as large as the segments 370 of the storage log 350. The log coordination module 138 may be configured to provide log coordination hints and/or messages indicating the size of the storage log segments 370 and/or the optimal configuration for the upper-level log 450. The log client 406 may adapt the segments 470 of the upper-level log 450, according to the determined optimal configuration.

In some embodiments, the log coordination module 138 may be configured to modify the size and/or configuration of the segments 370 of the storage log 350 based on the size and/or configuration of the segments 470 of the upper-level log 450. The log coordination module 138 may configure the segments 370 to have a size that is less than (or equal to) the size of the segments 470 of the upper-level log 450. The storage module 130 may modify the size of the log segments 370 by modifying the size and/or extent of the virtual storage division groups 167. Referring back to FIG. 2A, the virtual storage division groups 167 comprise N virtual storage divisions 164A-N. The storage module 130 may modify the size of the storage log segments 370 by managing virtual storage division groups 167 comprising different numbers of virtual storage divisions (e.g., splitting virtual storage division groups 167 comprising N virtual storage divisions 166 into M sub-groups, each comprising N/M virtual storage divisions 166). The bank controller 247 may be configured to interleave programming operations within the sub-groups, and the groomer 137 may be configured to manage grooming operations within the respective sub-groups. In other embodiments, the storage module 130 may be configured to modify the size of the log segments 370 by modifying a compression ratio of the write module 240; the size of the storage log segments 370 may be increased by increasing the compression ratio of the write module 240, and may be decreased by decreasing the compression ratio of the write module 240.

Referring to FIG. 4A, in some embodiments, a coordination agent 448 is adapted to configure one or more of the upper-level log 450 and/or lower-level, storage log 350 in response to the log coordination information disclosed herein. The coordination agent 448 may be adapted to configure the size, capacity, and/or configuration of the segments 470 of the upper-level log 450 in accordance with an optimal size, capacity, and/or configuration, as disclosed herein. Configuring the size, capacity, and/or configuration of the segments 470 may comprise updating data of the log client 406, such as configuration files, policy, settings, and/or the like. In some embodiments, the coordination agent 448 is configured to determine the optimal configuration for the upper-level log 450 (by use of the log coordination module 138, log coordination messages 490, and/or the like), and to reconfigure and/or restart the log client 406 in accordance with the determined optimal configuration. Although particular embodiments for modifying a size of the storage log segments 370 are provided herein, the disclosure is not limited in this regard, and could be adapted to modify the size and/or configuration of the storage log segments 370 using any suitable technique and/or mechanism. The log coordination module 138 may be configured to modify the size and/or configuration of the segments 370 in response to information pertaining to the upper-level log 450, as disclosed herein.

Figure 5A:
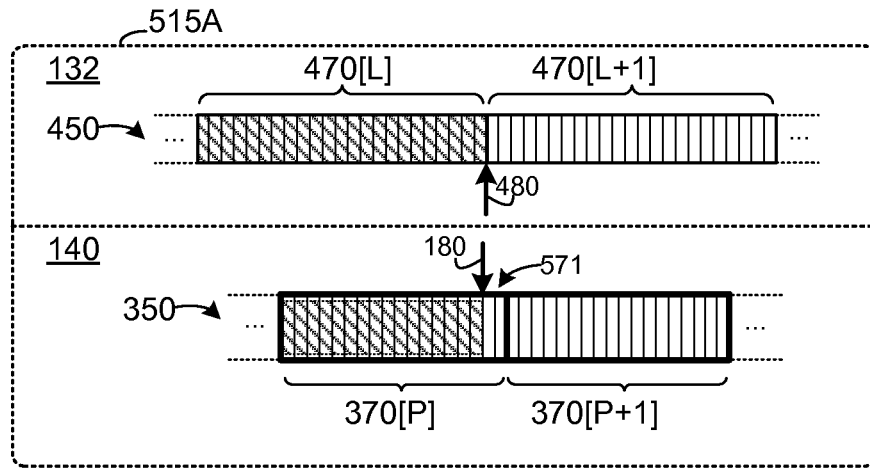
FIG. 5A depicts embodiments of log coordination operations pertaining to log segment boundary conditions.
Figure 5A:
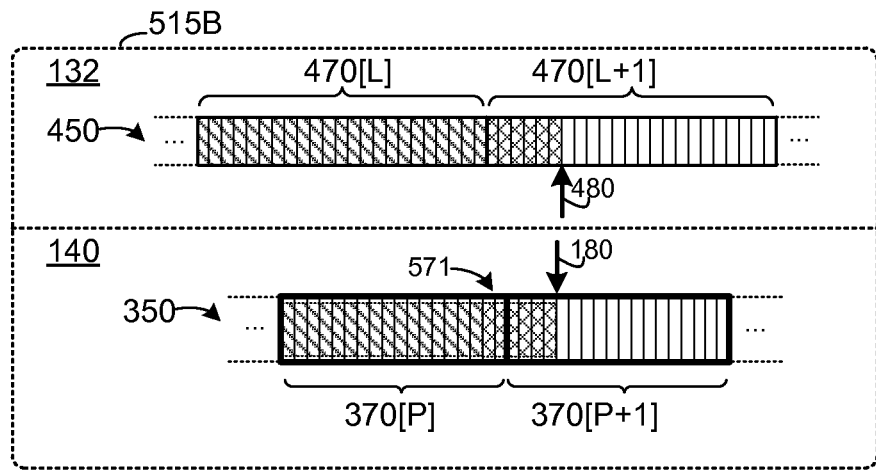
Figure 5A:
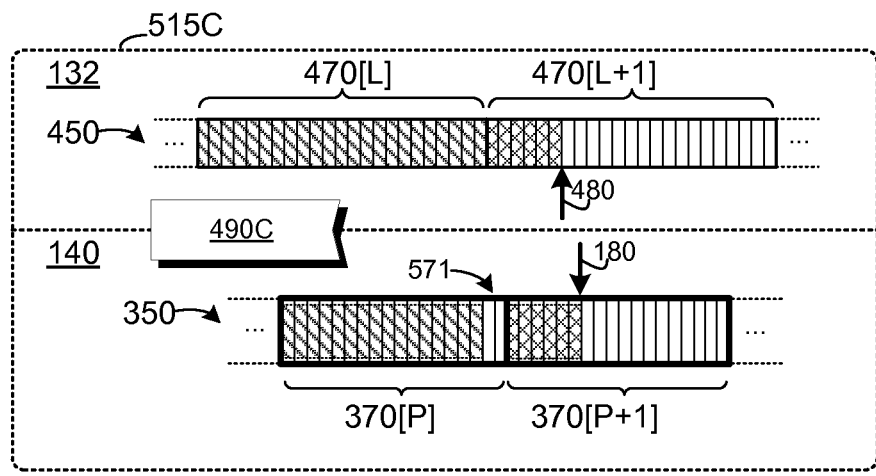

The log coordination module 138 may be further configured to provide information pertaining to log storage operations, such as information pertaining to segment boundaries. As used herein, a "segment boundary" refers to a boundary between log segments 370 and/or 470. FIG. 5A depicts one embodiment 500A of log coordination operations of the log coordination module 138 pertaining to segment boundary conditions. As illustrated in state 515A, the log client 406 may be configured to append data within a segment 470[L] of the upper-level log 450 (at the current logical append point 480). Upon reaching the end of the segment 470[L], the log client 406 may continue appending data within the next available segment 470[L+1] (e.g., advance the logical append point 480 to the first LID within 470[L+1]).

The storage module 130 may append data to the storage log 350 in response to the log storage operations of the upper-level log 450. As disclosed herein, appending data to the storage log 350 may comprise sequentially writing data packets 110 to log storage units 371 of a log segment 370[P] (appending data packets 110 at the append point 180). The log storage module 135 may advance the append point 180 to the next log segment 370[P+1] in response to filling the log storage units 371 log segment 370[P].

As illustrated in state 515A, when the log client 406 fills the segment 470[L], a set of unoccupied log storage units 571 remain within the storage log segment 370[P]. The set of unoccupied log storage units 571 may remain due to mismatches between the size and/or configuration of the segments 370 and 470 of the logs 350 and 450, storage operations of other storage clients 106, and/or the like.

The storage module 130 may continue appending data of the next log storage segment 470[L+1], which as depicted in state 515B, may result in a small portion of the segment 470[L+1] being stored within log segment 370[P] (in log storage units 571), resulting in potential write amplification and/or fragmentation. In some embodiments, the log coordination module 138 may be configured to adapt storage operations in the storage log 350 in accordance with boundary conditions of the upper-level log 450. The log coordination module 138 may determine that the upper-level log 450 is about to cross a segment boundary and, in response, may advance the append point 180 of the storage log 350 to the segment 370[P+1]. In some embodiments, the log coordination module 138 determines the log boundary condition based on information pertaining to the size and/or configuration of the segments 470 of the upper-level log 450. Alternatively, the log coordination module 137 may infer the size of the upper-level log segments 470 based on the range and/or extent of deallocation hints from the log client 406, as disclosed above in conjunction with FIG. 4B (e.g., log coordination message 490A).

As illustrated in state 515C, in some embodiments, the log coordination module 138 may determine the log boundary condition in response to a log coordination hint 490C from the log client 406. The log coordination hint 490C may indicate a location of the log segment boundaries within the logical address space 132 (e.g., size and/or extent of the segments 470), may indicate that the log client 406 has filled the current segment 470[L], and/or indicate that the log client 406 is advancing to a new segment 470[L+1]. In response, the log coordination module 138 may determine whether to continue filling the current storage log segment 370[P] or to advance the append point 180 to the next log segment 370[P+1] to avoid the fragmentation of state 515B. The determination may be based on the relative size and/or configuration of the segments 370 and 470, the size of the set of unoccupied log storage units 571 within the current segment 370[P], availability of storage resources, policy, configuration, and/or the like. In the FIG. 5A embodiment, the log coordination module 138 is configured to increment the append point 180 to the next segment 370[P+1] in response to the log coordination hint 490C. Incrementing the append point 180 may comprise configuring the log storage module 135 to ignore or skip the log storage units 571, program padding data to the log storage units 571, and/or the like.

Figure 5B:
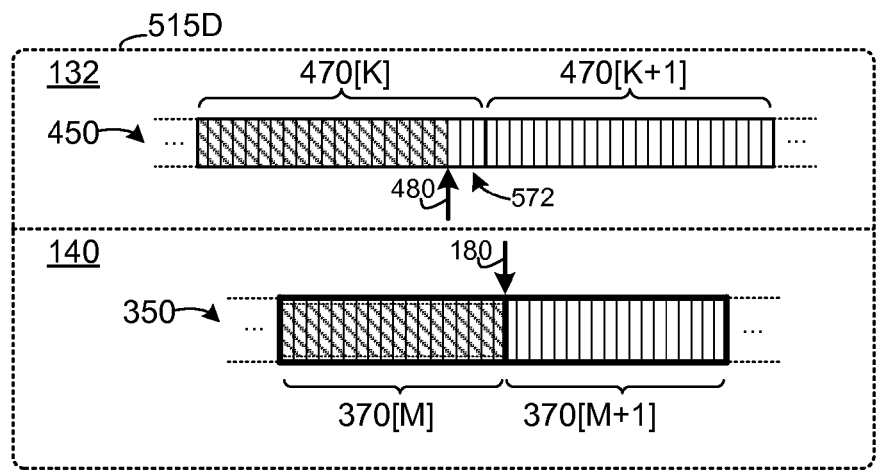
FIG. 5B depicts further embodiments of log coordination operations pertaining to log segment boundary conditions.
Figure 5B:
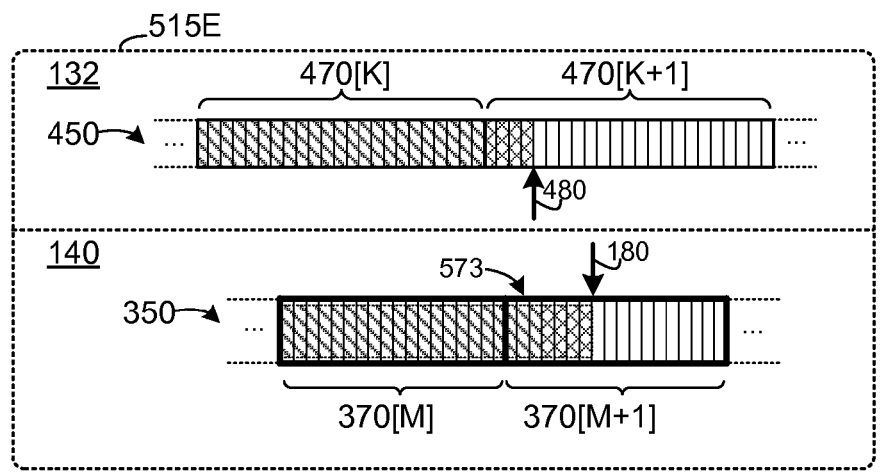
Figure 5B:
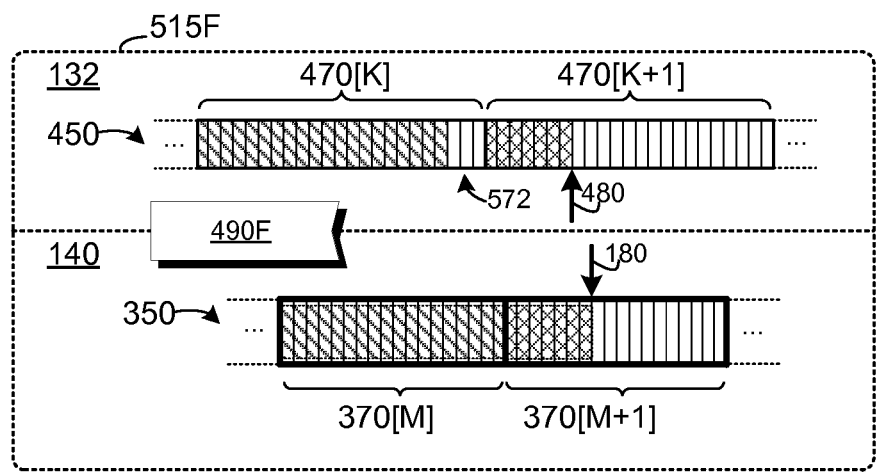

FIG. 5B depicts further embodiments 500B of log coordination operations of the log coordination module 138. As illustrated in state 515D, the log storage module 135 may append data within a segment 370[M] of storage log 350 in response to the log client 406 appending data to the segment 470[K] of the upper-level log 450. The log storage module 135 may fill the segment 370[M] and prepare to advance the append point 180 to a next available log segment 370[M+1], as disclosed herein. As depicted in state 515D, the storage log segment 370[M] may be filled, and a relatively small set of log storage units (LIDs 572) may remain unused within the segment 470[K] of the upper-level log 450. Accordingly, appending data to the LIDs 572 may comprise appending data to a new segment 370 within the storage log 350 (e.g., segment 370[M+1]).

As illustrated in state 515E, the log client 406 may append data to the unused LIDs 572 of the upper-level log segment 470[K], and continue performing log storage operations in the next upper-level log segment 470[K+1]. The operations in the upper-level log 450 may be serviced by appending data to the storage log 350 (by use of the log storage module 135, as disclosed herein). The operations in the storage log 350 may comprise appending a relatively small portion of the data corresponding to LIDs 572 of the upper-level log segment 470[K] (data 573) within the storage log segment 370[M+1], with data of the next upper-level log segment 470[K+1].

As disclosed herein, interleaving relatively small portions of data of different upper-level log segments 470 in the storage log 350 may create write amplification and/or fragmentation issues. For example, invalidating the upper-level log segment 470[K] may comprise invalidating data of storage log segments 370[M] and 370[M+1]. Recovering log segment 370[M+1] may comprise erasing the relatively small amount of data 573 corresponding to log segment 470[K], and relocating the remaining data on the segment 370[M+1], resulting in write amplification, increased wear, and further fragmentation. In some embodiments, the log coordination module 138 is configured to avoid such issues by coordinating log storage operations between the lower-level storage log 350 and the upper-level log 450, as disclosed herein.

As illustrated in state 515F, in response to the boundary condition of state 515D (e.g., filling the log segment 370[M]), the log coordination module 138 may be configured to issue a log coordination hint 490F to the log client 406. The log coordination hint 490F may be configured to indicate that the storage log 350 has reached a log segment boundary condition (or in nearing a segment boundary). In response, the log client 406 may advance the logical append point 480 to the next segment 470[L+1] without using the remaining LIDs 572 in the current segment 470[L]. Skipping the LIDs 572 may avoid the potential write amplification and/or fragmentation issues of state 515E. The log client 406 may determine whether to skip to the LIDs 572 based on the number of unused LIDs that remain in the segment 470[K], availability of logical capacity (e.g., availability of other segments 470 in the upper-level log 450), policy, configuration, and/or the like. Skipping the LIDs 572 may comprise advancing the logical append point 480 to the next segment 470[K+1] without appending data to the LIDs 572. As illustrated in state 515F, skipping the LIDs 572 may prevent data of the upper-level log segment 470[K] from being appended within the next storage log segment 370[M+1]. Accordingly, invalidating the log segment 470[K] may not affect the validity of data stored within the storage log segment 370[M+1].

Figure 6:
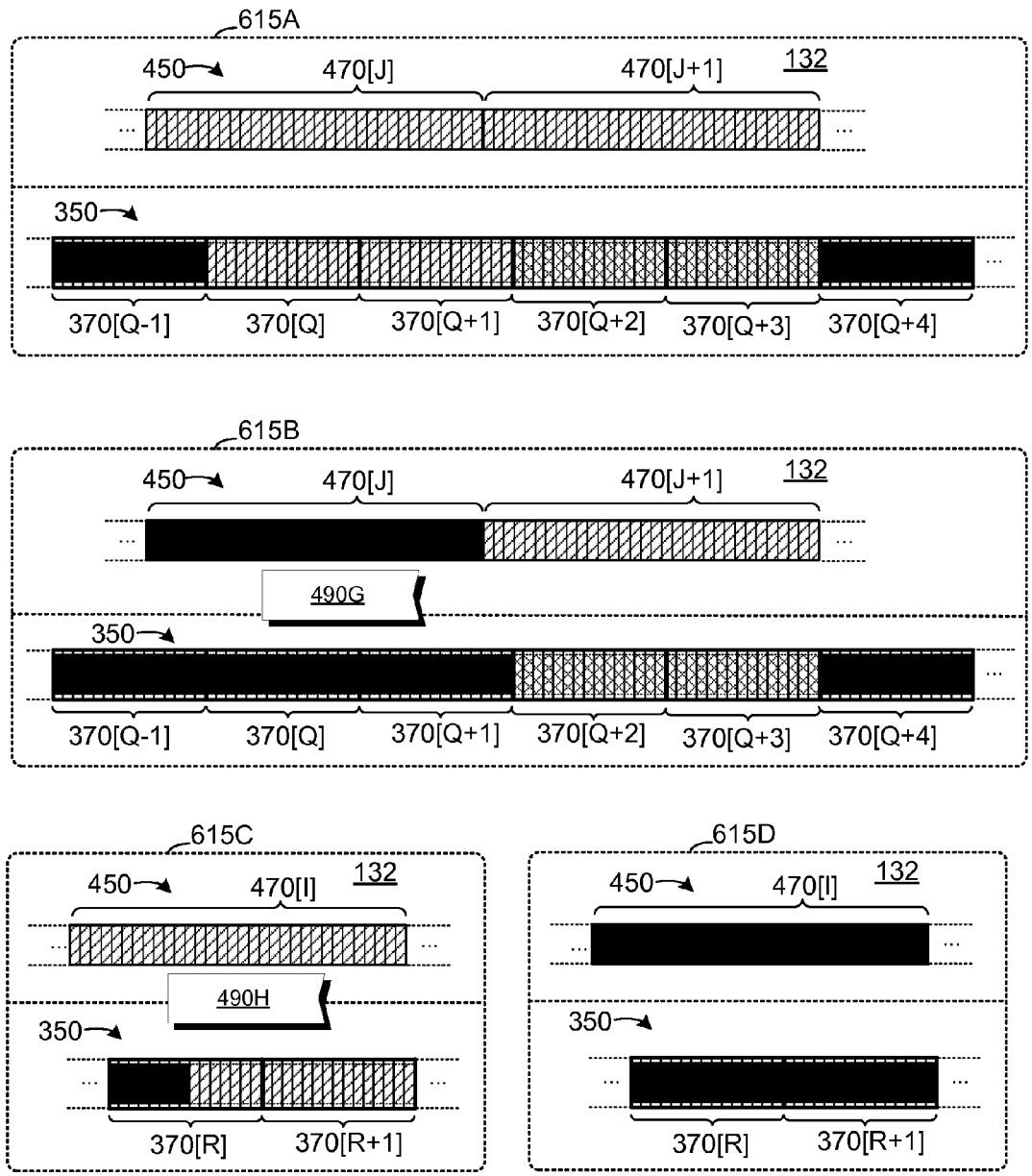
FIG. 6 depicts embodiments of log coordination operations pertaining to log grooming.

FIG. 6 depicts further embodiments of log coordination operations of the storage module 130. In state 615, the groomer 137 may determine that segments 370[Q−1] and 370[Q+4] comprise data that does not need to be retained on the storage medium 140 (e.g., invalid data). The storage module 130 determines that the segments 370[Q−1] and 370[Q+4] comprise invalid data in response to log coordination information pertaining to the upper-level log 450, such as a log coordination message 490, a deallocation message, overwrite operations, and/or the like. The segments 370[Q−1] and 370[Q+4] may be marked as invalid in storage metadata 134 of the storage module 130 (e.g., in a reverse index 158). The storage module 130 may determine that segments 370[Q]-370[Q+3] correspond to valid data (e.g., log segments 470[J] and 470[J+1]).

As disclosed above, the groomer 137 of the storage module 130 may be configured to reclaim storage resources of the storage medium 140, which may comprise compacting, reclaiming, recovering, and/or reinitializing storage log segments 370 (by use of the garage collection module 337). The groomer 137 may be configured to operate as a low-priority, background process and, as such, may not impact the performance of storage requests being serviced by the storage module 130. In some embodiments, however, storage module 130 may be configured to increase the priority of garbage collection operations to ensure that the log storage module 135 has sufficient write capacity to avoid write stall conditions. Further embodiments of systems and methods for managing grooming operations and/or write capacity are disclosed in U.S. Provisional Patent Application No. 61/893,024, entitled, "Systems and Methods for Adaptive Reserve Storage," filed Oct. 18, 2013 for Michael Brown et al., which is hereby incorporated by reference in its entirety.

Recovering a storage log segment 370 may comprise a) relocating valid data from the storage log segment 370 (if any), b) erasing the log segment 370, and c) making the erased log segment 370 available to the log storage module 135 (e.g., placing the log segment 370 in a write queue 339 and/or the like). The groomer 137 may, therefore, be configured to identify segments 370 that are suitable for recovery based, inter alia, on the amount of valid and/or invalid data within the respective segments 370 and, as such, a grooming operation performed in state 615A may comprise selecting log segments 370[Q−1] and 370[Q+4] for recovery.

As disclosed herein, the log client 406 may be configured to manage segments 470 of the upper-level log 450. The log client 406 may periodically (or continuously) monitor segments 470 of the upper-level log 450 to identify and recover segments 470 of the upper-level log 450 (by use of the upper-level log groomer 437, as disclosed above). Recovering a segment 470 of the upper-level log 450 may comprise a) relocating valid data within the log segment 470 (if any), and b) preparing the segment 470 for use by deallocating, erasing, and/or overwriting the LID range corresponding to the log segment 470. Recovering a segment 470 may, therefore, comprise deallocating and/or invalidating data stored on the storage medium 140.

In some embodiments, the log coordination module 138 is configured to coordinate grooming operations between the storage log 350 and the upper-level log 450. Coordinating grooming operations may comprise one or more of: a) pausing, delaying, and/or deferring grooming operations within the storage log 350 based on log coordination information pertaining to the upper-level log 450 (e.g., a state of the upper-level log 450, activity of the upper-level log groomer 437, and/or the like), b) un-pausing, resuming, and/or prioritizing grooming operations within the storage log 350 in response to the log coordination information, c) identifying data that does not need to be retained within the storage log 350 by use of the log coordination information, d) informing the upper-level log 450 of grooming operations being performed in the lower-level log 350, e) informing the lower-level log 350 of grooming operations being performed in the upper-level log 450, and so on.

Coordinating storage recovery operations may enable the groomer 137 to operate more efficiently. In state 615A, for example, the groomer 137 may perform grooming operations within the storage log 350 which may comprise recovering segments 370[Q-1] and 370[Q+4]. The segments 370[Q]-370[Q+3] may not be recovered because the segments 370[Q]-370[Q+3] comprise data that is marked as valid in the storage metadata 134. The log client 406 may, however, perform grooming operations within the upper-level log 470 concurrently and/or subsequently with the lower-level grooming operations in the storage module 130. As depicted in state 615B, the upper-level grooming operations within the upper-level log 450 may comprise recovering segment 470[J], which may result in invalidating data in storage log segments 370[Q] and 370[Q+1]. Had the groomer 137 been aware of the activity in the upper-level log 450, the groomer 137 could have identified additional segments 370 for recovery (and/or avoided relocating data that was being invalidated in the upper-level log 450).

In some embodiments, the log coordination module 138 is configured to manage operation of the groomer 137 in response to log state information pertaining to the log client 406 (e.g., log coordination information provided through one or more log coordination messages 490G). The log state information of the message 490G may indicate that the log client 406 is performing grooming operations (and/or has scheduled an upcoming grooming operation) that may affect validity of data in the storage log 350. In response, the log coordination module 138 may pause, delay and/or defer grooming operations until the upper-level log grooming operations are complete. Deferring the grooming operation of state 615B until after grooming the upper-level log 450 may enable the groomer 137 to identify and recover segments 370[Q] and 370[Q+1]. In some embodiments, the log state information of the log coordination message 490G may indicate that grooming operations are complete (and/or were recently completed). In response, the log coordination module 138 may un-pause, prioritize, and/or resume grooming operations within the storage log 350.

In some embodiments, the log coordination module 138 may be configured to use validity information pertaining to the upper-level log 450 in grooming operations. As illustrated in state 615C, a segment 370[R] of the storage log 350 may comprise both invalid data, and data that is marked as valid in storage metadata 134 of the storage module 130 (e.g., data pertaining to upper-level log segment 470[I]). Data of the upper-level log segment 470[I] may be stored on other portions of the storage log 350, including segment 370[R+1]. The groomer 137 may select the segment 370[R] for recovery. Recovering the segment 370[R] may comprise relocating valid data stored on the segment 370[R] (e.g., data 673), and erasing the segment 370[R].

The log coordination module 138 may inform the upper-level log 450 (log client 406 and/or client log manager 436) of grooming operations being performed in the storage log 350. The log coordination module 138 may identify data that is being relocated within the storage log 350 in a garbage collection operation and/or may indicate a storage location of the relocated data within storage log 350. In response, the upper-level log 450 may identify data that does not need to be retained (relocated) on the storage media and/or provide relocation hints for the data. The relocation hints may be configured to prevent fragmentation of the upper-level log segments 470 within the storage log 350 (as disclosed in further detail herein).

The log coordination module 138 may be configured to access log coordination information of the upper-level log 450 to improve the efficiency of the grooming operation (e.g., avoid relocating data that is no longer valid). In response to the grooming operation, the log coordination module 138 may be configured to determine validity information pertaining to data stored on the segment 370[R] based on log coordination information of the upper-level log 450 (as conveyed in log coordination message(s) 490H). The log coordination module 138 may request validity information pertaining to the segment 470[I] from the log client 406 (e.g., whether the log segment 470[I] is still valid) and/or validity information pertaining to particular LIDs (e.g., the LIDs bound to data within the segment 370[R]). Alternatively, or in addition, the log coordination module 138 may determine whether the log client 406 is currently performing log grooming operations pertaining to the segment 470[I] (and/or has scheduled such grooming operations). The log coordination module 138 may be further configured to request a grooming operation on the upper-level log segment 470[I] and/or may delay the grooming operation on the segment 370[R] until grooming within the upper-level 450 is complete, as disclosed above.

As illustrated in state 615D, the log coordination message 490H may indicate that the log segment 470[I] is no longer valid. In response, the log coordination module 138 may invalidate the corresponding data (in the reverse index 158) and/or inform the groomer 137. The groomer 137 may, therefore, reclaim the segment 370[R] without relocating the data 673. Moreover, the groomer 137 may be further configured to reclaim other segment(s), such as segment 370[R+1] comprising data corresponding to the deallocated segment 470[I].

In some embodiments, the upper-level log 450 (e.g., log client 406 and/or client log manager 436) may be configured to leverage the storage module 130 to improve the performance of log management operations. As disclosed above, segments 470 of the upper-level log may be reclaimed by a) relocating valid data within the segment 470, and b) marking the segment 470 as available to store data of the log 450. Relocating valid data within the segment 470 may comprise copying the data to a new LID in the logical address space 132 (e.g., re-write the data). The storage module 130 may expose logical move and/or clone operations configured to manage changes to the logical interface to the data, without rewriting the data on the storage medium 140. Embodiments of range move, clone, and/or merge operations are disclosed in U.S. patent application Ser. No. 14/030,717 entitled "Systems and Methods for Contextual Storage," filed Sep. 18, 2013, for David Flynn et al., and U.S. Provisional Patent Application No. 61/982,962 entitled "Systems and Methods for Distributed Atomic Storage Operations," filed Oct. 18, 2013 for Nisha Talagala et al., each of which is hereby incorporated by reference in its entirety. The log client 406 and/or client log manager 437 may leverage range move, clone, and/or merge operations to relocate data within the logical address space 132 (e.g., move data to another segment 470), without re-writing the data to the storage log 350, which may further reduce write amplification.

Figure 7A:
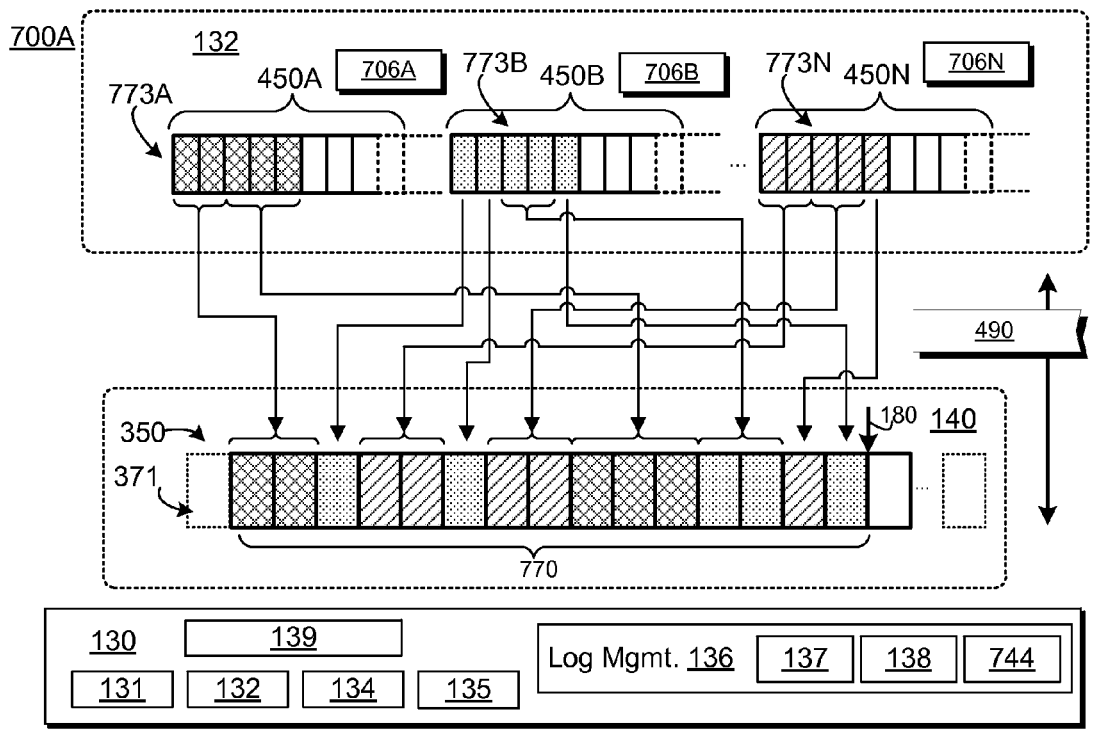
FIG. 7A depicts embodiments of log coordination operations pertaining to log fragmentation.

The log coordination module 138 may be further configured to coordinate log storage operations pertaining to a plurality of upper-level logs 450 of different respective log clients 406. FIG. 7A depicts one embodiment of log coordination operations of the storage module 130. In the FIG. 7A embodiment, the storage module 130 is configured to service storage requests pertaining to a plurality of separate upper-level logs 450A-N. Each upper-level log 450A-N may be maintained by a respective I/O client 106 (e.g., respective log managers 706A-N). Accordingly, the logs 450A-N may comprise application logs 450A-N. The application logs 405A-N may be maintained within respective portions of the logical address space 132. In some embodiments, each log 405A-N is provisioned a respective set, range, and/or extent of LIDs within the logical address space 132. The log coordination module 138 may be configured to coordinate log storage and/or management operations of the application logs 450A-N and the storage log 350 by coordinating log segment sizes, boundary conditions, grooming operations, and the like, as disclosed herein (e.g., by use of log coordination messages 490).

In the FIG. 7A embodiment, the log managers 706A-N may append application data blocks 773A-N to the respective application logs 450A-N. The application data blocks 773A-N may comprise a fixed or variable amounts of data. The application data blocks 773A-N may correspond to log storage units 471 and/or log segments 470, as disclosed herein. Appending data to an application log 450A-N may comprise issuing write requests to the storage module 130. The storage module 130 may service the write requests by appending data packets 110 corresponding to the application data blocks 773A-N to the storage log 350, as disclosed herein. The data packets 110 comprising data of the application data blocks 773A-N may be appended at a single append point 180 in accordance with the order in which the requests were received at the storage module 130. Due to, inter alia, different activity levels of the log managers 706A-N, application concurrency, and/or the like, storage requests of the log managers 706A-N may overlap and/or be interleaved with one another. Accordingly, application data blocks 773A-N of the log managers 706A-N may be fragmented within the storage address space 144 of the storage log (e.g., application data blocks 773A-N of the logs 450A-N are interleaved with application data blocks 773A-N of other logs 450A-N). Application log fragmentation may increase write amplification and/or reduce the performance of the groomer 137 since validity of particular segments 370 within the storage log 350 may depend on validity information of different upper-level application logs 450A-N. Moreover, the log managers 706A-N may perform log grooming and/or management operations at different rates and/or according to different criteria, which may further increase log fragmentation.

In some embodiments, the log coordination module 138 is configured to reduce log fragmentation by gathering, coalescing, and/or consolidating upper-level log data within the storage log 350 by use of a log translation module 744. The log translation module 744 may be configured to associate LIDs of the logical address space 132 with respective log managers 706A-N and/or logs 450A-N. The log translation module 744 may determine the associations based on allocation operations of the storage module 130 to allocate logical capacity to the log managers 706A-N and/or logs 450A-N (e.g., by use of the translation module 133 and/or storage metadata 134). The groomer 137 may be configured to defragment the application data blocks 773A-N by, inter alia, relocating the application data blocks 773A-N within the storage log 350 in one or more background grooming processes. In some embodiments, the groomer 137 is configured to defragment the application data blocks 773A-N during other grooming operations (e.g., storage recovery operations). Alternatively, the groomer 137 may be configured to defragment the application data blocks 773A-N in a dedicated defragmentation operation.

Defragmenting upper-level logs (application logs 450A-N) within the storage log 350 may comprise a) identifying storage log segment(s) 370 comprising data associated with different respective log managers 706A-N, and b) relocating data of the identified storage log segment(s) 370 such that data associated with the respective log managers 706A-N are stored contiguously within the storage log 350. In the FIG. 7A embodiment, the groomer 137 may determine that the region 770 is fragmented (e.g., comprises application data blocks 773A-N corresponding to different log managers 706 and/or logs 450A-N). The region 770 may correspond to one or more segments 370 of the storage log 350. The log coordination module 138 may be configured to identify regions of the storage log 350 comprising fragmented data, and to mark the regions (e.g., region 700) for defragmentation. Marking a region 700 for defragmentation may comprise updating storage metadata 134, to indicate that the region 700 comprises fragmented data. The log coordination module 138 may be configured to identify fragmentation as data is being appended to the storage log 350. In some embodiments, the log coordination module 138 is configured to monitor log storage operations on the storage log 350 and, by use of the log translation module 744, identify regions of the storage log 350 (e.g., region 770) in which data of different logs 450A-N and/or applications 106A-N is being appended. Alternatively, or in addition, the groomer 137 may be configured to evaluate portions of the storage log 350 in background grooming operations to identify data fragmentation (e.g., traverse the storage log 350 to identify regions comprising fragmented data associated with different logs 450A-N and/or applications 106A-N), which may be marked for defragmentation, as disclosed above. In some embodiments, the log translation module 744 may associate LID regions with respective logs 450A-N and/or log managers 706A-N by use of log coordination information (e.g., log coordination messages 490). The application(s) 706A-N may be configured to identify the LID regions and/or extents provisioned thereto by use of log coordination messages 490. Alternatively, or in addition, the log coordination module 138 may request LID allocation information from the application(s) 706A-N by use of log coordination messages 490. In some embodiments, data may be associated with a particular log 450A-N by use of persistent metadata 114 of the data packets 110 in the storage log 350. As disclosed above, the log storage module 134 may be configured to associate data with persistent metadata 114, which may include, inter alia, the LID(s) associated with the data segment 112. The persistent metadata 114 may be further configured to associate data segment 112 with a particular I/O client 106, log client 406, log 450A-N, and/or the like. The groomer 137 may be configured to use the persistent metadata 114 to associate data with respective logs 450A-N and/or identify data fragmentation, as disclosed herein.

The groomer 137 may be configured to defragment the region 700 by relocating the data within the storage log 350. Accordingly, defragmenting a region 700 may comprise a) accessing data corresponding to respective logs 450A-N and/or log managers 706A-N within an identified region 700, and b) re-appending the data, such that the data is stored contiguously within the storage address space 144 of the storage log 350. The groomer 137 may be configured to defragment a region 700 in a storage recovery process, as disclosed herein. Alternatively, the groomer 137 may defragment the region 700 in a separate defragmentation process.

In the FIG. 7A embodiment, the log coordination module 138 may identify the region 700 as comprising fragmented data at the time the application data blocks 773A-N are appended to the storage log 350. In response, the log coordination module 138 may mark the region 700 for defragmentation in the storage metadata 134 (e.g., reverse index 158), as disclosed herein. Alternatively, the region 700 may be identified and marked for defragmentation subsequent to appending the application data blocks 773A-N to the log, as disclosed herein.

Figure 7B:
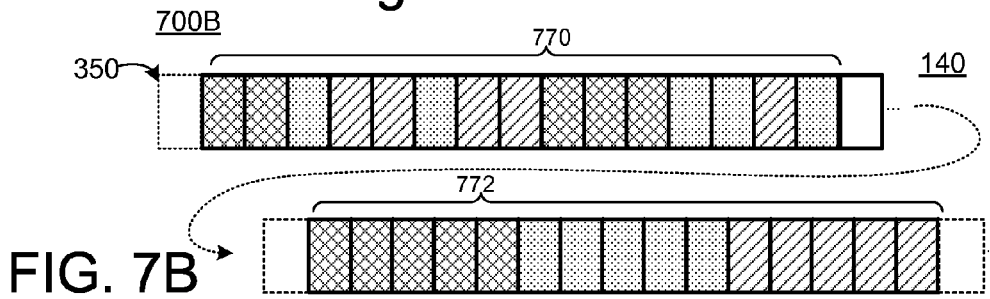
FIG. 7B depicts further embodiments of log coordination operations pertaining to log fragmentation.

FIG. 7B depicts embodiments of log coordination operations to defragment the region 700 within the storage log 350. The groomer 137 may be configured to defragment the region 700 in a background grooming process, which may be implemented while the storage module 130 is idle and/or under low load conditions. In the FIG. 7B embodiment, the groomer 137 may be configured to defragment the region during a storage recovery operation. Accordingly, the defragmentation operation may comprise a) relocating valid data within the region 700, such that the data associated with the same log 450A-N and/or log manager 706A-N is stored contiguously within the storage log 350 and b) reinitializing the region 700 (e.g., erasing the storage units 371 within the region 700). The groomer 137 may be configured to identify data associated with the same log 450A-N and/or log manager 706A-N by use of the log translation module 744, as disclosed herein. Defragmenting the data in region 700 may comprise reading the data out of log sequence, and appending the data at the append point 180 of the log 350. In the FIG. 7B embodiment, reading the data out of log sequence may comprise reading and/or re-appending data of application log 450A before reading and/or re-appending data of application log 450B, and so on. In response to relocating the valid data in the region 700, the groomer 137 may erase the region, as illustrated in FIG. 7B.

Figure 7C:
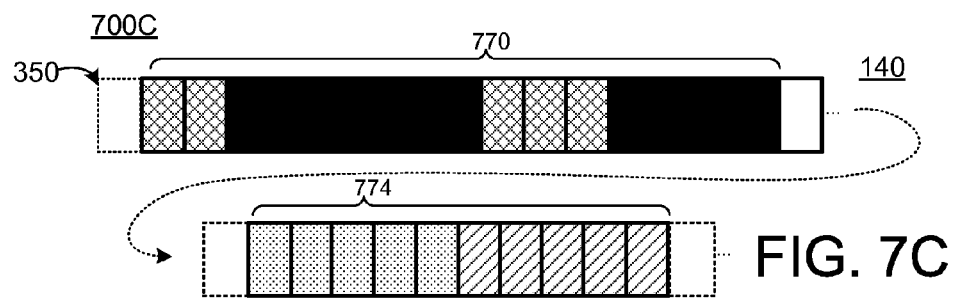
FIG. 7C depicts further embodiments of log coordination operations pertaining to log fragmentation.

FIG. 7C depicts further embodiments of log coordination operations to defragment upper-level logs in a lower-level storage log. In the FIG. 7C embodiment, the groomer 137 may be configured to defragment the region in a separate defragmentation operation (independent of storage recovery operations of the groomer 137). The groomer 137 may be configured to identify the region 700 for defragmentation and/or associate the data within the region 700 with respective logs 450A-N and/or log managers 706A-N by use of the log transaction module 744 and/or storage metadata 134, as disclosed herein. The groomer 137 may be configured to defragment the region 700 by selectively relocating data from the region 700. As illustrated in FIG. 7C, some data may remain in the region 700 whereas other portions are relocated. In the FIG. 7C embodiment, the groomer 137 may leave data associated with log 450A on the region 700. Data associated with other logs 450B-N in region 700 may be relocated by a) re-appending the data, such that the data is contiguous within the storage log 350 (as disclosed above) and b) invalidating the corresponding data in region 700. The invalidated portions of region 700 may be reclaimed in a subsequent storage recovery operation, as disclosed herein.

Figure 8:
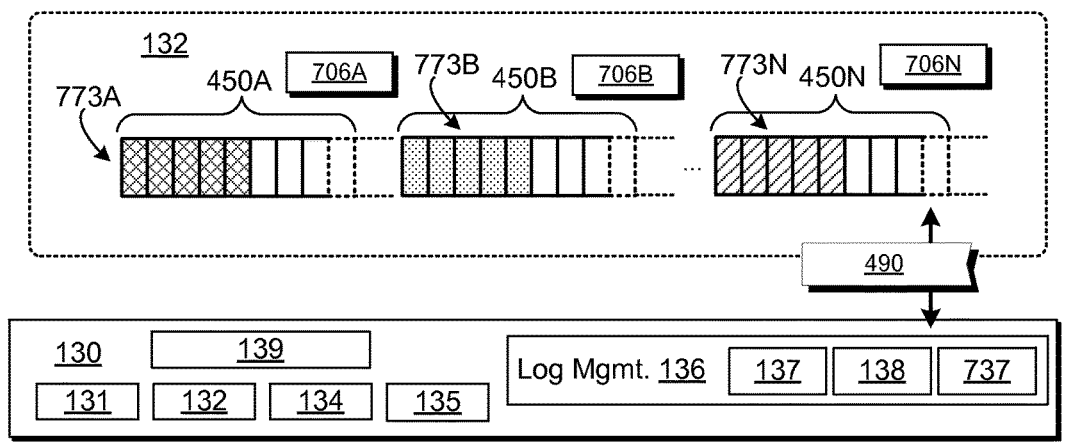
FIG. 8 depicts embodiment of log coordination operations pertaining to multiple upper-level logs.
Figure 8:
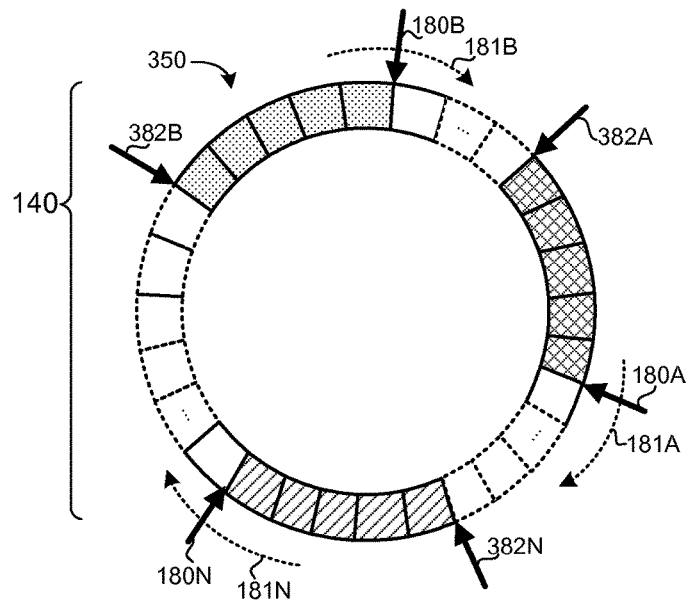

FIG. 8 depicts one embodiment of log coordination operations configured to prevent upper-level log fragmentation by appending data of different logs 450A-N and/or log managers 706A-N at different append points 180A-N within the storage medium 140. The append points 180A-N may correspond to different storage addresses within the storage address space 144 of the storage medium 140. In the FIG. 8 embodiment, log 450A may be associated with append point 180A, log 450B may be associated with append point 180B, log 450N may be associated with append point 180N, and so on. The storage module 130 may be configured to associate storage requests with respective append points 180A-N by use of the log translation module 744, as disclosed above. The log storage module 135 may, therefore, be configured to append data corresponding to storage requests from respective log managers 706A-N at respective append points 180A-N. Appending data at different respective append points 180A-N may prevent data of the upper-level logs 450A-N from being interleaved (fragmented) on the lower-level storage log 350. As illustrated in FIG. 8, data of the respective logs 450A-N is stored contiguously within respective portions of the storage log 350. The groomer 137 may be configured to perform grooming operations at respective recovery points 382A-N, as disclosed above.

As the number of upper-level logs increases, the storage module 130 may exhaust the available append points 180A-N. In response, the log coordination module 138 may be configured to append data of two or more logs to the same append point 180A-N, as disclosed herein. The log coordination module 138 may select logs 450A-N to share an append point based on log coordination information of the upper-level logs 450A-N (as conveyed using log coordination messages 490). The log coordination information may include, but is not limited to: activity level of the logs 450A-N, log segment size and/or configuration, and so on. The log coordination module 138 may use the log coordination information to select logs that admit to time domain multiplexing (e.g., can be separated in time), which may reduce log fragmentation due to concurrent and/or interleaved storage operations performed within the logs 450A-N.

Figure 9:
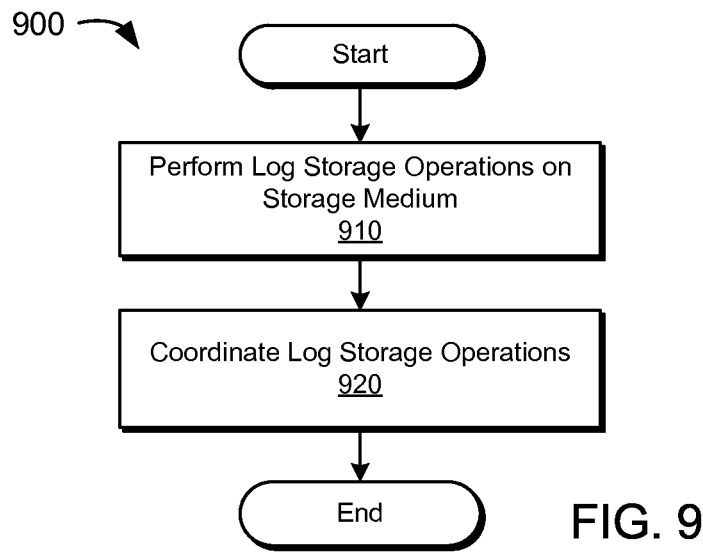
FIG. 9 is a flow diagram depicting one embodiment of a method for log coordination.

FIG. 9 is a flow diagram of one embodiment of a method 900 for log coordination. In some embodiments, portions of the method 900, as well as the other methods herein, may be embodied as computer-readable instructions stored on a computer-readable storage medium. The instructions may be configured for execution by a processor of a computing device to perform one or more steps and/or operations of the disclosed methods. Alternatively, or in addition, portions of the methods disclosed herein may be implemented by use of hardware components, such as processing resources 101, memory resources 102, non-volatile storage 103, communication interface(s) 105, and/or the like.

Step 910 may comprise performing log storage operations on a storage medium 140. As disclosed herein, step 910 may comprise writing data to a storage log 350 within the storage address space 144 of a storage medium 140. Step 910 may, therefore, comprise appending data to respective segments 370 of the storage log 350 with, and/or in association with, contextual metadata (e.g., as respective data packets 110). The contextual, log-based storage format of step 910 may define, inter alia, a log order 352 of data within the storage log 350. The log order 352 may be determined based on a) sequence information on respective segments 370 of the storage log (e.g., sequence information 113), and b) the relative storage addresses of data packets 110 within the respective segments 370.

Step 920 may comprise coordinating log storage operations within the storage log with operations of an upper-level log 450. The upper-level log 450 may correspond to the logical address space 132 of the storage module 130. Accordingly, the upper-level log 450 may correspond to a sets, range, and/or extent of LIDs within the logical address space 132. The upper-level log 450 may comprise an ordered sequence of upper-level log segments 370 within the logical address space 132.

Step 920 may comprise providing and/or accessing log coordination information by one or more of: a) transmitting and/or broadcasting information pertaining to the storage log 350 to one or more I/O clients 106 (e.g., log client 406 and/or log managers 706A-N), and b) receiving and/or accessing information pertaining to the upper-level log 450 by use of, inter alia, log coordination messages 490. The log coordination of step 920 may include, but is not limited to: a) coordinating the size and/or configuration of storage log segments 370 and/or upper-level log segments 470, b) coordinating grooming operations within the storage log 350 and/or the upper-level log 450, c) identifying boundary conditions in the storage log 350, d) identifying boundary conditions in the upper-level log 450, e) defragmenting data of one or more upper-level logs 450A-N within the storage log 350, and/or f) preventing data of one or more upper-level logs 450A-N from being fragmented within the storage log 350, and/or the like.

In some embodiments, step 920 comprises coordinating the size and/or configuration of log segments, which may include determining an optimal size and/or configuration for upper-level log segments 470 based, inter alia, on the size and/or configuration of the lower-level log segments 370. Step 920 may further comprise configuring the size and/or configuration of upper-level log segments 470 of the upper-level log 450. Step 920 may, therefore, comprise determining a configuration for the upper-level log 450 based on log coordination information pertaining to the lower-level, storage log 350. The optimal configuration may be adapted to reduce write amplification within the upper-level log 450 and/or lower-level storage log 350, as illustrated in FIG. 4C. The optimal configuration may, therefore, comprise configuring the segment size of the upper-level log segments 470 to be at least as large as the lower-level storage log segments 370 (e.g., a multiple and/or factor larger than lower-level storage log segments 370). The optimal configuration may be based on information pertaining to the upper-level log 450, such as optimal segment size for a groomer 437 of the upper-level log, usage of segments of the upper-level log (e.g., file sector size within a file system log), and the like. Step 920 may further comprise configuring the upper-level log to perform log management operations on log segments 470 of the determined size and/or configuration (e.g., adapt a groomer 437 of the upper-level log 450 to manage segments 470 of the determined size and/or configuration). In some embodiments, the size and/or configuration segments 370 and/or 470 may be adapted to reduce boundary overlaps between the respective segments 370 and/or 470.

Alternatively, or in addition, step 920 may comprise determining an optimal size and/or configuration for the lower-level storage log segments 370 based on the size and/or configuration of one or more upper-level log segments 470. As disclosed above, the determination of the optimal size and/or configuration of the lower-level storage log segments 370 may be configured to reduce write amplification (e.g., as shown in FIG. 4C). Step 920 may further comprise modifying the size and/or configuration of the storage log segments 370, which may include, but is not limited to: modifying the size and/or configuration of the virtual storage units 162 managed by the groomer 137 and/or log storage module 134, modifying the size and/or configuration of virtual storage division groups 167 managed by the groomer 137 and/or log storage module 134, modifying the size and/or configuration of the banks 149A-N of solid-state storage elements 146A-N (e.g., modifying the sequential bank interleave pattern of FIGS. 2B and 2C), modifying a compression ratio of the write module 240 (e.g., increasing and/or decreasing the compression ratio to increase or decrease the effective storage capacity of virtual storage units 160 within the storage log 350), and/or the like.

In some embodiments, step 920 comprises coordinating log boundary conditions. Coordinating log boundary conditions may comprise identifying segment boundary conditions within the upper-level log 450 and/or lower-level storage log 350 in order to, inter alia, prevent boundary segmentation, as disclosed above in conjunction with FIGS. 5A and 5B.

In some embodiments, the log coordination module 138 is configured to adapt log storage operations within the storage log 350 in accordance with segment boundary conditions in the upper-level log 450. As used herein, an upper-level boundary condition refers to a log client 406 and/or log manager 706A-N transitioning to a next upper-level log segment 470 (e.g., in response to filling a current segment 470). The log coordination module 138 may identify an upper-level segment boundary condition based on information pertaining to the size and/or configuration of the upper-level log segments 470 (e.g., the size of LID ranges and/or extents of the segments 470). Alternatively, or in addition, the log coordination module 138 may identify the upper-level segment condition in response to log coordination information of the upper-level log 450 (e.g., in response to a log coordination message 490 configured to identify the boundary condition). In response, the log coordination module 138 may be configured to advance the append point 180 of the log storage module 134 to a next segment 370 of the storage log 350. Advancing the append point 180 may comprise skipping log storage units 371 of a current storage log segment 370. The log coordination module 138 may skip the log storage units 371 to prevent the current storage log segment 370 from storing data of two (or more) different segments 470 of the upper-level log 450. As disclosed above, the log coordination module 138 may determine whether to advance the append point 180 to the next storage log segment 370 based on one or more factors, including, but not limited to: the number of log storage units 371 remaining in the current storage log segment 370, the availability of storage capacity on the storage medium 140, the availability of write capacity, the write load on the storage module 130, and so on.

Alternatively, or in addition, coordinating log segment boundary conditions at step 920 may comprise providing log coordination information pertaining to the storage log 350 to one or more log clients 406 and/or log managers 706A-N. The log coordination module 138 may be configured to indicate boundary conditions within the respective segments 370 of the storage log 350 by use of log coordination messages 490. The log coordination messages 490 may indicate when the log storage module 134 has filled a current segment 370 and is advancing the append point 180 to a next segment 370. In response, the upper-level log client 406 and/or log manager 706A-N, may be configured to advance the upper-level log append point 480 to a next segment 470 (skip remaining upper-level storage units 471 in a current segment 470) in order to, inter alia, avoid fragmentation of an upper-level log segment on two (or more) segments 370 of the storage log 350. The log client 406 and/or log manager 706A-N may determine whether to advance the append point 480 based on one or more factors, including, but not limited to: the number of unused upper-level log storage units 471 in the current segment 470, the availability of capacity within the upper-level log 450 (e.g., availability of free LIDs), and/or the like.

In some embodiments, step 920 comprises coordinating grooming operations. Coordinating grooming operations may comprise one or more of: adapting grooming operations in the storage log 350 based on information pertaining to one or more upper-level logs 450, adapting grooming operations in one or more upper-level logs 450 based on information pertaining to the storage log 350, and the like.

Adapting grooming operations in the storage log 350 may comprise one or more of: a) pausing, delaying, and/or deferring grooming operations in response to a state of an upper-level log 450, b) un-pausing, resuming, and/or prioritizing grooming operations in the storage log 350 based on the state of the upper-level log 450, c) performing grooming operations within the storage log 350 based on information pertaining to the upper-level log 450 (e.g., information pertaining to the validity of data stored within segments 370 of the storage log 350), and so on. As disclosed above, the groomer 137 may be configured to, inter alia, recover segments 370 of the storage log 350 for re-use (e.g., compress segments 370 of the log 350), which may comprise a) relocating valid data within the segments 370 (if any), and b) erasing the storage units 160 comprising the segment 370 (e.g., erasing the physical erase blocks 162 in the virtual storage division 166 and/or virtual storage division group 167 corresponding to the segment 370).

Log clients, such as the log client 406 and/or log managers 706A-N, may be configured to implement recovery and/or compaction operations within respective upper-level logs 450 and/or 450A-N. Recovering an upper-level log segment 470 may comprise a) relocating valid data in the segment 470 within the upper-level log 450 (if any) and b) making the segment 470 available for re-use, which may comprise deallocating the segment 470. Deallocating a segment 470 of an upper-level log 450 may comprise informing the storage module 130 (and/or other entities), that data associated with the LIDs of the segment 470 do not need to be retained on the storage medium 140 (e.g., do not need to be retained in the storage log 350). The deallocation information may be conveyed by use of log coordination messages 490, which may include, but are not limited to: a) deallocation messages, hints, commands and/or directives, b) TRIM messages, hints, commands, and/or directives, c) erase messages, hints, commands, and/or directives, d) invalidation message, hints, commands, and/or directives and/or the like. In response, the storage module 130 may invalidate the corresponding LIDs and/or log storage units 371 within the storage log 350 (e.g., by use of the storage metadata 134, such as the reverse index 158). The groomer 137 may use the invalidation information to a) select storage log segments 370 for recovery and/or compaction operations (e.g., identify segments 370 comprising invalid data), and b) identify data within the segments 370 that do not need to be retained on the storage medium 140 (e.g., do not need to be relocated). Accordingly, recovery and/or compaction operations in upper-level storage logs 450 may enable the groomer 137 of the storage log 350 to operate more efficiently.

The log coordination module 138 may be configured to access log coordination information of the upper-level logs 450 and adapt operation of the groomer 137 accordingly. Accessing the log coordination information at step 920 may comprise determining a state of one or more upper-level logs 450, which may include, but is not limited to: whether grooming operations have been recently performed within the upper-level log 450, the last time grooming operations were performed, grooming scheduling information (e.g., when the next grooming operation(s are scheduled to occur), whether grooming operations are currently underway, and/or the like. Step 920 may further comprise adapting the groomer 137 in response to the state of the upper-level log 450. Step 920 may, for example, comprise pausing, delaying, and/or deferring grooming operations on the storage log 350 in response to determining that grooming operations are currently being performed within the upper-level log 450 (and/or about to be performed). Alternatively, step 920 may comprise un-pausing, resuming, and/or prioritizing grooming operations on the storage log 350 in response to determining that grooming operations have recently been completed within the upper-level log 450. In some embodiments, the log coordination module 138 may request a grooming operation in the upper-level log 450 (e.g., request that a log manager 706a-N of the upper-level log 450 identify data that does not need to be retained), so that the groomer 137 can reclaim additional space. Alternatively, or in addition, the log coordination module 138 may issue queries regarding the validity status of data stored within particular segments 370 of the storage log 350 in response to the groomer 137 selecting the particular segments 370 for recovery to determine, inter alia, whether data stored in the particular segments 370 needs to be retained on the storage medium 140. Step 920 may, therefore, comprise issuing requests for validity information pertaining to portions of the logical address space 132 to one or more log clients 406 and/or log managers 706A-N. The requests and/or queries of step 920 may be conveyed by use of log coordination messages 490, as disclosed herein.

In some embodiments, step 920 comprises providing information pertaining to grooming operations within the storage log 350 to a log client 406. The information provided at step 920 may include, but is not limited to: a) an indication of the need for grooming operations within the storage log 350 (e.g., an indication of the availability of write capacity within the storage log 350, such as the size of the write queue 339), b) information pertaining to grooming operations within the storage log 350 (e.g., indicate when grooming operations are scheduled to occur), requests for invalidity information, and the like. The log client 406 may configure grooming operations in response to the information pertaining to the storage log 350 by one or more of: performing grooming/compaction operations in the upper-level log 450, prioritizing grooming/compaction operations, providing invalidity information regarding particular logical segments 470 and/or LIDs, providing information pertaining to grooming/compaction information in the upper-level log 450, and/or the like.

In some embodiments, coordinating log storage operations at step 920 may comprise defragmenting data of one or more upper-level logs 450A-N within the storage address space 144 of the storage medium 140 (e.g., within segments 370 of the storage log 350). Step 920 may, therefore, comprise a) identifying fragmented data in the storage log 350 by use of the log translation module 744, and b) gathering, coalescing, and/or consolidating fragmented data, such that data of respective logs 450A-N is stored contiguously within the storage address space 144.

Data fragmentation may occur due, inter alia, to appending data of one or more different logs 706A-N (and/or non-log data) at the same append point 180, log activity rates, grooming operations within the storage log 350 and/or upper-level logs 450A-N, and/or the like. Step 920 may comprise identifying data fragmentation at the time data is appended to the storage log 350 and/or subsequent to appending the data (e.g., by traversing the storage log 350 to identify data fragmentation). In some embodiments, step 920 may comprise marking storage log segment(s) 350 for defragmentation in storage metadata 134 (e.g., in a reverse index 158). Gathering the fragmented data may comprise recovering storage log segment(s) 370 comprising the fragmented data, as disclosed above in conjunction with FIG. 7B. Alternatively, or in addition, gathering the fragmented data may comprise selectively relocated data within one or more storage log segment(s) 370, as disclosed above in conjunction with FIG. 7C.

In some embodiments, step 920 comprises coordinating log storage operations by, inter alia, appending data of respective upper-level logs 450A-N at different respective append points 180A-N, as disclosed above in conjunction with FIG. 8. Step 920 may comprise maintaining a plurality of append points 180A-N within the storage address space 144 of the storage medium 140. Step 920 may further comprise associating each of the append points 180A-N with a respective upper-level log 450A-N (e.g., associating sets, ranges, and/or extents of LIDs in the logical address space 132 with respective logs 450A-N and/or append points 180A-N). Appending data to the storage log 350 (at step 910) may comprise: a) selecting an append point 180A-N for a storage request based on LIDs pertaining to the storage request (e.g., by associating LIDs of the storage request with a respective log 450A-N), and b) appending data of the storage request at the selected append point 180A-N. In some embodiments, step 920 comprises associating two or more upper-level logs 450A-N with the same append point 180A-N. Step 920 may comprise selecting the two or more upper-level logs 450A-N based on I/O characteristics of the logs 450A-N, such as write characteristics, write scheduling, and/or the like, as disclosed herein.

Figure 10:
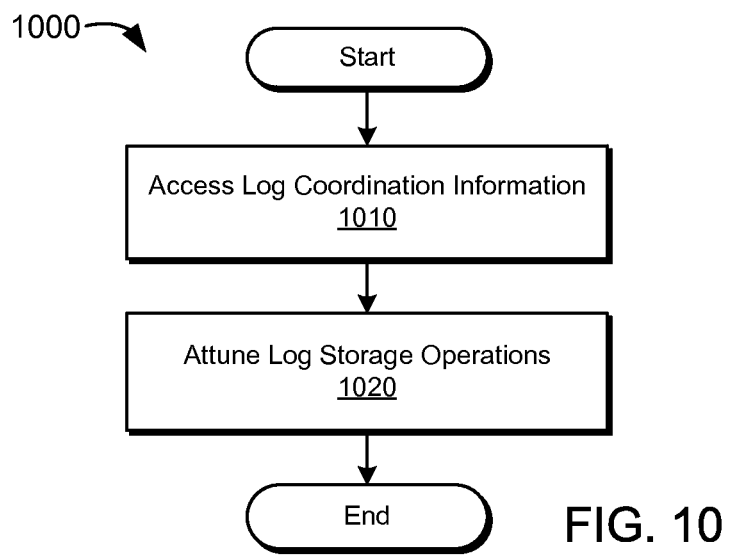
FIG. 10 is a flow diagram depicting another embodiment of a method for log coordination.

FIG. 10 is a flow diagram of another embodiment of a method 1000 for log coordination. Step 1010 comprises accessing log coordination information of one or more of the storage log 350 of the storage module 130 and/or an upper-level log 450. The storage log 350 may pertain to storage log segments 370 within a storage address space 144 of a storage medium 140, and the upper-level log 450 may pertain to segments 370 within a logical address space 132. Accessing the log coordination information at step 1010 may comprise receiving log coordination messages 490 through a storage interface 131. Alternatively, or in addition, step 1010 may comprise requesting the log coordination information (e.g., issuing one or more queries for log coordination information). The log coordination information of step 1010 may include, but is not limited to: a) the size and/or configuration of the segments 370 of the storage log 350, b) the size and/or configuration of the segments 470 of an upper-level log 450, c) grooming operations within the storage log 350, d) grooming operations within the upper-level log 450, e) validity information pertaining to segments and/or LIDs of the upper-level log 450 (e.g., deallocation hints, messages, and/or directives), f) LID allocated to the upper-level log 450, and the like. Step 1010 may further comprise providing log coordination information to one or more log clients 406 and/or log managers 706A-N. Providing log coordination information may comprise a) transmitting log coordination information, b) broadcasting log coordination information, c) providing access to stored log coordination information, and/or the like. Log coordination information may be transmitted and/or broadcast by use of log coordination messages 490, as disclosed herein.

Step 1020 may comprise attuning log storage operations by use of the log coordination information accessed at step 1010. Step 1020 may include, but is not limited to: a) determining a size and/or configuration for the segments 370 of the storage log 350, b) determining a size and/or configuration for the segments 470 of the upper-level log 450, c) adapting grooming operations within the storage log 350, d) adapting grooming operations within the upper-level log 450, e) relocating data of the upper-level log 450 within the storage log 350, f) selecting one of a plurality of append points 180A-N of the storage log 350, and/or the like, as disclosed herein.

Figure 11:
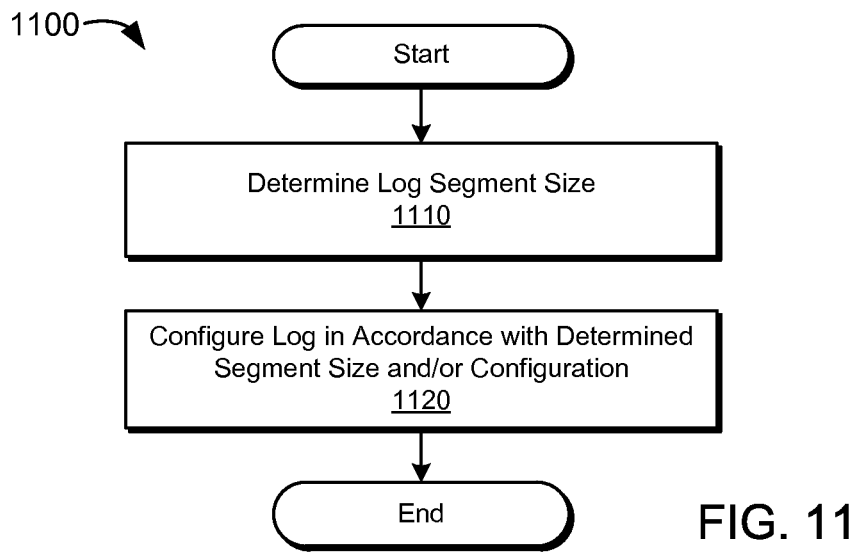
FIG. 11 is a flow diagram depicting one embodiment of a method for log segment coordination.

FIG. 11 is a flow diagram of another embodiment of a method 1100 for log coordination. Step 1110 may comprise determining a log segment size for one or more of a) the lower-level storage log 350, and/or b) an upper-level log 450. Step 1110 may comprise determining the log segment size based, at least in part, on the configuration of another log. Step 1110 may, therefore, comprise accessing log coordination information pertaining to the other log, such as the size and/or configuration of the segments of the other log (e.g., by use of log coordination messages 490, as disclosed herein).

In some embodiments, step 1110 comprises determining an optimal size for the segments 470 of an upper-level log 450 based on the size of the storage log segments 370 managed within the lower-level storage log 350. The optimal size for the upper-level log segments 470 may be based on an optimization criterion corresponding to a write amplification metric. The optimal upper-level log segment size may, therefore, be at least as large as segment size of the lower-level storage log 350 (e.g., as illustrated in FIG. 4C). The optimization criterion may further include application performance metrics, upper-level log efficiency metrics, and/or the like. Alternatively, step 1110 may comprise determining an optimal segment size for the lower-level storage log 350 based on, inter alia, the size of the upper-level log segments 370 of the upper-level log 450. The size of the storage log segments 370 may be less than or equal to the size of the upper-level log segments 470, as illustrated in FIG. 4C.

Step 1120 may comprise configuring one or more of a) the upper-level log 450 and/or b) lower-level storage log 350 in accordance with the segment size determined at step 1110. Step 1120 may comprise configuring the upper-level log 450 to manage upper-level log segments 470 comprising a particular number of LIDs within the logical address space 132. The capacity represented by the upper-level log segments 470 may be based on the segment size determined at step 1110. Alternatively, step 1120 may comprise configuring a size of storage log segments 370 by, inter alia, configuring the virtual storage units 166 and/or virtual storage unit groups 167 managed by the groomer 137, in accordance with the determined segment size, as disclosed herein.

Figure 12:
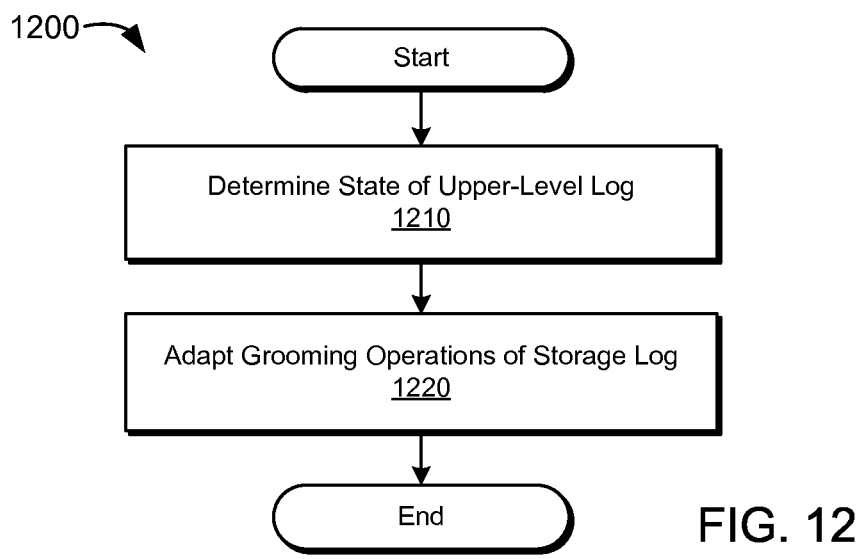
FIG. 12 is a flow diagram depicting one embodiment of a method for log coordination pertaining to grooming operations.

FIG. 12 is a flow diagram of another embodiment of a method 1200 for log coordination. Step 1210 may comprise determining the state of an upper-level log 450. Determining the state of the upper-level log 450 may comprise determining a state of grooming operations within the upper-level log 450 by use of log coordination information (e.g., log coordination messages 490), as disclosed herein.

Step 1220 may comprise adapting grooming operations within the storage log 350 based on the state of the upper-level log 450. Step 1220 may include, but is not limited to: a) pausing, delaying, and/or deferring grooming operations in response to determining that grooming operations are being performed on one or more segments 470 of the upper-level log 450 (and/or are scheduled to be performed within a time threshold), b) un-pausing, resuming, and/or prioritizing grooming operations in response to determining that grooming operations have been completed on one or more segments 470 of the upper-level log 450, c) requesting grooming operations within the upper-level log 450, d) selecting a storage log segment 370 for recovery based on validity information pertaining to segments 470 of the upper-level log 450 (e.g., deallocation hints, messages, and/or directives), and/or e) identifying data that does not need to be relocated from a particular storage log segment 370 based on the validity information, as disclosed above.

Figure 13:
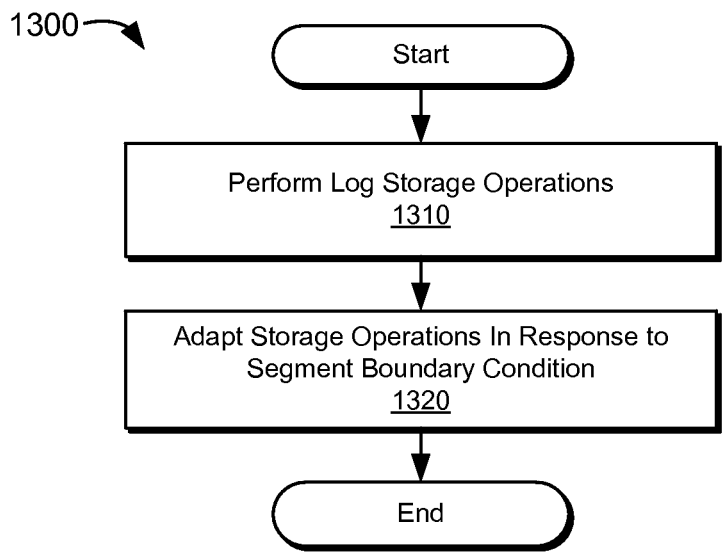
FIG. 13 is a flow diagram depicting one embodiment of a method for log coordination operations pertaining to segment boundary conditions.

FIG. 13 is a flow diagram of one embodiment of a method 1300 for log coordination pertaining to segment boundary conditions. Step 1310 may comprise performing log storage operations in a storage log 350 in response to storage requests pertaining to an upper-level log 450. Step 1310 may comprise appending data to segments 370 of a storage log 350 within a storage address space 144 in response to storage requests pertaining to segments 470 of an upper-level log 450 comprising a set, range, and/or extent of LIDs of a logical address space 132.

Step 1320 may comprise adapting storage operations within one or more of the storage log 350 and/or upper-level log 450 in response to a segment boundary condition. Step 1320 may comprise advancing the append point 180 of the storage log 350 to a next segment 370 in response to a segment boundary condition in the upper-level log 450 (e.g., in response to determining that the upper-level log 450 is advancing to a next segment 470). Advancing the append point 180 may comprise skipping one or more log storage units 371 in a current segment 370. Alternatively, or in addition, step 1320 may comprise advancing the append point 480 of the upper-level log 450 in response to a boundary condition in the storage log 350. Advancing the append point 480 may comprise skipping one or more upper-level log storage units 471 in a current segment 470. The boundary condition of step 1320 may be identified in response to log coordination information pertaining to one or more of the upper-level log 450 and the storage log 350, which may be communicated by use of log coordination messages 490, as disclosed herein.

Figure 14:
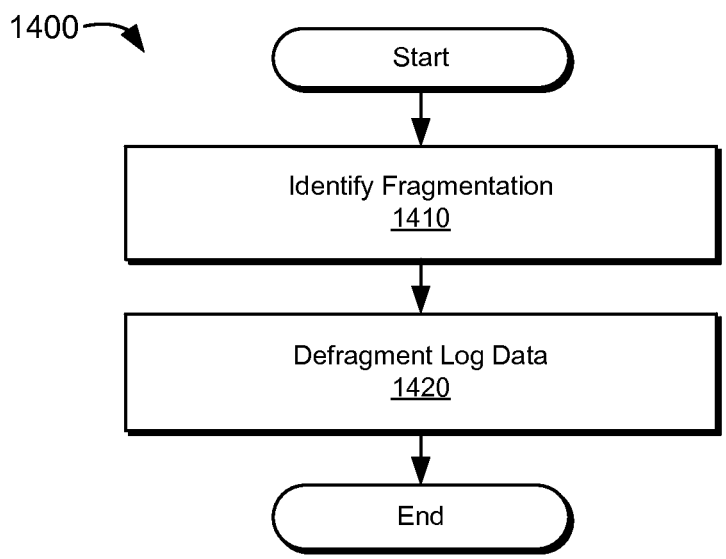
FIG. 14 is a flow diagram depicting one embodiment of a method for log coordination operations pertaining to log defragmentation.

FIG. 14 is a flow diagram of another embodiment of a method 1400 for log coordination. Step 1410 may comprise identifying fragmented data within the storage log 350. Step 1410 may comprise identifying data of an upper-level log 450A-N that is stored with data of another upper-level log 450A-N (and/or non-log data) within one or more storage log segments 370. Step 1410 may comprise identifying fragmentation at the time the data of the upper-level log 450A-N is appended to the storage medium 140. Step 1410 may comprise a) associating a storage request with a particular log 450A-N based on the LIDs corresponding to the storage request (e.g., using the log translation module 744), and b) determining that the data is to be appended to storage log segment 370 comprising data that does not correspond to the particular log 450A-N. Alternatively, data fragmentation conditions may be identified after appending data to the storage log 350. Step 1410 may comprise analyzing segments 370 of the storage log 350 to identify segments 370 comprising fragmented data. Segments 370 comprising fragmented data may be marked for a background defragmentation process by use of the storage metadata 134.

Step 1420 may comprise defragmenting data of the upper-level log 450A-N within the storage address space 144 of the storage log 350. Step 1420 may comprise gathering, coalescing, and/or combining data of respective upper-level logs 450 within respective storage log segments 370. As such, relocating the data at step 1420 may comprise storing data of the upper-level log 450A-N, such that the data is stored contiguously within one or more storage log segments 370 (e.g., stored contiguously within the storage address space 144 of the storage device 141). Step 1420 may comprise re-appending data of the upper-level log 450A-N such that the data is not interleaved with unrelated data (e.g., data of other upper-level logs 450A-N). The defragmentation of step 1420 may be implemented in a background grooming process. Accordingly, relocating the data from a set of one or more storage log segments 370 may comprise reinitializing the storage log segments 370, as disclosed herein. Alternatively, relocating the data may comprise selecting re-appending data of the upper-level log 450A-N to the storage log 350 without recovering the identified segments 370.

Figure 15:
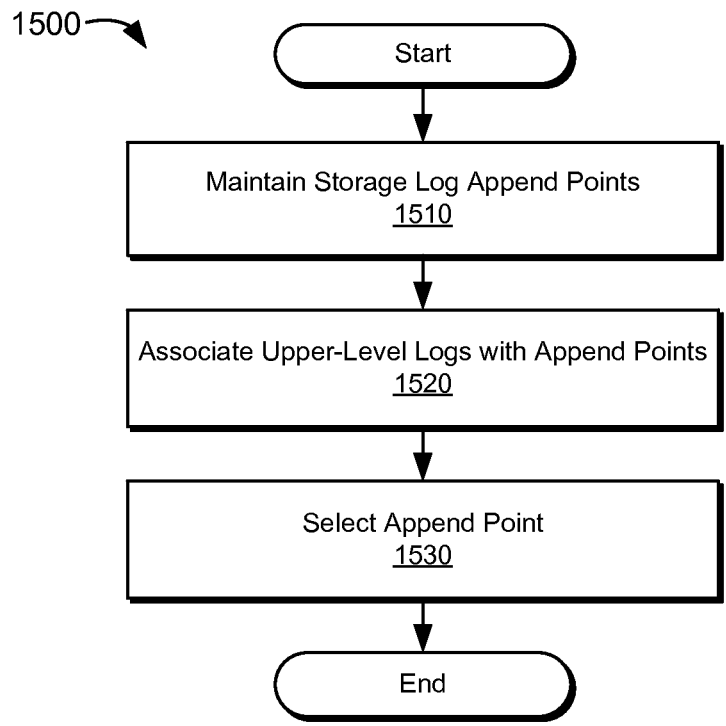
FIG. 15 is a flow diagram depicting another embodiment of a method for log coordination operations pertaining to log defragmentation.

FIG. 15 is a flow diagram of another embodiment of a method 1500 for log coordination. Step 1510 may comprise maintaining a plurality of append points 180A-N within the storage address space 144 of a storage medium 140. The append points 180A-N may correspond to different segments 370 of the storage log 350, as disclosed herein in conjunction with FIG. 8. Step 1520 comprises associating each of a plurality of upper-level logs 450A-N with respective append points 180A-N. Step 1520 may further comprise allocating a logical resources to the plurality of upper-level logs 450A-N. Allocating logical resources may comprise assigning one or more sets, ranges, and/or extents of LIDs within the logical address space 132 to the upper-level logs 450A-N. Accordingly LIDs of the logical address space 132 may be tied to respective upper-level logs 450A-N.

Step 1530 may comprise selecting one of the plurality of append points in response to a storage request. The selection of step 1530 may be based on the LIDs associated with the storage request. Step 1530 may comprise identifying the upper-level log 450A-N assigned the LIDs corresponding to the storage request, and selecting the append point 180A-N that is associated with the identified upper-level log 450A-N. Step 1530 may further comprise appending data of the storage request at the selected append point 180A-N, as disclosed herein.

Figure 16:
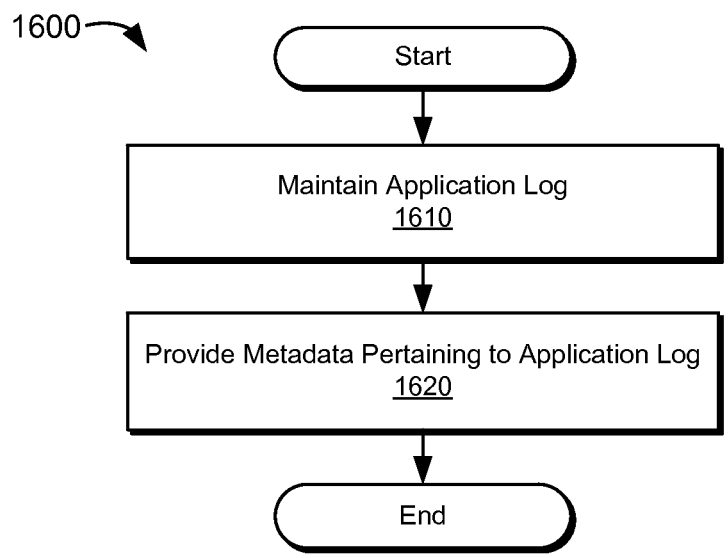
FIG. 16 is a flow diagram depicting another embodiment of a method for log coordination.

FIG. 16 is flow diagram of another embodiment of a method for log coordination. Step 1610 may comprise maintaining an upper-level log 450 (application log 450). The application log 450 may be maintained within a logical address space 132 of the storage module 130, as disclosed herein. Maintaining the application log may comprise issuing storage requests to the storage module 130 pertaining to the application log 450, which may include, but are not limited to: requests to store data associated with particular LIDs within the logical address space 132 (e.g., append data to the application log 450), read data associated with particular LIDs (e.g., read data from the application log 450), and so on. The requests may be issued through the storage interface 131 of the storage module 130 (and/or another storage interface and/or API), as disclosed herein.

Step 1620 may comprise providing metadata pertaining to the application log to the storage module 130. Step 1620 may comprise providing log coordination information to a log coordination module 138 of the storage layer 130 through the storage interface 131 and/or other communication mechanism, which may include, but is not limited to: calling an application programming interface of the storage module 130, accessing a storage interface corresponding to the storage module 130, transmitting a message comprising the metadata pertaining to the application log 450 to the storage module 130 (e.g., transmitting a log coordination message 490), and broadcasting the metadata pertaining to the application log 450 (e.g., broadcasting a log coordination message 490), writing log coordination information to a predetermined LID range, and/or the like.

The metadata pertaining to the application log 450 provided at step 1620 may include, but is not limited to: information configured to identify segments 470 of the application log 450 that are no longer in use (e.g., segments 470 corresponding to data that does not need to be preserved and/or retained by the storage module 130), information indicating a size and/or configuration of the application log segments 470, information pertaining to garbage collection operations within the application log 450 (e.g., timing and/or scheduling of garbage collection operations), information pertaining to LID allocations to the application log 450, information pertaining to boundary conditions in the application log 450, and/or the like.

The storage module 130 may manage the storage log 350 in response to the metadata provided at step 1620, as disclosed herein. In response to metadata identifying segments 470 of the application 450 that are no longer in use, the storage module 130 may a) identify data corresponding to the segments 470 in the storage log 350 and b) record that the data does not need to be retained on the storage device. In response to metadata indicating a size and/or configuration of the segments 470 of the application log 450, the storage module 130 may determine an optimal size for the segments 370 of the storage log 350 (and/or configure the storage log 350 accordingly). The storage module 130 may adapt garbage collection operations of the storage log in response to metadata pertaining to garbage collection operations within the application log 450 by, inter alia, pausing, deferring, and/or delaying garbage collection operations in response to determining that garbage collection is occurring (or about to occur) in the application log 450, un-pausing, resuming, and/or prioritizing garbage collection operations in response to determining that garbage collection is complete (or as been recently completed) in the application log 450, and so on. The storage layer 130 may defragment data of the application log 450 within the storage log 350, in response to metadata associating LIDs of the logical address space 132 with the application log 405. The storage layer 130 may be further configured to advance the append point in the storage log 350 (skip to a next segment 370) in response to metadata identifying a boundary condition in the application log 450 (e.g., in response to determining that an application log segment 470 has been filled, or is about to be filled).

FIG. 17 is a flow diagram of another embodiment of a method 1700 for log coordination. Step 1710 may comprise accessing log coordination pertaining to a lower-level, storage log 350. The log coordination information may include, but is not limited to information pertaining to: the size of the storage log segments 370, the configuration of the storage log segments 370, the capacity of the storage log segments 370, and/or the like. Step 1710 may comprise accessing the log coordination message in response to a query to the storage module 130 (through the interface 131), accessing settings, configuration, and profile information pertaining to the storage log 350, receiving a log coordination message 490, and/or the like.

Step 1720 may comprise configuring the size, configuration, and/or capacity of segments of an upper-level, application log 450 based on the log coordination information accessed at step 1710. Step 1720 may comprise updating a configuration, settings, and/or policy of the upper-level log 450. Step 1720 may include reconfiguring the upper-level log 450 (e.g., restarting the log client 406), and/or the like.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. A method, comprising:
   writing data on a non-volatile storage medium in response to storage requests pertaining to a client log comprising logical log segments, the logical log segments comprising respective logical addresses of a logical address space, wherein writing the data comprises:
      storing the data within a storage log comprising an ordered sequence of physical log segments, the physical log segments comprising respective physical addresses within a physical address space of the non-volatile storage medium;
      receiving a notification pertaining to a client grooming operation, the client grooming operation to invalidate data of a logical log segment of the client log; and
      coordinating storage grooming operations on physical log segments of the storage log based on the notification pertaining to the client grooming operation, wherein coordinating the storage grooming operations comprises:
         identifying data pertaining to a particular logical log segment within two or more physical log segments of the storage log, the two or more physical log segments comprising data that does not pertain to the particular logical log segment;
         relocating the identified data from the two or more physical log segments to a first physical log segment of the storage log; and
         relocating the data that does not pertain to the particular log segment from the two or more physical log segments to a second physical log segment of the storage log, different from the first physical log segment.

2. The method of claim 1, wherein storing the data within the storage log further comprises associating the data stored on the non-volatile storage medium with respective logical addresses in a translation map, and wherein the notification comprises a deallocation message specifying logical addresses to be invalidated in the client grooming operation, the specified logical addresses associated with data stored on the non-volatile storage medium in the translation map.

3. The method of claim 1, wherein coordinating the storage grooming operations comprises identifying data within a selected physical log segment of the storage log that does not need to be retained on the non-volatile storage medium based on the notification pertaining to the client grooming operation.

4. The method of claim 1, wherein data of the logical log is interleaved with other data within one or more physical log segments of the storage log, wherein coordinating the storage grooming operations comprises consolidating the interleaved data of the logical log within respective physical log segments of the storage log during the storage grooming operations.

5. The method of claim 1, further comprising:
   maintaining a plurality of append points within the storage log, each append point corresponding to a respective physical address of the physical address space and a respective region of the logical address space; and
   selecting one of the plurality of append points to store data of a storage request based on logical identifiers pertaining to the storage request.

6. A method, comprising:
   writing data on a non-volatile storage medium in response to storage requests pertaining to a client log comprising logical log segments, the logical log segments comprising respective logical addresses of a logical address space, wherein writing the data comprises:
      storing the data within a storage log comprising an ordered sequence of physical log segments, the physical log segments comprising respective physical addresses within a physical address space of the non-volatile storage medium;
      receiving a notification pertaining to a client grooming operation, the client grooming operation to invalidate data of a logical log segment of the client log; and
      coordinating storage grooming operations on physical log segments of the storage log based on the notification pertaining to the client grooming operation, wherein coordinating the storage grooming operations comprises one of:
         pausing a storage grooming operation to recover a selected physical log segment of the storage log, wherein recovering the selected physical log segment comprises relocating valid data stored within the selected physical log segment to another physical log segment of the storage log and erasing the selected physical log segment, and
         resuming the storage grooming operation to recover the selected physical log segment.

7. The method of claim 6, wherein storing the data within the storage log further comprises associating the data stored on the non-volatile storage medium with respective logical addresses in a translation map, and wherein the notification comprises a deallocation message specifying logical addresses to be invalidated in the client grooming operation, the specified logical addresses associated with data stored on the non-volatile storage medium in the translation map.

8. The method of claim 6, wherein coordinating the storage grooming operations comprises identifying data within a selected physical log segment of the storage log that does not need to be retained on the non-volatile storage medium based on the notification pertaining to the client grooming operation.

9. The method of claim 6, wherein data of the logical log is interleaved with other data within one or more physical log segments of the storage log, wherein coordinating the storage grooming operations comprises consolidating the interleaved data of the logical log within respective physical log segments of the storage log during the storage grooming operations.

10. The method of claim 6, further comprising:
    maintaining a plurality of append points within the storage log, each append point corresponding to a respective physical address of the physical address space and a respective region of the logical address space; and selecting one of the plurality of append points to store data of a storage request based on logical identifiers pertaining to the storage request.

11. A non-transitory computer-readable storage medium comprising instructions configured to cause a computing device to perform operations, the operations comprising:

managing a storage log comprising a plurality of physical log segments, the physical log segments comprising respective physical addresses of a physical address space of a non-volatile storage medium, wherein managing the storage log comprises maintaining a plurality of append points within the storage log, each append point corresponding to a respective physical log segment of the storage log; and storing data within the storage log in response to write requests, wherein storing data within the storage log in response to a write request comprises:

determining whether the write request pertains to a logical log, the logical log corresponding to logical identifiers of a logical address space associated with the non-volatile storage medium, selecting an append point for the write request from the plurality of append points maintained within the storage log based on the determining, and storing the data of the write request within the storage log, wherein the data is stored at a physical address within the physical log segment corresponding to the selected append point, and wherein maintaining the plurality of append points within the storage log further comprises:

maintaining a first append point for data pertaining to the logical log, and maintaining a second append point for data that does not pertain to the logical log, the logical log comprising a set of logical identifiers of the logical address space, and wherein selecting the append point for the write request further comprises:

selecting the first append point in response to determining that a logical identifier associated with the write request is within the set of logical identifiers, and selecting the second append point in response to determining that the logical identifier associated with the write request is outside of the set of logical identifiers.

12. The non-transitory computer-readable storage medium of claim 11, the operations further comprising adjusting a storage recovery operation schedule for recovery operations on physical log segments of the storage log in response to log coordination metadata pertaining to recovery operations of the logical log.

13. The non-transitory computer-readable storage medium of claim 11, further comprising recovering a selected physical log segment of the storage log by identifying data within the selected physical log segment that does not need to be retained on the non-volatile storage medium based on validity information pertaining to one or more logical log segments of the logical log.

14. The non-transitory computer-readable storage medium of claim 11, the operations further comprising:

providing an application programming interface to receive log coordination information pertaining to the logical log at the storage log; and determining whether the write request pertains to the logical log based on log coordination information received through the application programming interface.

15. The non-transitory computer-readable storage medium of claim 14, wherein the log coordination information received through the provided interface indicates logical identifiers that correspond to the logical log, and wherein determining whether the write request pertains to the logical log comprises determining whether the write request pertains to one or more of the indicated logical identifiers.

16. The non-transitory computer-readable storage medium of claim 14, the operations further comprising providing log coordination information pertaining to the storage log to a manager of the logical log through the application programming interface.

17. An apparatus comprising:

a log manager configured to implement log storage operations pertaining to a physical storage log maintained within a physical address space of a non-volatile storage medium, the log manager comprising:

a storage controller configured to implement log storage operations to write data within segments of the physical storage log, each segment of the physical storage log comprising a plurality of physical storage locations of the non-volatile storage medium, and to associate physical storage locations of the data with identifiers of a logical address space, a groomer configured to implement log storage operations to recover selected segments of the physical storage log, wherein recovering a selected segment comprises erasing the physical storage locations comprising the selected segment of the physical storage log, and a log coordinator configured to modify implementation of the log storage operations by one or more of the storage controller and the groomer in response to coordination information pertaining to an application log maintained within the logical address space, wherein the log coordinator configures the groomer to pause implementation of log storage operations to recover selected segments of the physical storage log in response to coordination information pertaining to an operation to recover one or more segments of the application log, the segments of the application log comprising respective logical identifiers of the logical address space.

18. The apparatus of claim 17, wherein the log coordinator configures the groomer to resume implementation of log storage operations to recover selected segments of the physical storage log in response to completion of the operation to recover the one or more segments of the application log.

19. An apparatus, comprising:

a log manager configured to implement log storage operations pertaining to a physical storage log maintained within a physical address space of a non-volatile storage medium, the log manager comprising:

a storage controller configured to implement log storage operations to write data within segments of the physical storage log, each segment of the physical storage log comprising a plurality of physical storage locations of the non-volatile storage medium, and to associate physical storage locations of the data with identifiers of a logical address space, a groomer configured to implement log storage operations to recover selected segments of the physical storage log, wherein recovering a selected segment comprises erasing the physical storage locations comprising the selected segment of the physical storage log, and a log coordinator configured to modify implementation of the log storage operations by one or more of the storage controller and the groomer in response to coordination information pertaining to an application log maintained within the logical address space, wherein, in response to the coordination information pertaining to the application log, the log coordinator configures the storage controller to:

distinguish data that pertains to the application log from data that does not pertain to the application log;

write data determined to pertain to the application log at a first append point of the physical storage log; and write data determined to not pertain to the application log at a second append point of the physical storage log, the first append point and the second append point corresponding to different segments of the physical storage log.

20. The apparatus of claim 19, wherein the log coordinator is configured to provide coordination information pertaining to the physical storage log to a client, the provided coordination information indicating one or more of: a size of a segment of the physical storage log, and a boundary between two or more segments of the physical storage log.

* * * * *